US012058996B2

(12) United States Patent
Toner et al.

(10) Patent No.: US 12,058,996 B2
(45) Date of Patent: Aug. 13, 2024

(54) HIGH SUBZERO CRYOPRESERVATION

(71) Applicant: The General Hospital Corporation, Boston, MA (US)

(72) Inventors: Mehmet Toner, Charlestown, MA (US); Mustafa Korkut Uygun, Newton, MA (US); Shannon N. Tessier, Framingham, MA (US); Shannon L. Stott, Stoneham, MA (US); Lindong Weng, Arlington, MA (US); Reinier Johan De Vries, Boston, MA (US); Casie A. Pendexter, Rockland, MA (US); Stephanie E J Cronin, Boston, MA (US)

(73) Assignee: The General Hospital Corporation, Boston, MA (US)

(*) Notice: Subject to any disclaimer, the term of this patent is extended or adjusted under 35 U.S.C. 154(b) by 404 days.

(21) Appl. No.: 16/622,457

(22) PCT Filed: Jun. 14, 2018

(86) PCT No.: PCT/US2018/037525
§ 371 (c)(1),
(2) Date: Dec. 13, 2019

(87) PCT Pub. No.: WO2018/232110
PCT Pub. Date: Dec. 20, 2018

(65) Prior Publication Data
US 2020/0154697 A1 May 21, 2020

Related U.S. Application Data

(60) Provisional application No. 62/541,305, filed on Aug. 4, 2017, provisional application No. 62/519,452, filed on Jun. 14, 2017.

(51) Int. Cl.
A01N 1/02 (2006.01)

(52) U.S. Cl.
CPC ......... A01N 1/0221 (2013.01); A01N 1/0294 (2013.01)

(58) Field of Classification Search
CPC ..................... A01N 1/0221; A01N 1/0294
See application file for complete search history.

(56) References Cited

U.S. PATENT DOCUMENTS 1,682,344 A 8/1928 Lesieur
1,916,658 A 7/1933 Davidson
(Continued)

FOREIGN PATENT DOCUMENTS

DE 4342728 6/1995
EP 1246903 10/2002
(Continued)

OTHER PUBLICATIONS

Liu et al. "Cryopreservation of human spermatozoa with minimal non-permeable cryoprotectant" Cryobiology 73 (2016) 162-167 (Year: 2016).*
(Continued)

Primary Examiner — Marcia S Noble
Assistant Examiner — Lauren K Van Buren
(74) Attorney, Agent, or Firm — Fish & Richardson P.C.

(57) ABSTRACT

This disclosure is related to methods of preserving biological samples, organs, and organisms. This disclosure is based, at least in part, on the discovery that in the presence of heterogenous extracellular ice, endothelial cells have improved attachment and viability after preservation, and particularly by uniformly nucleating ice across the microvasculature using ice nucleating agents, the chance of intracelluar ice formation can be significantly reduced.

13 Claims, 19 Drawing Sheets

(56) References Cited

U.S. PATENT DOCUMENTS

| | | | |
|---|---|---|---|
| 3,183,961 A | 5/1965 | Brandt | |
| 3,406,531 A | 10/1968 | Swenson et al. | |
| 3,468,136 A | 9/1969 | Swenson et al. | |
| 3,545,221 A | 12/1970 | Swenson et al. | |
| 3,607,646 A | 9/1971 | Swenson et al. | |
| 3,660,241 A | 5/1972 | Michielsen | |
| 3,738,914 A | 6/1973 | Knudson et al. | |
| 3,772,153 A | 11/1973 | De Roissart | |
| 3,810,367 A | 5/1974 | Peterson | |
| 3,843,455 A | 10/1974 | Bier | |
| 3,877,843 A | 4/1975 | Fischel | |
| 3,881,990 A | 5/1975 | Burton et al. | |
| 3,914,954 A | 10/1975 | Doerig | |
| 3,995,444 A | 12/1976 | Clark et al. | |
| 4,186,565 A | 2/1980 | Toledo-Pereyra | |
| 4,242,883 A | 1/1981 | Toledo-Pereyra | |
| 4,745,759 A | 5/1988 | Bauer et al. | |
| 4,798,824 A | 1/1989 | Belzer et al. | |
| 5,194,269 A * | 3/1993 | Lee | A01N 1/0221 426/62 |
| 5,356,771 A | 10/1994 | O'Dell | |
| 5,599,659 A | 2/1997 | Brasile et al. | |
| 6,046,046 A | 4/2000 | Hassanein | |
| 6,524,785 B1 | 2/2003 | Cozzone et al. | |
| 6,673,607 B2 | 1/2004 | Toner et al. | |
| 6,902,931 B1 | 6/2005 | Toner et al. | |
| 7,029,839 B2 | 4/2006 | Toledo-Pereyra et al. | |
| 7,094,601 B2 | 8/2006 | Toner et al. | |
| 7,250,292 B2 | 7/2007 | Fahy | |
| 7,410,474 B1 | 8/2008 | Friend | |
| 7,504,201 B2 | 3/2009 | Taylor et al. | |
| 7,572,622 B2 | 8/2009 | Hassenein et al. | |
| 7,651,835 B2 | 1/2010 | Hassenein et al. | |
| 7,691,622 B2 | 4/2010 | Garland et al. | |
| 7,749,693 B2 | 7/2010 | Brassil et al. | |
| 7,811,808 B2 | 10/2010 | Van Der Plaats et al. | |
| 7,824,848 B2 | 11/2010 | Owen et al. | |
| 8,268,612 B2 | 9/2012 | Owen et al. | |
| 8,287,580 B2 | 10/2012 | Rakhorst et al. | |
| 8,323,954 B2 | 12/2012 | Kravitz et al. | |
| 8,440,390 B2 | 5/2013 | Brockbank | |
| 8,735,054 B1 | 5/2014 | Sun et al. | |
| 8,765,364 B2 | 7/2014 | Curtis et al. | |
| 8,771,930 B2 | 7/2014 | Curtis et al. | |
| 8,927,257 B2 | 1/2015 | Hutzenlaub et al. | |
| 8,986,978 B2 | 3/2015 | Brassil | |
| 9,078,428 B2 | 7/2015 | Hassenein et al. | |
| 9,215,867 B2 | 12/2015 | Hassenein et al. | |
| 9,247,728 B2 | 2/2016 | Fishman et al. | |
| 9,421,305 B2 | 8/2016 | Lee et al. | |
| 10,076,543 B2 | 9/2018 | Wilhelmi et al. | |
| 10,918,102 B2 | 2/2021 | Uygun et al. | |
| 2003/0073227 A1 | 4/2003 | Hull | |
| 2004/0053207 A1 | 3/2004 | Griffiths | |
| 2004/0058432 A1 | 3/2004 | Owen et al. | |
| 2005/0147958 A1 | 7/2005 | Hassenein et al. | |
| 2005/0221269 A1 | 10/2005 | Taylor et al. | |
| 2007/0009881 A1 | 1/2007 | Arzt et al. | |
| 2007/0042337 A1 | 2/2007 | Rubinsky et al. | |
| 2007/0042339 A1 | 2/2007 | Toner et al. | |
| 2008/0096184 A1 | 4/2008 | Brasile | |
| 2008/0234768 A1 | 9/2008 | Hassenein et al. | |
| 2008/0288399 A1 | 11/2008 | Curtis et al. | |
| 2008/0299535 A1 | 12/2008 | Tokuda et al. | |
| 2009/0017439 A1 | 1/2009 | Shimko et al. | |
| 2009/0123437 A1 | 5/2009 | Takbe | |
| 2011/0183310 A1 | 7/2011 | Kravitz | |
| 2014/0030231 A1 * | 1/2014 | Yarmush | G01N 33/5091 435/6.12 |
| 2015/0175956 A1 * | 6/2015 | Elhofy | A01N 1/0226 435/404 |
| 2015/0230453 A1 | 8/2015 | Fontes et al. | |
| 2015/0322404 A1 | 11/2015 | Yarmush et al. | |
| 2019/0335745 A1 | 11/2019 | Fekete et al. | |
| 2021/0195891 A1 | 7/2021 | Uygun et al. | |
| 2022/0095607 A1 | 3/2022 | Uygun et al. | |

FOREIGN PATENT DOCUMENTS

| | | | |
|---|---|---|---|
| KR | 2001/0002227 | 1/2001 | |
| WO | WO 2001/048153 | 7/2001 | |
| WO | WO 2007/025233 | 3/2007 | |
| WO | WO 2008/024195 | 2/2008 | |
| WO | WO 2011/002926 | 1/2011 | |
| WO | WO 2011/098367 | 8/2011 | |
| WO | WO 2011/140241 | 11/2011 | |
| WO | WO-2016065363 A1 * | 4/2016 | ............ A01N 1/0205 |
| WO | WO 2018/005802 | 1/2018 | |
| WO | WO 2020/163500 | 8/2020 | |

OTHER PUBLICATIONS

Belzer UW Cold Storage ViaSpan Reference (Year: 2018).*
Yoshida et al. "Involvement of signaling of VEGF and TGF-beta in differentiation of sinusoidal endothelial cells during culture of fetal rat liver cells" Cell Tissue Res (2007) 329: 273-282 (Year: 2007).*
Bojic et al. "Winter is coming: the future of cryopreservation" BMC Biology (2021) 19:56 (Year: 2021).*
EP Office Action in European Appln. No. 18816781.1, dated Aug. 24, 2021, 6 pages.
Bejaoui et al., "Emerging concepts in liver graft preservation," World Journal of Gastroenterology, Jan. 2015, 21(2):396-407.
Berendsen et al., "Supercooling Enables Long-Term Transplantation Survival Following 4 Days of Liver Preservation," Nat. Med. Jul. 2014, 20(7):790-793.
EP Supplementary Partial European Search Report in European Appln. No. EP 18816781, dated Apr. 21, 2020, 16 pages.
Fahy et al., "Cryopreservation of Complex Systems: The Missing Link in the Regenerative Medicine Supply Chain," Rejuvenation Res., Jun. 2006, 9(2)279-291.
Gratwohl et al., "Hematopoietic Stem Cell Transplantation A Global Perspective," JAMA J. Am. Med. Assoc., Apr. 2010, 303(16)1617-1624.
Han et al., "Beneficial Effects of Freezing Rate Determined by Indirect Thermophysical Calculation on Cell Viability in Cryopreserved Tissues," Artif. Cells. Blood Substit. Immobil. Biotechnol., Jan. 2006, 34(2)205-221.
Kuleshova et al., "Vitrification as a Prospect for Cryopreservation of Tissue-Engineered Constructs," Biomaterials, Mar. 2007, 28(9):1585-1596.
Lewis et al., "The Grand Challenges of Organ Banking: Proceedings from the First Global Summit on Complex Tissue Cryopreservation," Cryobiology, Apr. 2016, 72(2):169-182.
Liu et al., "Cryopreservation of human spermatozoa with minimal non-permeable cryoprotectant", Cryobiology, Oct. 2016, 73(2):162-167.
Liu et al., "Preservation of Mouse Sperm by Convective Drying and Storing in 3-0-Methyl-D-Glucose," PLoS One, 2012, 7(1):e29924, 8 pages.
PCT International Preliminary Report on Patentability in International Appln. No. PCT/US2018/037525, dated Dec. 17, 2019, 6 pages.
PCT International Search Report and Written Opinion in International Appln. No. PCT/US2018/037525, dated Aug. 29, 2018, 14 pages.
Sugimachi et al., "Nonmetabolizable glucose compounds impart cryotolerance to primary rat hepatocytes," Tissue Engineering, Mar. 2006, 12(3):579-588.
Weng et al., "Bacterial Ice Nucleation in Monodisperse D2O and H2O-in-Oil Emulsions," Langmuir, Sep. 2016, 32(36):9229-9236.
EP Extended European Search Report in EP Appln. No. 18816781.1, dated Jul. 23, 2020, 13 pages.
[No Author Listed], "Buying time for transplants," Nat. Biotechnol., 2017, 35(9):801.
Academic.Oup.com [online], "78 Optimization of ex-vivo Subnormothermic Oxygenated Machine Perfusion in Vascularized

(56) References Cited

OTHER PUBLICATIONS

Composite Allograft on Rat to Prolong Preservation Duration," Apr. 9, 2018, retrieved on Aug. 4, 2022, retrieved from URL<https://academic.oup.com/jbcr/article-abstract/39/suppl_1/S44/4965373?redirectedFrom=fulltext>, 7 pages.
Ahlborg et al., "Splanchnic and peripheral glucose and lactate metabolism during and after prolonged arm exercise," J Clin Invest, Mar. 1986, 77(3):690-699.
Almanza et al., "Endoplasmic reticulum stress signalling—from basic mechanisms to clinical applications," FEBS J., 2019, 286(2):241-278.
Amir et al., "Improved viability and reduced apoptosis in sub-zero 21-hour preservation of transplanted rat hearts using anti-freeze proteins," J. Heart Lung Transplant., 2005, 24(11):1915-1929.
Amir et al., "Prolonged 24-hour subzero preservation of heterotopically transplanted rat hearts using antifreeze proteins derived from arctic fish," Ann. Thorac. Surg., May 2004, 77(5):1648-1655.
Amir et al., "Subzero nonfreezing cryopresevation of rat hearts using antifreeze protein I and antifreeze protein III," Cryobiology, Jun. 2004, 48(3):273-282.
Ardehali et al., "Ex-vivo perfusion of donor hearts for human heart transplantation (Proceed II): a prospective, open-label, multicentre, randomised non-inferiority trial," The Lancet, Jun. 2015, 385(9987):2577-2584, 8 pages.
Avruch et al., "A novel model for ex situ reperfusion of the human liver following subnormothermic machine perfusion," Technology (Singap World Sci.), Dec. 2017, 5(4):196-200, 5 pages.
Azari et al., "Technical Aspects of the Recipient Operation in Hand Transplantation," Journal of Reconstructive Microsurgery, Aug. 2011, 28:27-34, 8 pages.
Bang et al., "Antifreeze peptides and glycopeptides, and their derivatives: Potential uses in biotechnology," Marine Drugs, Jun. 2013, 11(6):2013-2041.
Bangsbo et al., "Lactate and H$^+$uptake in inactive muscles during intense exercise in man," J Physiol, Oct. 1995, 488(Pt 1):219-229.
Baskin-Bey et al., "Cathepsin B inactivation attenuates hepatocyte apoptosis and liver damage in steatotic livers after cold ischemia-warm reperfusion injury," Am. J. Physiol. Gastrointest. Liver Physiol., Feb. 2005, 288(2):G396-G402.
Baskin-Bey et al., "Clinical Trial of the Pan-Caspase Inhibitor, IDN-6556, in Human Liver Preservation Injury," Am J Transplant, 2007, 7(1):218-25.
Behrends et al., "Network organization of the human autophagy system," Nature, Jul. 2010, 466(7302):68-76.
Bejaoui et al., "Polyethylene Glycol Preconditioning: An Effective Strategy to Prevent Liver Ischemia Reperfusion Injury," Oxid Med Cell Longev, 2016, 2016:9096549, 10 pages.
Bejaoui et al., "Protective Effect of Intravenous High Molecular Weight Polyethylene Glycol on Fatty Liver Preservation," Biomed Res Int, Oct. 2015, 2015:794287, 10 pages.
Belzer and Southard, "Principles of solid-organ preservation by cold storage," Transplantation, Apr. 1988, 45(4):673-676.
Berendsen et al., "A simplified subnormothermic machine perfusion system restores ischemically damaged liver grafts in a rat model of ortholopic liver transplantation," Transplantation Research, 2012, 1:6, 10 pages.
Berendsen et al., "Hepatocyte viability and ATP content decrease linearly over lime during conventional cold storage of rat liver grails," Transplantation Proceedings, 2011, 43(5):1484-1488.
Bessems et al., "Improved Machine Perfusion Preservation of the Non-Heart-Beating Donor Rat Liver Using Polysol, New Machine Perfusion Preservation Solution," Liver Transplantation, 2005, 11(11):1379-1388.
Bessems et al., "Machine Perfusion Preservation of the Pig Liver Using a New Preservation Solution, Polysol," Transplantation Proceedings, 2006, 38:1238-1242.
Best, "Cryoprotectant Toxicity: Facts, Issues, and Questions," Rejuvenation Res., Oct. 2015, 18(5):422-436.
Blaisdell, "The pathophysiology of skeletal muscle ischemia and the reperfusion syndrome: a review," Cardiovasc Surg, Dec. 2002, 10(6):620-630.
Borghi-Scoazec et al., "Apoptosis after ischemia-reperfusion in human liver allografts," Liver Transplant. Surg. Off. Publ. Am. Assoc. Study Liver Dis. Int. Liver Transplant. Soc., Jul. 1997, 3(4):407-415.
Boteon et al., "Mechanisms of autophagy activation in endothelial cell and their targeting during normothermic machine liver perfusion," World J. Gastroenterol., Dec. 2017, 23(48):8443-8451.
Bral et al., "Preliminary Single-Center Canadian Experience of Human Normothermic Ex Vivo Liver Perfusion: Results of a Clinical Trial," Am. J. Transplant., Apr. 2017, 17(4):1071-1080.
Brenner et al., "Decoding cell death signals in liver inflammation," J Hepatol, Sep. 2013, 59(3):583-94.
Bretschneider et al., "Myocardial resistance and tolerance to ischemia: physiological and biochemical basis," J Cardiovasc Surg (Torino), May-Jun. 1975, 16(3):241-60.
Briard et al., "Small molecule ice recrystallization inhibitors mitigate red blood cell lysis during freezing, transient warming and thawing," Sci. Rep., 2016, 29(6):23619, 10 pages.
Brockmann et al., "Normothermic Perfusion: A New Paradigm for Organ Preservation," Annals of Surgery, Jul. 2009, 250(1):1-6.
Bruinsma and Uygun, "Subzero organ preservation: the dawn of a new ice age?," Curr. Opin. Organ Transplant., 2017, 22(3):281-286, 6 pages.
Bruinsma et al., "Determination and Extension of the Limits to Static Cold Storage with Subnormothermic Machine Perfusion," The International Journal of Artificial Organs, 2013, 36(11):775-780.
Bruinsma et al., "Functional Human Liver Preservation and Recovery by Means of Subnormothermic Machine Perfusion," J Vis Exp, 2015, 98:e52777, 5 pages.
Bruinsma et al., "Metabolic profiling during ex vivo machine perfusion of the human liver," Sci. Rep., 2016, 6:22415, 13 pages.
Bruinsma et al., "Peritransplant energy changes and their correlation to outcome after human liver transplantation," Transplantation, 2017, 101(7):1637-1644.
Bruinsma et al., "Subnormothermic Machine Perfusion for Ex Vivo Preservation and Recovery of the Human Liver for Transplantation: Subnormothermic Machine Perfusion of Human Livers," Am. J. Transplant., 2014, 14(6):1400-1409.
Bruinsma et al., "Supercooling preservation and transplantation of the rat liver," Nat. Protoc., Mar. 2015, 10(3):484-494.
Buis et al., "Altered bile composition after liver transplantation is associated with the development of nonanastomotic biliary strictures," Journal of Hepatology 50:69-79 (2009).
Burkey et al., "Understanding Poly(vinyl alcohol)-Mediated Ice Recrystallization Inhibition through Ice Adsorption Measurement and pH Effects," Biomacromolecules, 2018, 19(1):248-55, 40 pages.
Burlage et al., "Abstract B384: Ex-vivo Subnormothermic Oxygenated Machine Perfusion of Rodent Hindlimb: Feasibility Study to Elongate Preservation Time of Vascularized Composite Allograft," Abstract, Presented at Proceedings of the 2018 American Transplant Congress, Seattle, WA, Jun. 2-6, 2018, 4 pages.
Burlage et al., "Abstract: Ex-vivo Subnormothermic Oxygenated Machine Perfusion of Rodent Hindlimb: Feasibility Study to Elongate Preservation Time of Vascularized Composite Allograft," Abstract, Presented at Proceedings of the Plastic Surgery Research Council 63rd Annual Meeting, Birmingham, AL, May 17-20, 2018, 2 pages.
Burlage et al., "Advances in machine perfusion, organ preservation, and cryobiology: potential impact on vascularized composite allotransplantation," Curr Opin Organ Transplant, Oct. 2018, 23(5):561-567.
Burlage et al., "Optimization of Subnormothermic Machine Perfusion for Ex Vivo Preservation of Rodent Vascularized Composite Allografts," J Surg Res, Feb. 2022, 270:151-161.
Butler et al., "Successful extracorporeal porcine liver perfusion for 72 hr," Transplantation, 2002, 73(8):1212-1218.
Campbell et al., "Restoration of ovarian function and natural fertility following the cryopreservation and autotransplantation of whole adult sheep ovaries," Hum. Reprod., Jun. 2014, 29(8):1749-1763.

(56) References Cited

OTHER PUBLICATIONS

Celik et al., "Microfluidic experiments reveal that antifreeze proteins bound to ice crystals suffice to prevent their growth," Proc. Nat'l Acad. Sci. U S A, 2013, 110(4):1309-1314.
Chawade et al., "Normalyzer: a tool for rapid evaluation of normalization methods for omics data sets," J. Proteome Res., 2014, 13(6):3114-3120.
Chazouilleres et al., "Protective Effect of Vasodilators on Liver Function after Long Hypothermic Preservation: A Study in the Isolated Perfused Rat Liver," Hepatology, Jun. 1989, 9(6):824-829.
Chen et al., "A Versatile Polypharmacology Platform Promotes Cytoprotection and Viability of Human Pluripotent and Differentiated Cells," Nature Methods, 2021, 18:528-541.
Chen et al., "Effective Application of ET-Kyoto Solution for Clinical Lung Transplantation," Transplantation Proceedings, 2004, 36:2812-2815.
Cho et al., "Changes in the expression of cell cycle regulators during rat liver regeneration after partial hepatectomy," Exp. Mol. Med., 1996, 28(4):187-191.
Consoli et al., "Contribution of liver and skeletal muscle to alanine and lactate metabolism in humans," Am J Physiol, Nov. 1990, 259:E677-684.
Constantinescu et al., "Preservation of amputated extremities by extracorporeal blood perfusion; a feasibility study in a porcine model," J Surg Res, Nov. 2011, 171(1):291-299.
Costanzo et al., "Hibernation physiology, freezing adaptation and extreme freeze tolerance in a northern population of the wood frog," J. Exp. Biol., Sep. 2013, 216(Pt 18):3461-3473.
Cypel et al., "Normothermic Ex Vivo Perfusion Prevents Lung Injury Compared to Extended Cold Preservation for Transplantation," American Journal of Transplantation, 2009, 9(10):2262-2269.
De Rougemont et al., "One Hour Hypothermic Oxygenated Perfusion (HOPE) Protects Nonviable Liver Allografts Donated Aller Cardiac Death," Annals of Surgery, 2009, 250(5):674-683.
De Vera et al., "Liver Transplantation Using Donation Aller Cardiac Death Donors: Long-Term Follow-Up from a Single Center," American Journal of Transplantation, 2009, 9(4):773-781.
De Vries et al., "Abstract 615.2: Extending the Human Liver Preservation Time for Transplantation by Supercooling," Transplantation, Jul. 2018, 102(7S):S396.
De Vries et al., "Ex situ normothermic machine perfusion of donor livers using a haemoglobin-based oxygen carrier: a viable alternative to red blood cells," Transplant International, 2018, 31:1281-1282.
De Vries et al., "Pretransplant sequential hypo- and normothermic machine perfusion of suboptimal livers donated after circulatory death using a hemoglobin-based oxygen carrier perfusion solution," Am. J. Transplant. Off. J. Am. Soc. Transplant. Am. Soc. Transpl. Surg., 2019, 19:1202-1211.
De Vries et al., "Supercooling extends preservation time of human livers," Nat. Biotechnol., Oct. 2019, 37(10):1131-1136, 10 pages.
De Vries et al., "Systems engineering the organ preservation process for transplantation," Curr. Op. Biotechnol., Aug. 2019, 58:192-201.
Devireddy et al., "Liver Freezing Response of the Freeze-Tolerant Wood Frog, Rana sylvatica, in the Presence and Absence of Glucose. I. Experimental Measurements," Cryobiology, 1999, 38:310-326.
Do Amaral et al., "Hepatocyte responses to in vitro freezing and β-adrenergic stimulation: Insights into the extreme freeze tolerance of subarctic Rana sylvatica," J. Exp. Zool. Part Ecol. Genet. Physiol., 2015, 323(2):89-96.
Dobin et al., "STAR: ultrafast universal RNA-seq aligner," Bioinformatics, Jan. 2013, 29(1):15-21.
Donato et al., "Liver grafts preserved in Celsior solution as source of hepatocytes for drug metabolism studies: comparison with surgical liver biopsies," Drug Metabolism and Disposition, 2005, 33(1):108-114.
Dutheil et al., "Polyethylene glycols interact with membrane glycerophospholipids: is this part of their mechanism for hypothermic graft protection?," J. Chem. Biol., Mar. 2009, 2(1):39-49.

Dutkowski et al., "HOPE for human liver grails obtained from donors after cardiac death," Journal of Hepatology, 2014, 50:765-772.
Eickhoff et al., "Contrasting Behavior of Antifreeze Proteins: Ice Growth Inhibitors and Ice Nucleation Promoters," J. Phys. Chem. Lett., 2019,10(5):966-972.
Emadali et al., "Distinct endoplasmic reticulum stress responses are triggered during human liver transplantation," J. Pathol., Sep. 2005, 207(1):111-118.
Eshmuminov et al., "An integrated perfusion machine preserves injured human livers for 1 week," Nat. Biotechnol., Feb. 2020, 38(2):189-198.
Fahy et al., "Cryopreservation of organs by vitrification: perspectives and recent advances," Cryobiology, Apr. 2004, 48(2):157-178.
Fahy et al., "Physical and biological aspects of renal vitrification," Organogenesis, 2009, 5(3):167-175.
Fahy, "Analysis of "solution effects" injury: Cooling rate dependence of the functional and morphological sequellae of freezing in rabbit renal cortex protected with dimethyl sulfoxide," Cryobiology, 1981, 18(6):550-570.
Fairlie et al., "Crosstalk between apoptosis and autophagy signaling pathways," Int Rev Cell Mol Biol, 2020, 352:115-158.
Farrant, "Mechanism of cell damage during freezing and thawing and its prevention," Nature, 1965, 205:1284-1287.
Ferrigno et al., "Machine perfusion at 20° C. reduces preservation damage to livers from non-heart beating donors," Cryobiology, 2011, 62:152-158.
Fichter et al., "Development of an Extracorporeal Perfusion Device for Small Animal Free Flaps," PLoS One, 2016, 11:e0147755, 17 pages.
Fontes et al., "Liver preservation with machine perfusion and a newly developed cell-free oxygen carrier solution under subnormothermic conditions," Am J Transplant, Feb. 2015, 15(2):381-394.
Friend et al., "Normothermic Perfusion of the Isolated Liver," Transplantation Proceedings, 2001, 33:3436-3438.
Galluzzi et al., "Caspases Connect Cell-Death Signaling to Organismal Homeostasis," Immunity, 2016, 44:221-31.
Gearing et al., "CiiiDER: a tool for predicting and analysing transcription factor binding sites," PLoS One, 2019, 14:e0215495, 12 pages.
Geuken et al., "Rapid increase of bile salt secretion is associated with bile duct injury after human liver transplanlalion," Journal of Hepatology, 2004, 41(6):1017-1025.
Giknis et al., "Clinical Laboratory Parameters for the Crl:CD(SD) Rats," Charles River Laboratories, 2006, 16 pages.
Giwa et al., "The promise of organ and tissue preservation to transform medicine," Nat Biotechnol., 2017, 35(6):530-542.
Graw et al., "proteiNorm—A User-Friendly Tool for Normalization and Analysis of TMT and Label-Free Protein Quantification," ACS Omega 2020, 5(40):25625-25633.
Gringeri et al., "Subnormothermic machine perfusion for non-heart-beating donor liver grafts preservation in a Swine model: a new strategy to increase the donor pool?," Transplant. Proc., 2012, 44(7):2026-2028.
Gu et al., "*circlize* Implements and enhances circular visualization in R," Bioinformatics, Oct. 2014, 30(19):2811-2, 2 pages.
Guarrera et al., "Hypothermic Machine Preservation in Human Liver Transplantation: The First Clinical Series," American Journal of Transplantation, 2010, 10(2):372-381.
Guarrera et al., "Pushing the envelope in renal preservation; improved results with novel perfusate modifications for pulsatile machine perfusion of cadaver kidneys," Transplant Proc., 2004, 36(5):1257-60.
Guibert et al., "Organ Preservation: Current Concepts and New Strategies for the Next Decade," Transfusion Medicine and Hemotherapy, 2011, 38:125-142.
Guicciardi and Gores, "Apoptosis: a mechanism of acute and chronic liver injury," Gut, 2005, 54:1024-33.
Guicciardi et al., "Apoptosis and necrosis in the liver," Compr Physiol, 2013, 3(2):977-1010.
Hamilton et al., "Successful preservation of canine small intestine by freezing," J. Surg. Res., 1973, 14(4):313-318.

(56) References Cited

OTHER PUBLICATIONS

Harrison et al., "A randomized, placebo-controlled trial of emricasan in patients with NASH and F1-F3 fibrosis," J Hepatol, 2020, 72:816-827.
Hasan et al., "Ice Recrystallization Inhibiting Polymers Enable Glycerol-Free Cryopreservation of Microorganisms," Biomacromolecules, 2018, 19(8):3371-3376.
Hautz et al., "Histomorphometric evaluation of ischemia-reperfusion injury and the effect of preservation solutions histidine-tryptophan-ketoglutarate and University of Wisconsin in limb transplantation," Transplantation, 2014, 98(7):713-720.
Hertl et al., "Evidence of Preservation Injury to Bile Ducts by Bile Salts in the Pig and Its Prevention by Infusions of Hydrophilic Bile Salts," Hepatology, 1995, 21(4):1130-1137.
Higashi et al., "Restoration of ATP contents in the transplanted liver closely relates to graft viability in dogs," Eur. Surg. Res. Eur. Chir. Forsch. Rech. Chir. Eur., 1989, 21:76-82.
Hoekstra et al., "Bile Sall Toxicity Aggravates Cold Ischemic Injury of Bile Ducts Aller Liver Transplantation in Mdr2 $^{+/-}$Mice," Hepatology, 2006, 43(5):1022-1031.
Hoffmann et al., "The use of oncotic support agents in perfusion preservation," Organ Preservation, 1982, 5 pages.
Hoglen et al., "A caspase inhibitor, IDN-6556, ameliorates early hepatic injury in an ex vivo rat model of warm and cold ischemia," Liver Transpl, 2007, 13:361-6.
Hoglen et al., "Characterization of IDN-6556 (3-{2-(2-tert-Butylphenylaminooxaly1)-amino]-propionylamino }-4-oxo-5-(2,3,5,6-tetrafluoro-phenoxy)-pentanoic Acid): a Liver-Targeted Caspase Inhibitor," The Journal of Pharmacology and Experimental Therapeutics, 2008, 309(2):634-640.
Hohenester et al., "A Biliary HCO3-Umbrella Constitutes a Protective Mechanism Against Bile Acid-Induced Injury in Human Cholangiocytes," Hepatology, 2012, 55(1):173-183.
Huang et al., "Long-term deep-supercooling of large-volume water and red cell suspensions via surface sealing with immiscible liquids," Nat. Commun., 2018, 9:3201, 10 pages.
Huber et al., "Variance stabilization applied to microarray data calibration and to the quantification of differential expression," Bioinformatics, 2002, 18(Suppl 1):S96-104.
Hughes et al., "Isolation of Hepatocytes from Livers from Non-Heart-Beating Donors for Cell Transplantation," Liver Transplantation, 2006, 12:713-717.
Hunt et al., "Freeze-substitution and isothermal freeze-fixation studies to elucidate the pattern of ice formation in smooth muscle at 252 K (-21° C.)," J. Microsc., 1982, 125(2):177-186.
Hunt, "Studies on cellular structure and ice location in frozen organs and tissues: The use of freeze-substitution and related techniques," Cryobiology, 1984, 21(4):385-402.
Imber et al., "Optimisation of Bile Production during Normothermic Preservation of Porcine Livers," American Journal of Transplantation, 2002, 2(7):593-599.
International Preliminary Report on Patentability in International Appln. No. PCT/US2015/020336, dated Sep. 13, 2016, 5 pages.
International Preliminary Report on Patentability in International Appln. No. PCT/US2019/034744, dated Dec. 10, 2020, 7 pages.
International Preliminary Report on Patentability in International Appln. No. PCT/US2020/016840, mailed on Aug. 19, 2021, 11 pages.
International Search Report and Written Opinion in International Appln. No. PCT/US2015/020336, dated Jun. 25, 2015, 7 pages.
International Search Report and Written Opinion in International Appln. No. PCT/US2019/034744, dated Aug. 16, 2019, 10 pages.
International Search Report and Written Opinion in International Appln. No. PCT/US2020/016840, mailed on Jun. 22, 2020, 14 pages.
Invitation to Pay Additional Fees and, Where Applicable, Protest Fee in International Appln. No. PCT/US2020/016840, mailed on Apr. 13, 2020, 2 pages.
Invitation to Pay Additional Fees and, Where Applicable, Protest Fee in International Appln. No. PCT/US2022/072229, mailed on Jul. 18, 2022, 3 pages.
Ishiguro and Rubinsky, "Mechanical interactions between ice crystals and red blood cells during directional solidification," Cryobiology, 1994, 31(5):483-500.
Ishine et al., "A Histological Analysis of Liver Injury in Freezing Storage," Cryobiology, 1999, 39(3):271-277.
Ishine et al., "Transplantation of Mammalian Livers Following Freezing: Vascular Damage and Functional Recovery," Cryobiology, 2000, 40(1):84-89.
Izamis, "Ex vivo Perfusion Optimization of Donor Liver Grafts for Transplantation and Cell Isolation," Thesis for the degree of Doctor of Philosophy, Massachusetts Institute of Technology, Jun. 2010, 242 pages.
Jacobsen et al., "Transplantation of rabbit kidneys perfused with glycerol solutions at 10° C.," Cryobiology, 1978, 15(1):18-26.
Jain et al., "Long-Term Survival After Liver Transplantation in 4,000 Consecutive Patients at a Single Center," Annals of Surgery, 2000, 232(4):490-500.
Jassem et al., "Normothermic machine perfusion (NMP) inhibits proinflammatory responses in the liver and promotes regeneration," Hepatology, 2019, 70(2):682-695, 34 pages.
Kamiike et al., "Adenine nucleotide metabolism and its relation to organ viability in human liver transplantation," Transplantation, 1988, 45(1):138-143.
Kan et al., "Perfusion of medium with supplemented growth factors changes metabolic activities and cell morphology of hepatocyte-nonparenchymal cell coculture," Tissue Eng., Oct. 2004, 10(9-10):1297-307.
Karimian et al., "Ex Situ normothermic machine perfusion of donor livers," J. Vis. Exp., 2015, 99:e52688, 9 pages.
Katenz et al., "Cryopreservation of primary human hepatocytes: The benefit of trehalose as an additional cryoprotective agent," Liver Transplant., 2007, 13(1):38-45.
Kaufman et al., "Immunobiology in VCA," Transplant International, 2016, 29(6):644-654.
Koetting et al., "Donation After Cardiac Death: Dynamic Graft Reconditioning During or After Ischemic Preservation?," Artificial Organs, 2011, 35(6):565-571.
Kramer et al., "Differentiation between cell death modes using measurements of different soluble forms of extracellular cytokeratin 18," Cancer Res, 2004, 64(5):1751-6.
Kueckelhaus et al., "A Mobile Extracorporeal Extremity Salvage System for Replantation and Transplantation," Ann Plast Surg, 2016, 76(3):355-360.
Kueckelhaus et al., "Vascularized composite allotransplantation: current standards and novel approaches to prevent acute rejection and chronic allograft deterioration," Transpl Int, 2016, 29(6):655-662.
Kuiper et al., "The biological function of an insect antifreeze protein simulated by molecular dynamics," eLife, 2015, 4:e05142, 14 pages.
Laing et al., "The Use of an Acellular Oxygen Carrier in a Human Liver Model of Normothermic Machine Perfusion," Transplantation, 2017, 101(11):2746-2756.
Laing et al., "Viability testing and transplantation of marginal livers (VITTAL) using normothermic machine perfusion: study protocol for an open-label, nonrandomised, prospective, single-arm trial," BMJ Open, 2017, 7(11):e017733, 15 pages.
Lamming et al., "Hepatic signaling by the mechanistic target of rapamycin complex 2 (mTORC2)," FASEB J., 2014, 28(1):300-15, 16 pages.
Landin et al., "Perioperative ischemic injury and fibrotic degeneration of muscle in a forearm allograft: functional follow-up at 32 months post transplantation," Ann Plast Surg, 2011, 66:202-209.
Lanir et al., "Hepatic Transplantation Survival: Correlation with Adenine Nucleotide Level in Donor Liver," Hepatology, 1988, 8(3):471-475.
Layne et al., "Freeze duration influences postfreeze survival in the frog Rana sylvatica," J. Exp. Zool., 1998, 280(2):197-201.
Lee et al., "Metabolic Flux Analysis of Postburn Hepatic Hypermetabolism," Metabolic Engineering, 2000, 2:312-327.

(56) References Cited

OTHER PUBLICATIONS

Libbrecht, "Physical Dynamics of Ice Crystal Growth," Annu. Rev. Mater. Res., 2017, 47(1):7.1-7.25.
Lin and Carroll, "The effect of calcium and magnesium on frozen rat uteri, and the calcium content of uteri frozen by various procedures," Cryobiology, 1968, 5(2):105-108.
Liu and Green, "Endoplasmic reticulum stress and liver diseases," Liver Res., 2019, 3(1):55-64.
Lüer et al., "Role of oxygen during hypothermic machine perfusion preservation of the liver," Transplant International, 2010, 23(9):944-950.
Luu and Storey, "Solving Donor Organ Shortage with Insights from Freeze Tolerance in Nature: Activating endogenous antioxidant systems with non-coding RNA to precondition donor organs," BioEssays News Rev. Mol. Cell. Dev. Biol., 2018, 40(10):e1800092, 5 pages.
Manuchehrabadi et al., "Improved tissue cryopreservation using inductive heating of magnetic nanoparticles," Sci. Transl. Med., 2017, 9(379): eaah4586, 11 pages.
Martins et al., "The role of normothermic machine perfusion in liver transplantation," Int J Surg, 2020, 82(S):52-60, 9 pages.
Matton et al., "Biliary Bicarbonate, pH and Glucose are Suitable Biomarkers of Biliary Viability During Ex Situ Normothermic Machine Perfusion of Human Donor Livers," Transplantation, 2018, 103(7):1405-1413.
Matton et al., "Normothermic machine perfusion of donor livers without the need for human blood products," Liver Transpl, 2018, 24(4):528-538.
McCord, "Oxygen-derived free radicals in postischemic tissue injury," The New England Journal of Medicine, 1985, 312(3):159-163.
McCormack et al., "Use of Severely Steatotic Grafts in Liver Transplantation: A Matched Case-Control Study," Annals of Surgery, 2007, 246(6):940-948.
Mergental et al., "Transplantation of Declined Liver Allografts Following Normothermic Ex-Situ Evaluation," Am. J. Transplant. Off. J. Am. Soc. Transplant. Am. Soc. Transpl. Surg., 2016, 16(11):3235-3245.
Mergental et al., "Transplantation of discarded livers following viability testing with normothermic machine perfusion," Nat. Commun., 2020, 11:2939, 13 pages.
Michalopoulos and Bhushan, "Liver regeneration: biological and pathological mechanisms and implications," Nat. Rev. Gastroenterol. Hepatol., 2021, 18:40-55, 16 pages.
Minor et al., "Controlled Oxygenated Rewarming of Cold Stored Liver Grafts by Thermally Graduated Machine Perfusion Prior to Reperfusion," American Journal of Transplantation, 2013, 13(6):1450-1460.
Minor et al., "Fibrinolysis in organ procurement for transplantation after cardiocirculatory compromise," Thrombosis and Haemostasis, 2003, 90:361-362.
Mitchell et al., "Energy Metabolism Following Prolonged Hepatic Cold Preservation: Benefits of Interrupted Hypoxia on the Adenine Nucleotide Pool in Rat Liver," Cryobiology, 1999, 39(2):130-137.
Miyagi et al., "The Significance of Preserving the Energy Status and Microcirculation in Liver Grafts From Non-Heart-Beating Donor," Cell Transplantation, 2008, 17:173-178.
Monbaliu et al., "Preserving the Morphology and Evaluating the Quality of Liver Grafts by Hypothermic Machine Perfusion: A Proof-of-Concept Study Using Discarded Human Livers," Liver Transplantation, 2012, 18(12):1495-1507.
Moore et al., "Impact of Donor, Technical, and Recipient Risk Factors on Survival and Quality of Life After Liver Transplantation," Archives of Surgery, 2005, 140(3):273-277.
Moradi et al., "Artificial Blood Substitutes: First Steps on the Long Route to Clinical Utility," Clin Med Insights Blood Disord. 2016, 9:33-41.
Moss et al., "Observations on the effects of glycerol on the cold storage of the canine liver," J. Surg. Res., 1966, 6(4):147-151.
Mueller et al., "Caspase 3 inhibition improves survival and reduces early graft injury after ischemia and reperfusion in rat liver transplantation," Transplantation, 2004, 78(9):1267-73.
Mugnano et al., "Antifreeze glycoproteins promote intracellular freezing of rat cardiomyocytes at high subzero temperatures," Am. J. Physiol. Regul. Integr. Comp. Physiol., 1995, 269(2):R474-479.
Müller et al., "Ischemia/reperfusion injury of porcine limbs after extracorporeal perfusion," J Surg Res, 2013, 181(1):170-182.
Mundinger et al., "Infrared fluorescence imaging of lymphatic regeneration in nonhuman primate facial vascularized composite allografts," Ann Plast Surg, 2012, 68(3):314-319.
Murata and Tanaka, "Liquid-liquid transition without macroscopic phase separation in a water-glycerol mixture," Nat. Mater., 2012, 11:436-443.
Murata et al., "Superoxide dismutase mimetic m40401 reduces ischemia-reperfusion injury and graft coronary artery disease in rodent cardiac allografts," Transplantation, 2004, 78(8):1166-1171.
Nasralla et al., "A randomized trial of normothermic preservation in liver transplantation," Nature, 2018, 557(7703):50-56, 23 pages.
Nassar et al., "Ex Vivo Normothermic Machine Perfusion is Safe, Simple, and Reliable: Results From a Large Animal Model," Surg. Innov., 2015, 22:61-69, 10 pages.
Natori et al., "Apoptosis of sinusoidal endothelial cells occurs during liver preservation injury by a caspase-dependent mechanism," Transplantation, 1999, 68:89-96.
Natori et al., "The caspase inhibitor IDN-6556 prevents caspase activation and apoptosis in sinusoidal endothelial cells during liver preservation injury," Liver Transpl, 2003, 9(3):278-84.
Naullage et al., "Molecular Recognition of Ice by Fully Flexible Molecules," J. Phys. Chem. C, 2017, 121(48):26949-26957.
Nelson et al., "An improved ex vivo method of primary porcine hepatocyte isolation for use in bioartificial liver systems," European Journal of Gastroenterology & Hepatology, 2000, 12(8):923-930.
Nösser et al., "Development of a Rat Liver Machine Perfusion System for Normothermic and Subnormothermic Conditions," Tissue Eng. Part A, 2020, 26(1):57-65.
Ohman et al., "Activation of autophagy during normothermic machine perfusion of discarded livers is associated with improved hepatocellular function," Am J Physiol Gastrointest Liver Physiol., Jan. 2022, 322(1):G21-G33.
Okamoto et al., "Successful Sub-zero Non-freezing Preservation of Rat Lungs at -2° C. Utilizing a New Supercooling Technology," Journal of Heart and Lung Transplantation, 2008, 27(10):1150-1157.
Oltean et al., "Intraluminal polyethylene glycol stabilizes tight junctions and improves intestinal preservation in the rat," Am. J. Transplant. Off. J. Am. Soc. Transplant. Am. Soc. Transpl. Surg., 2012, 12(8):2044-2051.
Op den Dries et al., "Ex vivo Normothermic Machine Perfusion and Viability Testing of Discarded Human Donor Livers," American Journal of Transplantation, 2013, 13:1327-1335, 9 pages.
Op den Dries et al., "Hypothermic Oxygenated Machine Perfusion Prevents Arteriolonecrosis of the Peribiliary Plexus in Pig Livers Donated after Circulatory Death," PLoS One, 2014, 9;e88521, 10 pages.
OrganPreservationAlliance.org [online], "Building a Roadmap for Solving Organ Disease and Impairment," available on or before Feb. 29, 2016, via Internet Archive: Wayback Machine URL <http://web.archive.org/web/20160229102808/http://www.organpreservationalliance.org:80/roadmap/>, retrieved on Aug. 8, 2022, URL<retrieved on Aug. 8, 2022, retrieved from URL<http://www.organpreservationalliance.org:80/roadmap/>, 2 pages.
Orning and Lien, "Multiple roles of caspase-8 in cell death, inflammation, and innate immunity," J Leukoc Biol, 2020, 109:121-141.
Ott et al., "Solid-liquid phase equilibria in water + ethylene glycol," J. Chem. Thermodyn., 1972, 4:123-126.
Ozer et al., "The Effect of Ex Situ Perfusion in a Swine Limb Vascularized Composite Tissue Allograft on Survival up to 24 Hours," J Hand Surg Am, 2016, 41:3-12.
Panizo et al., "Ischemic injury in posttransplant endomyocardial biopsies: immunohistochemical study of fibronectin, " Transplant Proc, 1999, 31:2550-2551.

(56) References Cited

OTHER PUBLICATIONS

Pegg, "The relevance of ice crystal formation for the cryopreservation of tissues and organs," Cryobiology, 2010, 60(3 supp):S36-44.
Perk et al., "A fitness index for transplantation of machine-perfused cadaveric rat livers," BMC Research Notes, 2012, 5:325, 7 pages.
Perk et al., "A Metabolic Index of Ischemic Injury for Perfusion-Recovery of Cadaveric Rat Livers," PlOs One, 2011, 6(12): e28518, 11 pages.
Peter et al., "Hepatic Control of Perfusate Homeostasis During Normothermic Extrocorporeal Preservation," Transplantation Proceedings, 2003, 35(4):1587-1590.
QiagenBioinformatics.com [online], "Ingenuity Pathway Analysis," available on or before Feb. 21, 2019, via Internet Archive: Wayback Machine URL<http://web.archive.org/web/20190221071551/https://www.qiagenbioinformatics.com/products/ingenuity-pathway-analysis/>, retrieved on Aug. 8, 2022, URL<https://www.qiagenbioinformatics.com/products/ingenuity-pathway-analysis>, 4 pages.
Raigani et al., "Pumping new life into old ideas: Preservation and rehabilitation of the liver using ex situ machine perfusion," Artif Organs, 2020, 44(2):123-128, 6 pages.
Raigani et al., "Viability testing of discarded livers with normothermic machine perfusion: Alleviating the organ shortage outweighs the cost," Clin. Transplant., 2020, 34(11):e14069, 26 pages.
Ray, "Preserving the liver for transplantation," Nat. Rev. Gastroenterol. Hepatol., 2018, 15(6):327.
Reddy et al., "Non-Heart-Beating Donor Porcine Livers: the Adverse Effect of Cooling, " Liver Transplantation, 2005, 11(1):35-38.
Reddy et al., "Preservation of Porcine Non-Heart-Beating Donor Livers By Sequential Cold Storage and Warm Perfusion," Transplantation, 2004, 77(9):1328-1332.
Reiling et al., "Urea production during normothermic machine perfusion: Price of success?," Liver Transplant. Off. Publ. Am. Assoc. Study Liver Dis. Int. Liver Transplant. Soc., 2015, 21(5):700-703.
Rigo et al., Extracellular Vesicles from Human Liver Stem Cells Reduce Injury in an Ex Vivo Normothermic Hypoxic Rat Liver Perfusion Model. Transplantation., May 2018, 102(5):e205-10.
Ritchie et al., "*limma* powers differential expression analyses for RNA-sequencing and microarray studies," Nucleic Acids Res., 2015, 43(7):e47, 13 pages.
Robinson and Newsholme, "Some properties of hepatic glycerol kinase and their relation to the control of glycerol utilization," Biochem. J., 1969, 112(4):455-464.
Robinson et al., "edgeR: a Bioconductor package for differential expression analysis of digital gene expression data," Bioinformatics, 2010, 26(1):139-140.
Rubinsky et al., "The process of freezing and the mechanism of damage during hepatic cryosurgery," Cryobiology, 1990, 27(1):85-97.
Sakaguchi et al., "Preservation of Myocardial Function and Metabolism at Subzero Nonfreezing Temperature Storage of the Heart," The Journal of Heart and Lung Transplantation, 1996, 15(11):1101-1107, 8 pages.
Sanders et al., "The effect of rapamycin on DNA synthesis in multiple tissues from late gestation fetal and postnatal rats," Am. J. Physiol. Cell Physiol., 2008, 295:C406-C413.
Schlegel and Dutkowski, "Letter to editor: repair or prevent: what is the real impact of normothermic machine perfusion in liver transplantation?," Hepatology, 2019, 70(6):2231-2232, 4 pages.
Schlegel et al., "Hypothermic oxygenated perfusion (HOPE) protects from biliary injury in a rodent model of DCD Liver transplantation," Journal of Hepatology 59:984-991 (2013).
Searle et al., "Chromatogram libraries improve peptide detection and quantification by data independent acquisition mass spectrometry, " Nat. Commun., 2018, 9:5128, 12 pages.
Selzner et al., "Normothermic ex vivo liver perfusion using steen solution as perfusate for human liver transplantation: First North American results," Liver Transplant. Off. Publ. Am. Assoc. Study Liver Dis. Int. Liver Transplant. Soc., 2016, 22:1501-1508.

Serracino-Inglott et al., "Hepatic ischemia-reperfusion injury," The American Journal of Surgery, 2001, 181:160-166.
Shannon et al., "Cytoscape: a software environment for integrated models of biomolecular interaction networks," Genome Res., 2003, 13(11):2498-504.
Shen et al., "Decreased hepatocyte autophagy leads to synergistic IL-Iβ and TNF mouse liver injury and inflammation," Hepatology, 2020, 72:595-608, 31 pages.
Shigeta et al., "Impact of Rewarming Preservation by Continuous Machine Perfusion: Improved Post-Transplant Recovery in Pigs," Transplantation Proceedings, 2013, 45(5):1684-1689.
Soltys et al., "Successful Nonfreezing, Subzero Preservation of Rat Liver with 2,3-Butanediol and Type I Antifreeze Protein," Journal of Surgical Research, 2001, 96(1):30-34.
Sosa et al., "Early cytokine signatures of ischemia/reperfusion injury in human orthotopic liver transplantation," JCI Insight, 2016, 1:e89679, 17 pages.
Spahn, "Blood substitutes. Artificial oxygen carriers: perfluorocarbon emulsions," Crit Care., 1999, 3(5):R93-R97.
Spindler et al., "Dimethyl sulfoxide and ethylene glycol promote membrane phase change during cryopreservation," Cryo Lett., 2011, 32(2):148-157.
Sridharan et al., "Metabolomic Modularity Analysis (MMA) to Quantify Human Liver Perfusion Dynamics," Metabolites, 2017, 7(4):e58, 18 pages.
SRTR.org [online], "Organ Procurement Organization (OPO) Reports," Jan. 2020, retrieved on Aug. 9, 2022, retrieved from URL<https://www.srtr.org/reports/opo-specific-reports/>, 6 pages.
St Peter et al., "Extended preservation of non-heart-beating donor livers with normothermic machine perfusion," British Journal of Surgery, 2002, 89(5):609-616.
Storey et al., "Cryomicroscopic analysis of freezing in liver of the freeze-tolerant wood frog," Am. J. Physiol. Regul. Integr. Comp. Physiol., 1992, 263:R185-R194.
Storey et al., "Molecular Biology of Freezing Tolerance," Comprehensive Physiology, Jul. 2013, 3:1283-1308.
Storey, "Living in the Cold: Freeze-Induced Gene Responses in Freeze-Tolerant Vertebrates," Clin. Exp. Pharmacol. Physiol., 1999, 26:57-63.
Sutton et al., "Criteria for viability assessment of discarded human donor livers during ex vivo normothermic machine perfusion," PLoS One, 2014, 9(11):e110642, 10 pages.
't Hart et al., "Determination of an adequate perfusion pressure for continuous dual vessel hypothermic machine perfusion of the rat liver," Transpl. Int., Apr. 2007, 20(4):343-352.
Taylor and Pegg "The effect of ice formation on the function of smooth muscle tissue stored at -21 or - 60 ° C.," Cryobiology, 1983, 20(1):36-40.
Taylor et al., "New Approaches to Cryopreservation of Cells, Tissues, and Organs," Transfus. Med. Hemotherapy, 2019, 46(3):197-215.
Taylor et al., "Twenty-Four Hour Hypothermic Machine Perfusion Preservation of Porcine Pancreas Facilitates Processing for Islet Isolation," Transplantation Proceedings, 2008, 40:480-482.
Tessier et al., "Effect of Ice Nucleation and Cryoprotectants during High Subzero-Preservation in Endothelialized Microchannels," ACS Biomater. Sci. Eng., 2018, 4(8):3006-3015, 25 pages.
Tolboom et al., "A Model for Normothermic Preservation of the Rat Liver," Tissue Engineering, 2007, 13(8):2143-2151.
Tolboom et al., "Recovery of Warm Ischemic Rat Liver Grafts by Normothermic Extracorporeal Pefusion," Transplantation, 2009, 87(2):170-177.
Tolboom et al., "Sequential cold storage and normothermic perfusion of the ischemic rat liver," Tranplantation Proceedings, 2008, 40(5):1306-1309.
Tolboom et al., "Subnormothermic Machine Perfusion at Both 20° C. and 30° C. Recovers Ischemic Rat Livers for Successful Transplantation," Journal of Surgical Research, 2012, 175(1):149-156.
Troutman, "Hypothermic Machine Perfusion of Composite Tissues," Thesis for the degree of Master of Science, Virginia Polytechnic Institute and State University, Nov. 2017, 62 pages.

(56) References Cited

OTHER PUBLICATIONS

Ulusal et al., "Heterotopic hindlimb allotransplantation in rats: an alternative model for immunological research in composite-tissue allotransplantation," Microsurgery, 2005, 25(5):410-414.
Urbańczyk et al., "Antifreeze glycopeptides: from structure and activity studies to current approaches in chemical synthesis," Amino Acids, 2017, 49(2):209-222.
Usta et al., "Supercooling as a Viable Non-Freezing Cell Preservation Method of Rat Hepatocytes," PLoS One, 2013, 8(7):69334, 15 pages.
Uygun et al., "Diluted blood reperfusion as a model for transplantation of ischemic rat livers: alanine aminotransferase is a direct indicator of viability," Transplant. Proc., 2010, 42(7):2463-2467.
Vairetti et al., "Correlation Between the Liver Temperature Employed During Machine Perfusion and Reperfusion Damage: Role of Ca2+," Liver Transplantation, 2008, 14(4):494-503.
Vajdová et al., "ATP-Supplies in the Cold-Preserved Liver: A Long-Neglected Factor of Organ Viability," Hepatology, 2002, 36(6):1543-1552.
Vajdová et al., "Cold-Preservation-Induced Sensitivity of Rat Hepatocyte Function to Rewarming Injury and Its Prevention by Short-Term Reperfusion," Hepatology, 2000, 32(2):289-296.
Van den Ende, "Multifunctional fructans and raffinose family oligosaccharides," Front. Plant Sci., 2013, 4:247, 11 pages.
Van der Plaats et al., "The Groningen Hypothermic Liver Perfusion Pump: Functional Evaluation of a New Machine Perfusion System," Annals of Biomedical Engineering, 2006, 34(12):1924-1934.
Van Leeuwen et al., "Transplantation of high-risk donor livers after ex situ resuscitation and assessment using combined hypo- and normothermic machine perfusion: a prospective clinical trial," Ann. Surg., 2019, 270(5):906-914.
Van Rijn et al., "DHOPE-DCD Trial Investigators. Hypothermic machine perfusion in liver transplantation—a randomized trial," N. Engl. J. Med., 2021, 384(15):1391-1401, 12 pages.
Vodkin and Kuo, "Extended criteria donors in liver transplantation," Clin. Liver. Dis., 2017, 21(2):289-301, 13 pages.
Vollmar et al., "In vivo quantification of ageing changes in the rat liver from early juvenile to senescent life," Liver, 2002, 22(4):330-341.
Warnecke et al., "Normothermic ex-vivo preservation with the portable Organ Care System Lung device for bilateral lung transplantation (Inspire): a randomised, open-label, non-inferiority, phase 3 study," Lancet Respir. Med., 2018, 6(5):357-367.
Watson and Jochmans, "From "Gut Feeling" to Objectivity: Machine Preservation of the Liver as a Tool to Assess Organ Viability," Curr. Transplant Reports, 2018, 5(1):72-81.
Watson et al., "Observations on the ex situ perfusion of livers for transplantation," Am. J. Transplant., 2018, 18(8):2005-2020.
Weng et al., "Molecular Dynamics at the Interface between Ice and Poly(vinyl alcohol) and Ice Recrystallization Inhibition," Langmuir, 2018, 34(17):5116-5123.
Weng et al., "Role of synthetic antifreeze agents in catalyzing ice nucleation," Cryobiology, 2018, 84:91-94.
Werner et al., "Ex Situ Perfusion of Human Limb Allografts for 24 Hours," Transplantation, 2017, 101:e68-e74.
Westerkamp et al., "Oxygenated Hypothermic Machine Perfusion After Static Cold Storage Improves Hepatobiliary Function of Extended Criteria Donor Livers," Transplantation, 2016, 100:825-835.
Wojcicki et al., "Biliary Tract Complications after Liver Transplantation: A Review," Digestive Surgery, 2008, 25(4):245-257.
Wolanczyk et al., "Ice nucleating activity in the blood of the freezetolerant frog, Rana sylvatica," Cryobiology, 1990, 27:328-335.
Wowk and Fahy, "Inhibition of bacterial ice nucleation by polyglycerol polymers," Cryobiology, 2002, 44(1):14-23.
Wowk et al., "Vitrification enhancement by synthetic ice blocking agents," Cryobiology, 2000, 40(3):228-236.
Xu et al., "Excorporeal Normothermic Machine Perfusion Resuscitates Pig DCD Livers with Extended Warm schemia," Journal of Surgical Research, 2012, 173(2):e83-e88.
Xu et al., "High-molecular-weight polyethylene glycol inhibits myocardial ischemia-reperfusion injury in vivo," J Thorac Cardiovasc Surg, 2015, 149(2):588-593.
Xu et al., "Modulating TRADD to restore cellular homeostasis and inhibit apoptosis," Nature, 2020, 587:133-138, 36 pages.
Yamada et al., "Tolerance in xenotransplantation," Curr. Op. Organ Transplant., 2017, 22(6):522-528, 7 pages.
Yeh and Uygun, "Increasing donor liver utilization through machine perfusion," Hepatology, 2019, 70:431-433, 6 pages.
Young et al., "Gene ontology analysis for RNAseq: accounting for selection bias," Genome Biol., 2010, 11(2):R14, 12 pages.
Zachariassen and Kristiansen, "Ice Nucleation and Antinucleation in Nature," Cryobiology, 2000, 41(4):257-279.
Zhai et al., "Ischaemia-reperfusion injury in liver transplantation-from bench to bedside," Nat. Rev. Gastroenterol. Hepatol., 2013, 10(2):79-89.
Zhao et al., "Cell-permeable Peptide Antioxidants Targeted to Inner Mitochondrial Membrane inhibit Mitochondrial Swelling, Oxidative Cell Death, and Reperfusion Injury," The Journal of Biological Chemistry, 2004, 279(33):34682-34690.
Zhu et al., "Lysosomal quality control of cell fate: a novel therapeutic target for human diseases," Cell Death Dis., 2020, 11(9):817, 13 pages.
BioInformatics.MDAnderson.org [online], "Mbatch," updated Sep. 22, 2023, retrieved on Nov. 20, 2023, retrieved from URL<bioinformatics.mdanderson.org/public-software/mbatch>, 2 pages.
Extended European Search Report in European Appln. No. 20752161.8, dated Mar. 9, 2023, 16 pages.

* cited by examiner

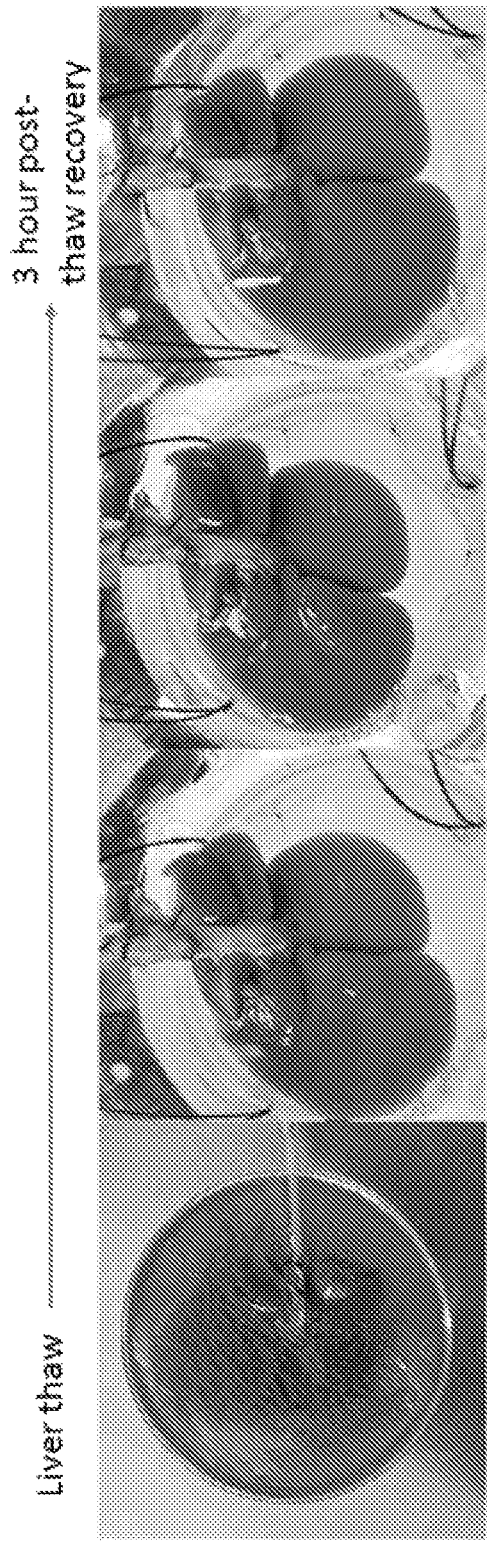
FIG. 17
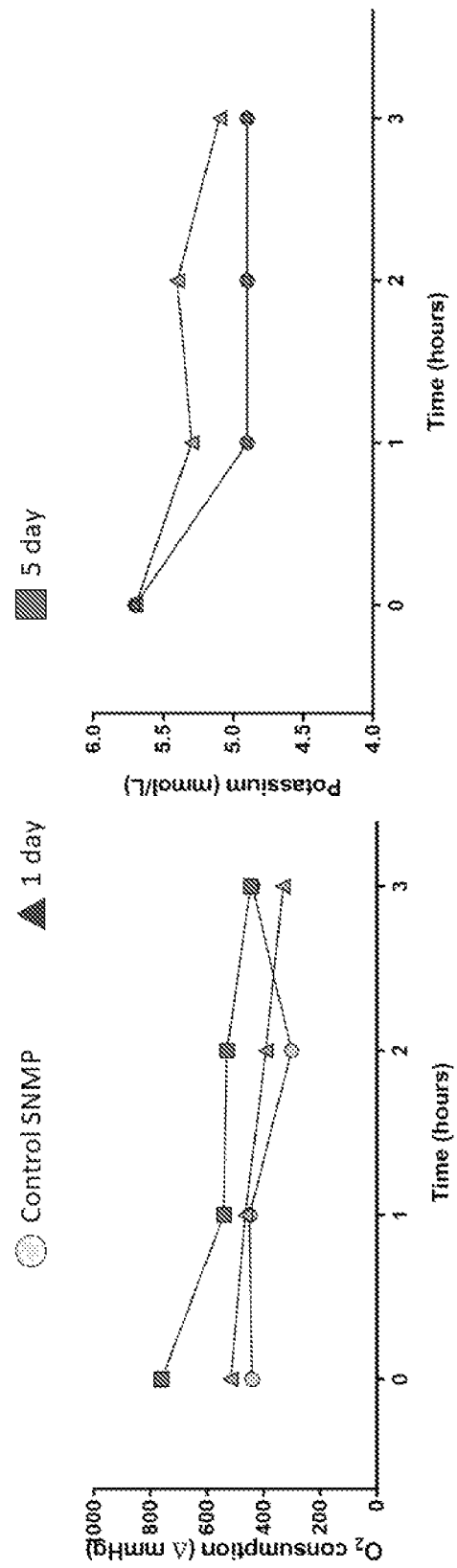
FIG. 18A
FIG. 18B

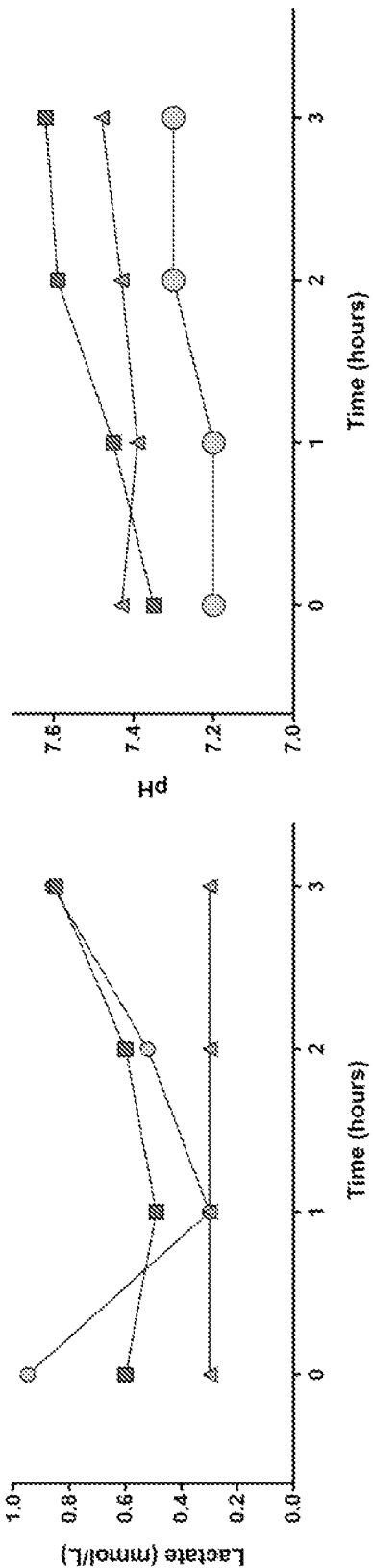

HIGH SUBZERO CRYOPRESERVATION

CLAIM OF PRIORITY

This application is the United States national phase of International Application No. PCT/US2018/0375256/14/2018 filed Jun. 14, 2018, and claims the benefit of U.S. Provisional Application Ser. No. 62/519,452, filed on Jun. 14, 2017 and U.S. Provisional Application Ser. No. 62/541,305, filed on Aug. 4, 2017. The entire contents of the foregoing applications are incorporated herein by reference.

STATEMENT OF FEDERALLY SPONSORED RESEARCH

This invention was made with government support under Grant No. W81XWH-21-C-0060 awarded by the Medical Research and Development Command, and Grant Nos. DK114506, AI124835, and EB023031 awarded by the National Institutes of Health. The government has certain rights in the invention.

TECHNICAL FIELD

This disclosure is related to methods of preserving biological samples, organs, and organisms.

BACKGROUND

Cell, tissue, and whole organ-based therapies have broad clinical and scientific importance. For the more established therapies already in routine clinic use such as transfusion medicine and transplantation, the magnitude of the impact is already significant; 21 million blood components are transfused every year in the U.S., while more than 50,000 hematopoietic stem cell transplants and 100,800 solid organ transplants are performed worldwide per year (Gratwohl, A. et al. Hematopoietic Stem Cell Transplantation A Global Perspective. JAMA J. Am. Med. Assoc. 2010, 303 (16), 1617-1624. At the same time, the fields of tissue engineering and regenerative medicine are rapidly advancing. From organs-on-chip to decellularized whole organs, these bold endeavors hold the promise of filling critical gaps in the availability of biologics for clinical purposes while also elevating biomedical research including drug development and disease modeling.

Considerable progress has been made in the development of effective bio-preservation and stabilization protocols (e.g., cryopreservation of cell lines); however, protocols of more complex systems have had limited success (Lewis et al. The Grand Challenges of Organ Banking: Proceedings from the First Global Summit on Complex Tissue Cryopreservation. Cryobiology 2016, 72 (2), 169-182). Current clinical standards for organ preservation use hypothermic storage (+4° C.); however, this method slows tissue deterioration only moderately. Conversely, vitrification—the transformation of a substance into a "glass" through extremely rapid freezing—holds great promise, but has several challenges. For example, vitrification faces limitations in larger tissues because during devitrification extremely high heating rates are required to inhibit the growth of crystalline structures and prevent fracturing. Moreover, vitrification requires high molarity cryoprotectants, which are not only highly toxic to cells, but also cause osmotic damage (Fahy et al. Cryopreservation of Complex Systems: The Missing Link in the Regenerative Medicine Supply Chain. Rejuvenation Res. 2006, 9 (2), 279-291).

The recent efforts in "supercooling" were designed to build on the current clinical standard, and results showed a tripling of the standard liver preservation duration due to high subzero storage temperatures (−6° C.) while retaining the preservation media in a liquid state (Berendsen et al. Supercooling Enables Long-Term Transplantation Survival Following 4 Days of Liver Preservation. Nat. Med. 2014, 20 (7), 790-793). However, there are issues in scale-up for clinical use: the supercooled state can be thermodynamically unstable, and the amount of liquid volume in human vital organs significantly increases the probability of freezing, as compared to organs of smaller research subjects.

Given these significant bottlenecks in dissemination of therapies already in routine use, matched with the rapid advancements of technology composed of extremely sensitive living material, there is a need for robust supportive networks focusing on preserving biologics from retrieval to user.

SUMMARY

This disclosure is related to methods of cryopreserving biological samples, organs, and organisms. This disclosure is based, at least in part, on the discovery that in the presence of heterogeneous extracellular ice, endothelial cells have improved attachment and viability after preservation, and particularly by uniformly nucleating ice across the microvasculature using ice nucleating agents, the chance of intracellular ice formation can be significantly reduced.

In one aspect, the disclosure is related to methods for cryopreserving a cell. The methods involve (a) incubating the cell in a loading solution comprising 3-O-methyl-D-glucopyranose (3-OMG) in a vessel; (b) perfusing the vessel with a storage solution; and (c) cooling the cell in the vessel to a temperature from −5° C. to −40° C., thereby partially freezing the vessel, wherein from about 5% to about 95% of the storage solution in the vessel is in solid state.

In some embodiments, the cell is a mammalian cell, and the method further comprises attaching the cell to the vessel.

In some embodiments, the vessel is coated with fibronectin.

In some embodiments, the cell is incubated at about 37° C.

In some embodiments, the temperature that is sufficient to partially freeze the vessel is from −5° C. to −10° C.

In some embodiments, the vessel is a capillary tube (e.g., a microcapillary tube).

In some embodiments, the loading solution comprises EBM-2 complete media and 3-OMG. In some embodiments, the storage solution comprises University of Wisconsin cold storage solution, wherein the University of Wisconsin cold storage solution comprises about 100 mM potassium lactobionate,
about 25 mM KH2PO4,
about 5 mM MgSO4,
about 30 mM raffinose,
about 5 mM adenosine,
about 3 mM glutathione,
about 1 mM allopurinol, and
about 50 g/L hydroxyethyl starch.

In some embodiments, the storage solution further comprises one or more cryoprotective agents, and an ice nucleator.

In some embodiments, the ice nucleator is InaZ of *Pseudomonas syringae*, and the one or more cryoprotective agents are selected from the group consisting of a sugar, glycerol, ethylene glycol, polyethylene glycol (PEG), 1,2-propanediol, trehalose, and dimethyl sulfoxide (DMSO).

In some embodiments, the storage solution further comprises trolox (6-hydroxy-2,5,7,8-tetramethylchroman-2-carboxylic acid), 3-O-methyl-D-glucopyranose, polyethylene glycol (PEG), and an ice nucleator.

In some embodiments, the storage solution further comprises glycerol and trehalose.

In some embodiments, the cell is cryopreserved for more than 50 hours. In some embodiments, the cell is cryopreserved for more than 70 hours.

In some embodiments, the cell is a human, porcine, murine, or bovine cell. In some embodiments, the cell is an oocyte, a sperm, a stem cell, an embryo, or a zygote. In some embodiments, the cell is an endothelial cell.

In another aspect, the disclosure features methods of partial freezing an organ. The methods involve perfusing the organ with a loading solution comprising 3-O-methyl-D-glucopyranose (3-OMG) at a temperature between about 8° C. and about 21° C.; perfusing the organ with a first storage solution comprising 3-OMG and a cryoprotectant at a temperature between about 4° C. and about 15° C.; perfusing the organ with a second storage solution comprising 3-OMG, a cryoprotectant, and glycerol at a temperature between about 4° C. and about 15° C.; and cooling the organ to a temperature between about −5° C. to about −40° C., thereby partially freeze the organ, wherein from about 1% to about 99% of the second storage solution in the organ is in solid state.

In some embodiments, the loading solution comprises 3-O-methyl-D-glucose. In some embodiments, the 3-O-methyl-D-glucose has a concentration of from 50 mM to 1.5 M. In some embodiments, the first storage solution comprises University of Wisconsin cold storage solution, 3-O-methyl-D-glucose, and a cryoprotectant.

In some embodiments, the cryoprotectant is PEG.

In some embodiments, the second storage solution comprises University of Wisconsin cold storage solution, 3-O-methyl-D-glucose, a cryoprotectant, and glycerol.

In some embodiments, the cryoprotectant is polyethylene glycol (PEG).

In some embodiments, the glycerol has a concentration of from about 5% to about 20% (v/v).

In some embodiments, the second storage solution further comprises an ice nucleator. In some embodiments, the second storage solution further comprises trehalose.

In some embodiments, the temperature that is sufficient to partially freeze the organ is from about −5° C. to about −40° C.

In some embodiments, the method further comprises perfusing the organ with a thawing solution. In some embodiments, the thawing solution comprises 3-O-methyl-D-glucose and a cryoprotectant.

In some embodiments, the method further comprises perfusing the organ with a recovery solution.

In some embodiments, the organ is a human organ. In some embodiments, the organ is a liver, a heart, or a kidney.

In one aspect, the disclosure also provides methods for cryopreserving and warming a biological sample. The methods involve perfusing the biological sample with a storage solution comprising magnetic iron oxide nanoparticles; cooling the biological sample to a temperature below −5° C.; and applying an alternating magnetic field to the biological sample.

In some embodiments, the biological sample is a human organ (e.g., a human liver, a human kidney).

In some embodiments, the temperature is below −40° C.

In some embodiments, the heating rate is equal to or greater than 10° C./minute.

As used herein, the term "cryopreserve" refers to the process of preserving samples (e.g., biological samples such as cells, tissues, organs, and organisms) by cooling them below 0° C.

As used herein, the term "high subzero cryopreservation" or "partial freezing" refers to the coexistence of two phases, solid and liquid, below the freezing point. During high subzero cryopreservation, ice crystals are largely restricted to extra-cell, extra-vasculature, or extra-organ spaces.

As used herein, the term "aqueous sample" refers to a sample comprising water. The aqueous sample can contain one or more biological samples (e.g., cells, tissue, organs, or organism). These biological samples can be suspended or submerged in the aqueous sample.

As used herein, the terms "cryoprotectant" and "cryoprotective agent" refer to a substance that prevents or reduces damage to cells during cryopreservation.

As used herein, the terms "ice nucleating agent" and "ice nucleator" refer to particles or materials that when added into an aqueous system can promote ice formation and initiate ice nucleation at a higher temperature than without the such particles or materials.

As used herein, the term "about" is used to provide a numerical range for a referenced number, wherein the numerical range covers ±10% of the referenced number. Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIG. 17 is a series of photos of a rat liver imaged after a 3 day storage duration in the partially frozen state, and then followed by subnormothermic machine perfusion (SNMP) over a period of three hours.

FIGS. 18A-18D are a series of graphs that show oxygen consumption, potassium level, lactate level, and pH of livers during SNMP. Circles represent the unfrozen control, and the 1 and 5 days stored livers were presented by triangles and squares respectively. All livers were stored in the presence of ice at −6° C. using the protocol as described herein.

DETAILED DESCRIPTION

Cryopreservation is of significance in areas including tissue engineering, regenerative medicine, and organ transplantation. The present disclosure provides methods for cryopreserving a cell (e.g., a mammalian cell). The methods involve incubating the cell in a loading solution in a vessel (e.g., a capillary tube, a cryo-container, a cryovial bag, a flask, a petri dish, or a multi-well plate); perfusing/immersing the vessel with a storage solution; and cooling the cell in the vessel to a temperature that is sufficient to partially freeze the vessel, wherein from about 5% to about 95% of the storage solution in the vessel is in solid state.

Figure 1B:
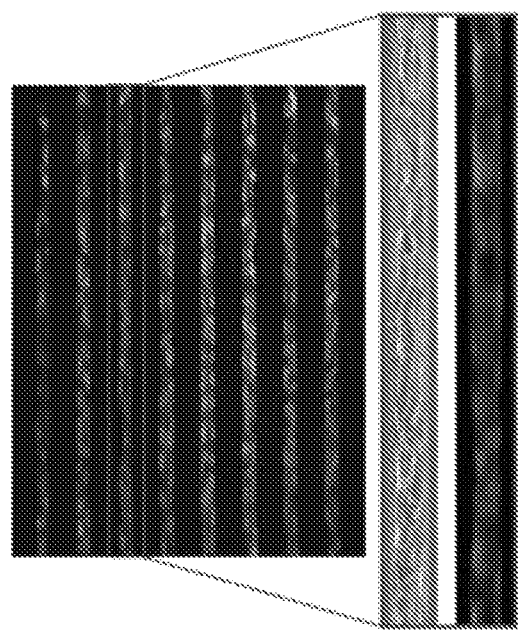
FIG. 1B is a pair of microscope images of microcapillaries coated with endothelial cells and stained/imaged (shown are bright field and fluorescent images using a 10× objective).
Figure 1A:
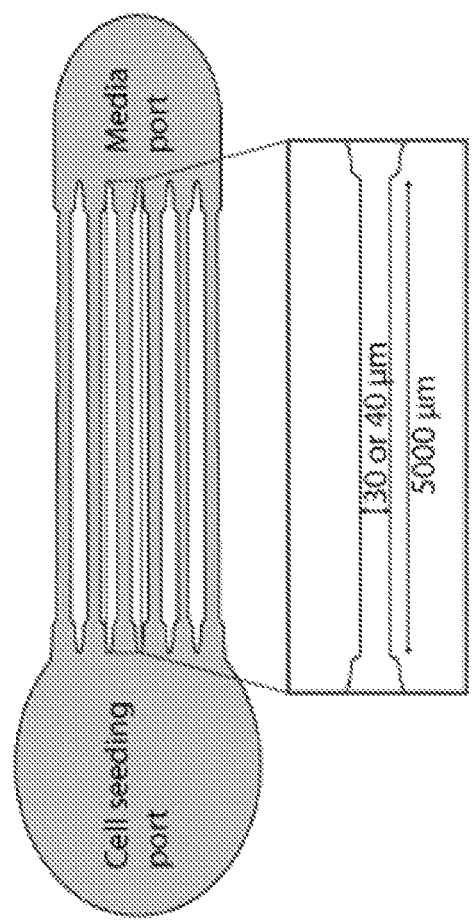
FIG. 1A is a schematic illustration of an engineered capillary constriction device.
Figure 2A:
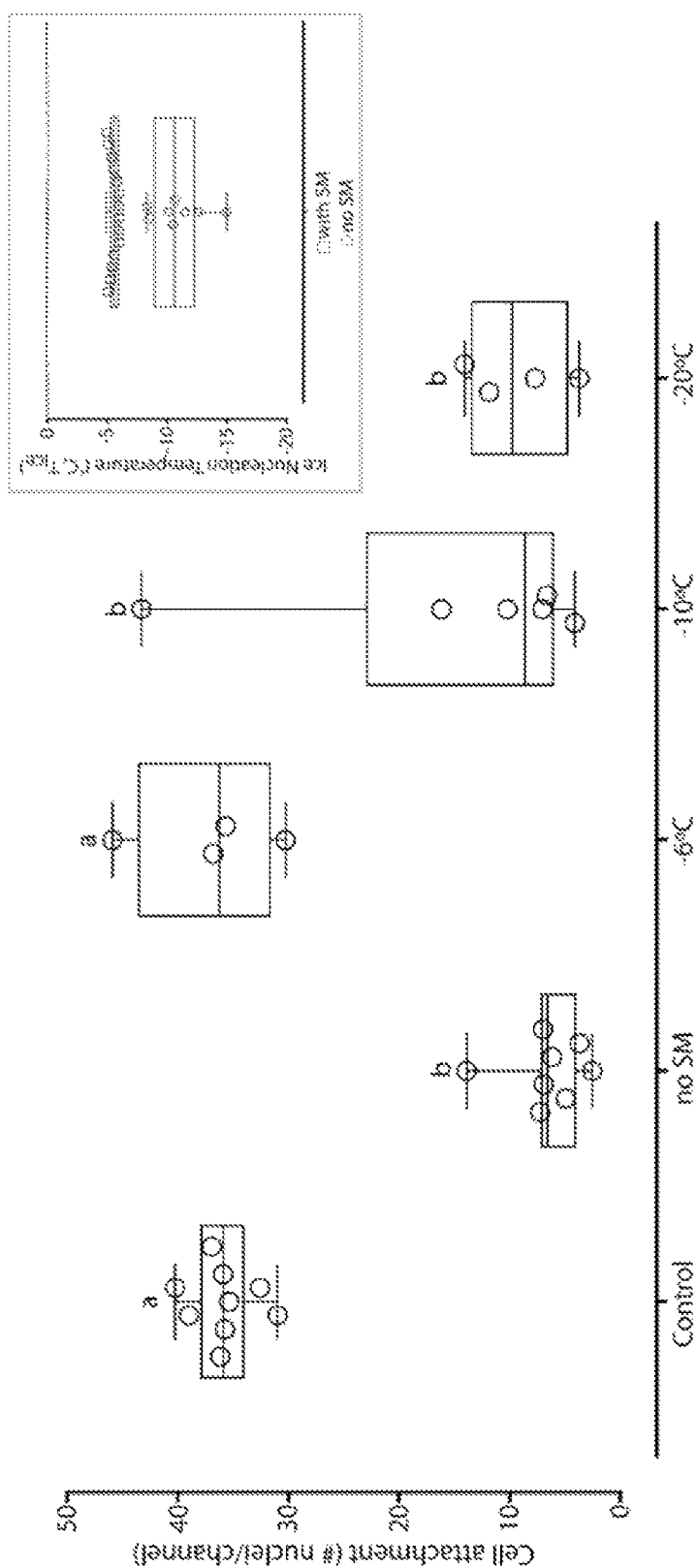
FIG. 2A is a graph of cell attachment expressed as box-and-whiskers plots showing median, interquartile range, maxima/minima, and all individual data points (n=4-5) for control (no freeze/thaw), no Snomax® ("no SM"), and with Snomax ("with SM", 1 mg/mL), which were cooled to −6, −10, or −20° C. Corresponding ice nucleation temperature with and without Snomax are shown as an inset.
Figure 2B:
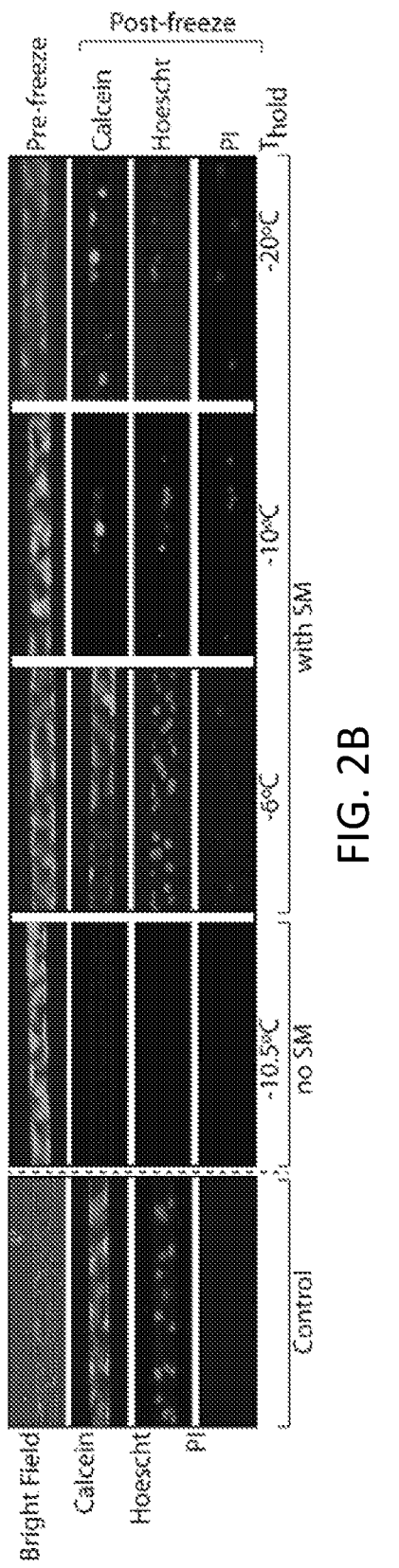
FIG. 2B is a series of microscope images of endothelial-cell lined microcapillaries before ("pre-freeze") and after ("post-freeze") a freeze-thaw cycle with or without Snomax® and at three holding temperatures including −6, −10, and −20° C. Images taken from the same channel are compared before ("pre-freeze") and after ("post-freeze") freeze/thaw.
Figures 20A, 20B:
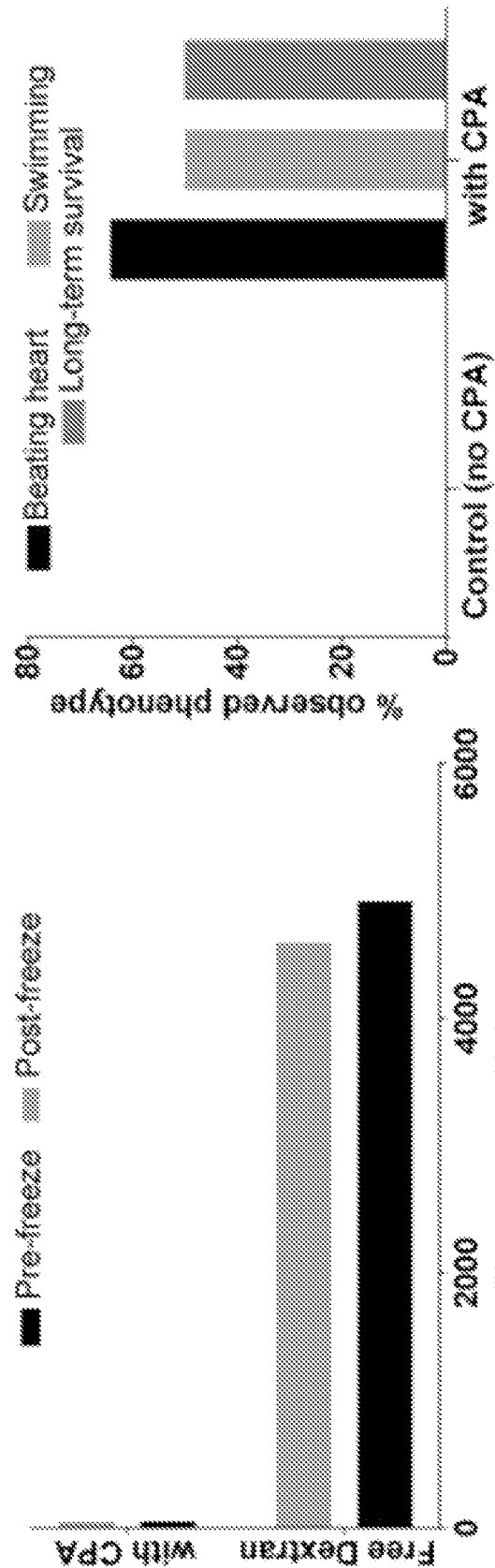
FIG. 20A is a bar graph that shows endothelial barrier function of zebrafish after being treated with a freeze-thaw cycle using the Linkam cryostage with or without cryoprotectant that was injected into the zebrafish circulatory system. A higher reading indicates loss of endothelial barrier function.
FIG. 20B is a bar graph showing phenotypes of zebrafish after being treated with a freeze-thaw cycle using the Linkam cryostage with or without cryoprotectant that was injected into the zebrafish circulatory system.

This protocol, which is called "partial freezing," was tested on a microfluidic capillary model that can simulate the in vivo structure of organs (FIG. 1A). The results suggest that the partial freezing strategy as described herein can significantly increase endothelial cell viability after preservation. By uniformly nucleating ice across the microvasculature using ice nucleating agents (e.g., Snomax®), osmotic stresses acting on endothelial cells and the chance of intracellular ice formation can be reduced (FIGS. 2A-2B). Both intracellular, e.g., 3-O-methyl-D-glucopyranose (3-OMG), and extracellular, e.g., polyethylene glycol (PEG) cryoprotectants are also important during storage (FIGS. 3A, 3B, 4A, 4B), and both endothelial cells (FIG. 5) and primary hepatocytes (FIG. 12) can be stored under these conditions. More specifically, the results show that in the presence of heterogeneous extracellular ice formation induced by ice nucleating bacteria, endothelial cells showed improved attachment at temperature minimums of −6° C. However, as temperatures decrease below −6° C., endothelial cells require additional cryoprotectants. The glucose analog, 3-O-methyl-d-glucose (3-OMG), rescued cell attachment optimally at 100 mM, while 2% and 5% polyethylene glycol (PEG) were equally effective at −10° C. (88 and 86.4% intact membranes). Finally, engineered capillaries were stored for 72 hours at −10° C. in a preservation solution comprising the University of Wisconsin (UW) solution, Snomax, 3-OMG PEG glycerol, and trehalose whereby cell attachment was not significantly different from unfrozen controls. The present disclosure shows that by controlling the ice nucleation temperature and uniformity, cell attachment and membrane integrity can be preserved. Further, the present disclosure applies the partial freezing technique to whole organs (FIG. 17) and organisms (FIGS. 20A-20B).

Partial Freezing of Biological Samples

Under normal atmospheric conditions, ice transitions to water at 0° C., i.e., the melting point. Nevertheless, the observed freezing temperature for pure water is usually below the melting point. Water in the liquid phase below the melting point is said to be "supercooled," and is intrinsically metastable and can spontaneously transform to lower-energy-level ice crystals through the formation of ice nuclei, which can be readily achieved by ice seeding.

The present disclosure provides an approach termed "high subzero cryopreservation" or "partial freezing" that can preserve biologic samples (e.g., cells, tissues, organs, or whole organisms) for days to months (e.g., greater than 3, 4, 5, 6, 7, 8, 9, 10, 20, or 30 days, greater than 1, 2, 3, 4, 5, or 6 weeks, or greater than 1, 2, 3, 4, 5, or 6 months). In some embodiments, the cryopreservation period is less than 3, 4, 5, 6, 7, 8, 9, 10, 20, or 30 days, less than 1, 2, 3, 4, 5, or 6 weeks, or less than 1, 2, 3, 4, 5, or 6 months.

"High subzero cryopreservation" or "partial freezing" refers to a state in which two phases, solid and liquid, coexist below the freezing point (0° C.). When the biological samples are partially frozen, as defined herein, the ice crystals are largely restricted to extra-cellular, extra-vasculature, and/or extra-organ spaces. As ice propagates in the extracellular space, it also pulls water from the intracellular environment resulting in cellular dehydration, which can depress metabolism. By coupling colder storage temperatures with cellular dehydration, the methods described herein can achieve unprecedented suppression of metabolic rate, well beyond the capability of other approaches.

Figure 11:
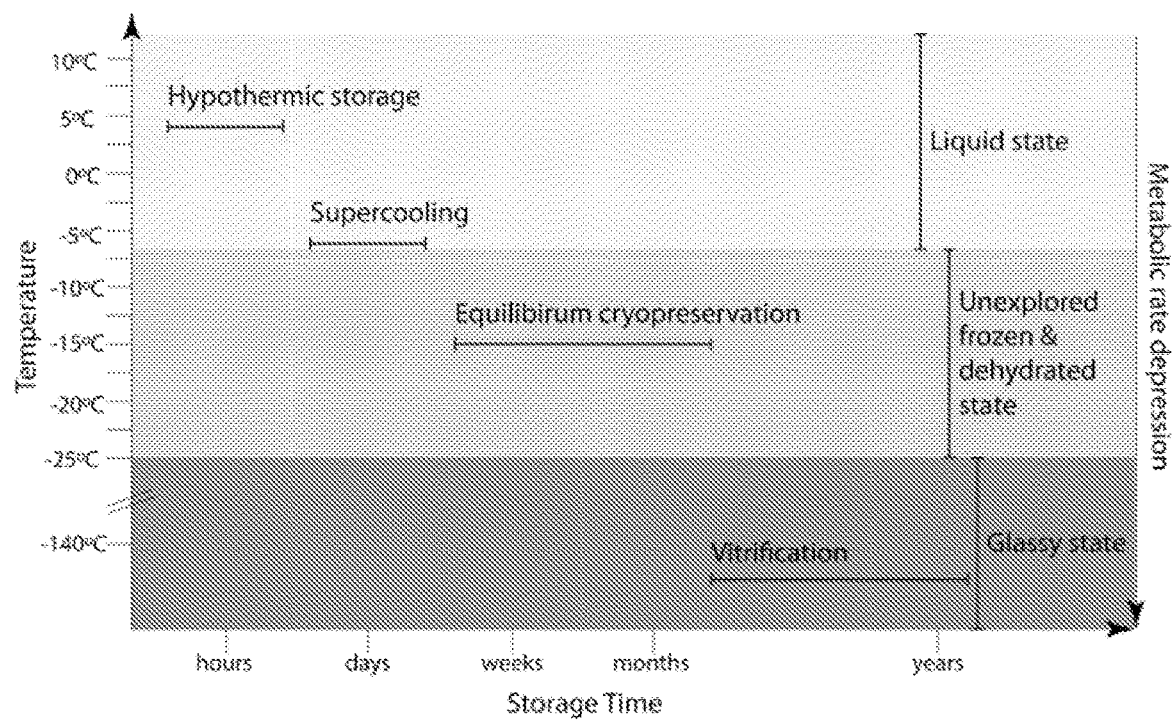
FIG. 11 is a schematic overview of the biological sample preservation strategies described herein.

Thus, the methods as described herein can achieve a thermodynamically stable, non-injurious frozen state at colder storage temperatures than can be realized with supercooling, while also avoiding the extensive challenges of vitrification approaches (FIG. 11). Particularly, in this protocol, instead of attempting to avoid ice crystallization (e.g., by supercooling or vitrification), the presence of ice is embraced. The protocol can thus utilize a temperature range, e.g., as low as −40° C., that was not explored before.

The present disclosure provides methods for preserving a biological sample. The methods involve contacting, perfusing, and/or submerging the biological sample with a loading solution, a storage solution, or any other solutions as described herein, and cooling the biological sample to a temperature that partially freezes the biological sample.

The cooling rate for cryopreservation can also vary. In some embodiments, the cooling can be at a rate of <50° C./minute, e.g., <20° C./minute, <10° C./minute, <9° C./minute, <8° C./minute, <7° C./minute, <6° C./minute, <5° C./minute, <4° C./minute, <3° C./minute, <2° C./minute, <1° C./minute, <0.9° C./minute, <0.8° C./minute, <0.7° C./minute, <0.6° C./minute, <0.5° C./minute, <0.4° C./minute, <0.3° C./minute, <0.2° C./minute, or <0.1° C./minute. In some embodiments, the cooling rate is about 1° C./minute.

In some embodiments, the cryopreservation temperature is below −4° C., e.g., below −5° C., −6° C., −7° C., −8° C., −9° C., −10° C., −11° C., −12° C., −13° C., −14° C., −15° C., −16° C., −17° C., −18° C., −19° C., −20° C., −21° C., −22° C., −23° C., −24° C., −25° C., −26° C., −27° C., −28° C., −29° C., −30° C., −31° C., −32° C., −33° C., −34° C., −35° C., −36° C., −37° C., −38° C., −39° C., or −40° C.

In some embodiments, the cryopreservation temperature is above −20° C., e.g., above −6° C., −7° C., −8° C., −9° C., −10° C., −11° C., −12° C., −13° C., −14° C., −15° C., −16° C., −17° C., −18° C., −19° C., or −20° C.

The methods described herein can preserve the biological sample for various time periods, for example, for more than 1, 2, 3, 4, 5, 6, or 7 days, or for more than 1, 2, 3, 4, 5, or 6 months, or even longer. In some embodiments, the period is less than 1, 2, 3, 4, 5, 6, or 7 days, or less than 1, 2, 3, 4, 5, or 6 months.

As used herein, a biological sample can be or include an organism (e.g., eukaryotic or prokaryotic organisms), a cell, a tissue sample, an organ, blood (e.g., whole blood), liposomes, oncosomes, exosomes, microvesicles, or other extracellular vesicle. In some embodiments, the biological sample can be or include bacteria, virus, parasites, or other microbes. The biological sample can also contain macromolecules and macromolecular complexes such as nucleic acids (e.g., DNA, RNA, PNA, LNA, mRNA, or microRNA), proteins, metabolites, and/or lipids, and combinations thereof (e.g., protein/DNA or protein/RNA complexes). In some embodiments, the biological sample can be or include antibodies, or vaccines.

In some embodiments, the biological samples can include eukaryotic, e.g., mammalian, cells. The methods described herein can be used for the preservation of any type and any species of mammalian cells. For example, the methods can be used to cryopreserve oocytes or sperm in assisted reproductive technology for human or animal patients, or for human or animal patients undergoing chemotherapy or radiation therapy. The methods can also be used for cryopreserving stem cells, such as embryonic stem cells, or other cells, which can then be used for stem cell-based therapies, cell transplantation, tissue engineering, and regenerative medicine. The methods can also be used to cryopreserve oocytes or sperm from an animal that is rare or at risk of becoming extinct for future use in assisted reproductive technologies for the preservation of the species. The methods can further be used for animal husbandry purposes (e.g., the breeding and raising of animals), for example, for the preservation of embryonic stem cells, gametocytes, oocytes, or sperm from animals such as cows, pigs, horses, sheep, chickens, cats, dogs, rodents, monkeys, and apes.

Cell types that can be cryopreserved using the methods of the present disclosure include, for example, differentiated cells, such as epithelial cells, cardiomyocytes, neural cells, epidermal cells, keratinocytes, hematopoietic cells, melanocytes, chondrocytes, B-cells, T-cells, erythrocytes, macrophages, monocytes, fibroblasts, lymphocytes, or muscle cells; and undifferentiated cells, such as embryonic, mesenchymal, or adult stem cells. Additional cell types that can be cryopreserved using the methods of the disclosure include gametocytes, oocytes, sperm, zygotes, and embryos. Other cells include those from the bladder, brain, esophagus, fallopian tube, heart, intestines, gallbladder, kidney, liver, lung, ovaries, pancreas, prostate, spinal cord, spleen, stomach, testes, thymus, thyroid, trachea, ureter, urethra, or uterus.

The cells can be from humans or non-human mammals, birds, fish, or reptiles, for example Cercopithecoidea family, Hominoidea superfamily, *Canis familiaris, Felis catus, Cricetidae* spp., *Equus* spp. (e.g., *Equus caballus, Equus assinns*), Equidae family, *Bos taurus, Bos indicus*, Bovidae family, Camelidae family, *Bubalus bubalis, Capra aegagrus hircus*, Cervidae family, Cervinae family, *Ovis aries, Ovis canadensis, Capra hircus, Sus scrofa domestica, Mesocricetus* spp., *Mustela vison, Cavia porcellus, Meriones unguiculatus, Chinchilla laniger, Rattus norvegicus, Rattus* spp., *Mus musculus*, Leporidae family, *Oryctolagus cuniculus, Kobus* spp., *Gallus* spp., *Meleagria gallopavo*, Anatidae spp., *Mustela putorius, Columba domestica, Columba livia, Numida meleagris, Ornithorhynchus anatinus, Pavo cristatus, Bison* spp., *Struthio* spp., *Lama glama, Rhea* spp., *Dromiceius* spp., *Lama pacos, Rangifer tarandus, Bos grunniens, Camelus bactrianus, Camelus dromedarius*, and any endangered or threatened species (e.g., those species identified by the U.S. Fish and Wildlife Service (USFWS) Threatened and Endangered Species System (TESS)).

The disclosure also provides methods of preserving an organ. The methods can include the steps of perfusing, contacting, or immersing the organ with the loading solution or the storage solution as described herein, and partially freeze the organ. Methods of perfusing an organ are known in the art. For example, perfusion can be performed by pouring over or through the arteries or veins of the organ. In some embodiments, a perfusion device (e.g., a pump or injector) can be used. Alternatively or in addition, the organ can also be immersed within the loading solution or the storage solution.

The disclosure also provides methods of preserving an organism. The methods include the steps of contacting, or immersing the organism with the solutions as described herein, and partially freeze the organism. The organism can be, e.g., viruses, bacteria, fungi, invertebrates (e.g., insects), fish (e.g., zebrafish), or reptiles.

The methods as described herein can also improve the outcome (e.g., viability) of preservation of biological samples. The cells, organs, or organisms are prepared for preservation using techniques known in the art and described herein. In some embodiments, the cells (e.g., the mammalian cells), organs, or organisms are obtained using art known techniques and maintained in media appropriate for the biological samples.

During the partial freezing, from about 5% to about 95% of the solution (e.g., storage solution) is in the solid state (also known as the solid phase). For example, from about 1% to about 99%, from about 5% to about 95%, from about 10% to about 90%, from about 20% to about 80%, from about 30% to about 70%, from about 40% to about 60% of the solution is in the solid state. In some embodiments, from about 1% to about 99%, from about 5% to about 95%, from about 10% to about 90%, from about 20% to about 80%, from about 30% to about 70%, from about 40% to about 60% of the solution is in the liquid state (also known as the liquid phase). In some embodiments, at least 1%, 2%, 3%, 4%, 5%, 10%, 20%, 30%, 40%, 50%, 60%, 70%, 80%, or 90% of the solution is in the solid state. In some embodiments, at least 1%, 2%, 3%, 4%, 5%, 10%, 20%, 30%, 40%, 50%, 60%, 70%, 80%, or 90% of the solution is in the liquid state.

Partial Freezing Cells

The present disclosure provides methods of cryopreserving biological samples (e.g., endothelial cells) in capillary tubes while maintaining cell attachment and membrane integrity in a microvasculature model at high subzero temperatures in the presence of extracellular ice.

In some embodiments, the methods involve incubating one or more cells (e.g., mammalian cells) in a culture solution (e.g., a loading solution as described herein) in a vessel; perfusing the vessel with a storage solution; and cooling the cell in the vessel to a temperature that partially freezes the vessel, thereby cryopreserving the cell.

In some embodiments, the cells are incubated at from 20° C. to 40° C. (e.g., about 20, 21, 22, 23, 24, 25, 26, 27, 28, 29, 30, 31, 32, 33, 34, 35, 36, 37, 38, 39, or 40° C.)

In some embodiments, the temperature that partially freezes the vessel is from −5° C. to −40° C. (e.g., lower than −5, −6, −7, −8, −9, −10, −11, −12, −13, −14, −15, −16, −17, −18, −19, or −20° C., or higher than −10, −11, −12, −13, −14, −15, −16, −17, −18, −19, −20, −21, −22, −23, −24, −25, −26, −27, −28, −29, −30, −31, −32, −33, −34, −35, −36, −37, −38, −39, or −40° C.). In some embodiments, the temperature is about −5, −6, −7, −8, −9, or −10° C.

In some embodiments, the vessel is a capillary tube (e.g., a microcapillary tube), a cryo-container, a cryovial bag, a flask, a petri dish, or a multi-well plate. In some embodiments, the vessel is coated with fibronectin. In some embodiments, the cells are attached to the vessel.

The culture solution can any loading solution as described herein or any cell culture solution comprising 3-O-methyl-D-glucopyranose (3-OMG). In some embodiments, the concentration of 3-OMG can be higher than 50 mM, 100 mM, 200 mM, 300 mM, 400 mM, 500 mM, 600 mM, 700 mM, 800 mM, 900 mM, 1 M. In some embodiments, the concentration of 3-OMG can be less than 50 mM, 100 mM, 200 mM, 300 mM, 400 mM, 500 mM, 600 mM, 700 mM, 800 mM, 900 mM, 1 M, or 1.5M.

The storage solution can be any storage solution as described herein. In some embodiments, the storage solution comprise a cold storage solution (e.g., University of Wisconsin cold storage solution). In some embodiments, the storage solution comprises a cryoprotective agent, and an ice nucleator (e.g., Snomax). The cryoprotective agent can be a sugar, glycerol, ethylene glycol, 1, 2-propanediol, and DMSO, among others. In some embodiments, the storage solution comprises Trolox, 3-OMG, polyethylene glycol (PEG), glycerol, and/or an ice nucleator.

The cell can be cryopreserved for weeks, e.g., more than 10 hours, 20 hours, 30 hours, 40 hours, 50 hours, 60 hours, 70 hours, 80 hours, 90 hours, or 100 hours. In some embodiments, the cell can be cryopreserved for extended periods of time (e.g., at least 5, 6, 7, 8, 9, or 10 days, at least 1, 2, 3, 4, or 5 weeks, or at least 1, 2, 3, 4, 5, or 6 months).

After the cryopreservation, the cells are still in good conditions. For example, more than 20%, 30%, 40%, 50%, 60%, 70%, 80%, 90%, or 95% of the cells (e.g., mammalian cells, endothelial cells) can be attached to the vessels (e.g., as compared to unfrozen controls or the cells attached to the vessels before the cryopreservation). In some embodiments, less than 1%, 2%, 3%, 4%, 5%, 6%, 7%, 8%, 9%, 10%, 20%, 30%, 40%, or 50% of cells are dead cells after the cryopreservation.

Tissue and Whole Organ Preservation

The disclosure also provides methods of preserving an organ-on-a-chip devices, tissues, or whole organ. As used herein, the term "organ-on-a-chip" refers to a type of artificial organ that comprises a multi-channel 3-D microfluidic cell culture chip that can simulate the activities, mechanics and physiological response of entire organs and organ systems.

The methods include the steps of perfusing, contacting, or immersing the organ-on-a-chip devices, tissues, or whole organ with compositions or formulations, and partial freezing the organ-on-a-chip devices, tissues, or whole organ with the composition or formulations. The methods of perfusing organ-on-a-chip devices, tissues, or whole organ is known in the art. For example, perfusion can be performed by pouring over or through the arteries or veins of the organ-on-a-chip devices, tissues, or whole organ. In some embodiments, a perfusion device can be used. The organ-on-a-chip devices, tissues, or whole organ can also be immersed within the compositions or formulations. The organ can be any organ of a eukaryote, e.g., of a mammal, e.g., a heart, lung, kidney, spleen, pancreas, or liver etc.

The present disclosure shows that endothelial damage can occur as a result of the loading process of high viscosity solutions, and high viscosity solutions can be important for the cryopreservation protocols.

In order to minimize damages caused by high viscosity solutions during the loading process, the preset disclosure provides a stepwise loading protocol. The methods can have three steps (FIG. 16): (1) "Loading 1" refers to the 3-OMG loading phase (e.g., loading solution) which is essential for intracellular delivery of 3-OMG. (2) "Loading 2" refers to the loading of a first storage solution (e.g., a UW base supplemented with PEG (2%) and 3-OMG). (3) "Loading 3" refers to the loading of the second storage solution (e.g., a UW base supplemented with PEG (2%) and 3-OMG in addition to 10% glycerol).

The first step involves perfusing an organ or the tissue with the loading solution comprising 3-O-methyl-D-glucopyranose (3-OMG). In some embodiments, the 3-OMG is loaded using the subnormothermic cocktail containing a William's E media base supplemented with heparin, hydrocortisone, insulin, etc. The first step can be performed at a subnormothermic temperature, e.g., between 4° C. and 37° C. (e.g., between 8° C. and 21° C.). In some embodiments, the duration of the first step can be greater than 30, 40, 50, 60, 70, 80, 90, or 100 minutes. In some embodiments, the duration of the first step can be smaller than 50, 60, 70, 80, 90, 100, 110, 120, 130, 140, or 150 minutes.

The second step involves perfusing the organ or the tissue with a first storage solution. In some embodiments, the first storage solution comprises University of Wisconsin solution, a cryoprotective agent (e.g., PEG), and 3-OMG. The second step can be performed at a subnormothermic temperature, e.g., between 4° C. and 15° C. (e.g., about 4, 6, 7, 8, 9, 10, 11, 12, 13, 14, or 15° C.). In some embodiments, the second step is performed about 8° C. In some embodiments, the duration of the second step can be greater than 30, 40, 50, 60, 70, 80, 90, or 100 minutes. In some embodiments, the duration of the second step can be smaller than 50, 60, 70, 80, 90, 100, 110, 120, 130, 140, or 150 minutes.

The third step involves perfusing the organ or the tissue with a storage solution comprising glycerol. In some embodiments, this storage solution comprises University of Wisconsin solution, a cryoprotective agent, 3-OMG, and glycerol. In some embodiments, the third step can be performed at a subnormothermic temperature, e.g., between 4° C. and 15° C. (e.g., about 4, 6, 7, 8, 9, 10, 11, 12, 13, 14, or 15° C.). In some embodiments, the third step is performed about 8° C. In some embodiments, the duration of the third step can be greater than 10, 20, 30, 40, 50, or 60 minutes. In some embodiments, the duration of the first step can be smaller than 40, 50, 60, 70, or 80 minutes. The second storage solution can have a relatively high concentration of glycerol (e.g., equal to or greater than 5%, 6%, 7%, 8%, 9%, or 10% (v/v)).

The solution with glycerol usually has relatively high viscosity. The stepwise loading process can minimize the cell damage as a result of loading high viscosity solutions. In some embodiments, less than 5%, 10%, 20%, 30%, 40%, 50%, 60%, 70%, or 80% of cells become damaged or dead in the loading process. In some embodiments, the stepwise loading process can maintain endothelial barrier function, e.g., at least 60%, 70%, 80%, 90%, 95%, or 99% of endothelial barrier function are maintained.

Once the loading process is completed, the temperature is then lowered to partially freeze the organ or the tissue. In some embodiments, the temperature that partially freeze the organ or the tissue is from −5° C. to −40° C. (e.g., lower than −5, −6, −7, −8, −9, −10, −11, −12, −13, −14, −15, −16, −17, −18, −19, or −20° C., or higher than −10, −11, −12, −13, −14, −15, −16, −17, −18, −19, −20, −21, −22, −23, −24, −25, −26, −27, −28, −29, −30, −31, −32, −33, −34, −35, −36, −37, −38, −39, or −40° C.). In some embodiments, the temperature is about −5, −6, −7, −8, −9, or −10° C.

The organs or the tissues can be cryopreserved at the temperature for at least 10 hours, 20 hours, 30 hours, 40 hours, 50 hours, 60 hours, 70 hours, 80 hours, 90 hours, or 100 hours, at least 1, 2, 3, 4, 5, 6, 7, 8, 9, 10, 20, or 30 days, or at least 1, 2, 3, 4, 5, or 6 months, while maintaining the proper function after the thawing and recovery process.

For the thawing and recovery process, the organ or the tissue can be first perfused with a thawing solution as described herein. In some embodiments, the thawing step can be performed at a temperature between −10° C. and 10° C. (e.g., from −8° C. and 4° C., or from −6° C. and 4° C.). In some embodiments, the duration of the thawing step can be greater than 10, 20, 30, 40, 50, or 60 minutes, or greater than 1, 2, 3, 4, or 5 hours. In some embodiments, the duration of the thawing step can be smaller than 5, 4, 3, 2, 1 hours, or smaller than 60, 50, 40, 30, or 20 minutes.

Then the organ can be perfused with a recovery solution. In some embodiments, the recovery step can be performed at a temperature between 4° C. and 37° C. (e.g., between 4° C. and 25° C., between 4° C. and 21° C., between 8° C. and 21° C.). In some embodiments, the duration of the recovery step can be greater than 60, 70, 80, 90, 100, 110, 120, 130, 140, 150, 160, 170, 180, 190, or 200 minutes. In some embodiments, the duration of the recovery step can be smaller than 100, 110, 120, 130, 140, 150, 160, 170, 180, 190, or 200 minutes.

Inside-out Rapid Rewarming

Figure 21:
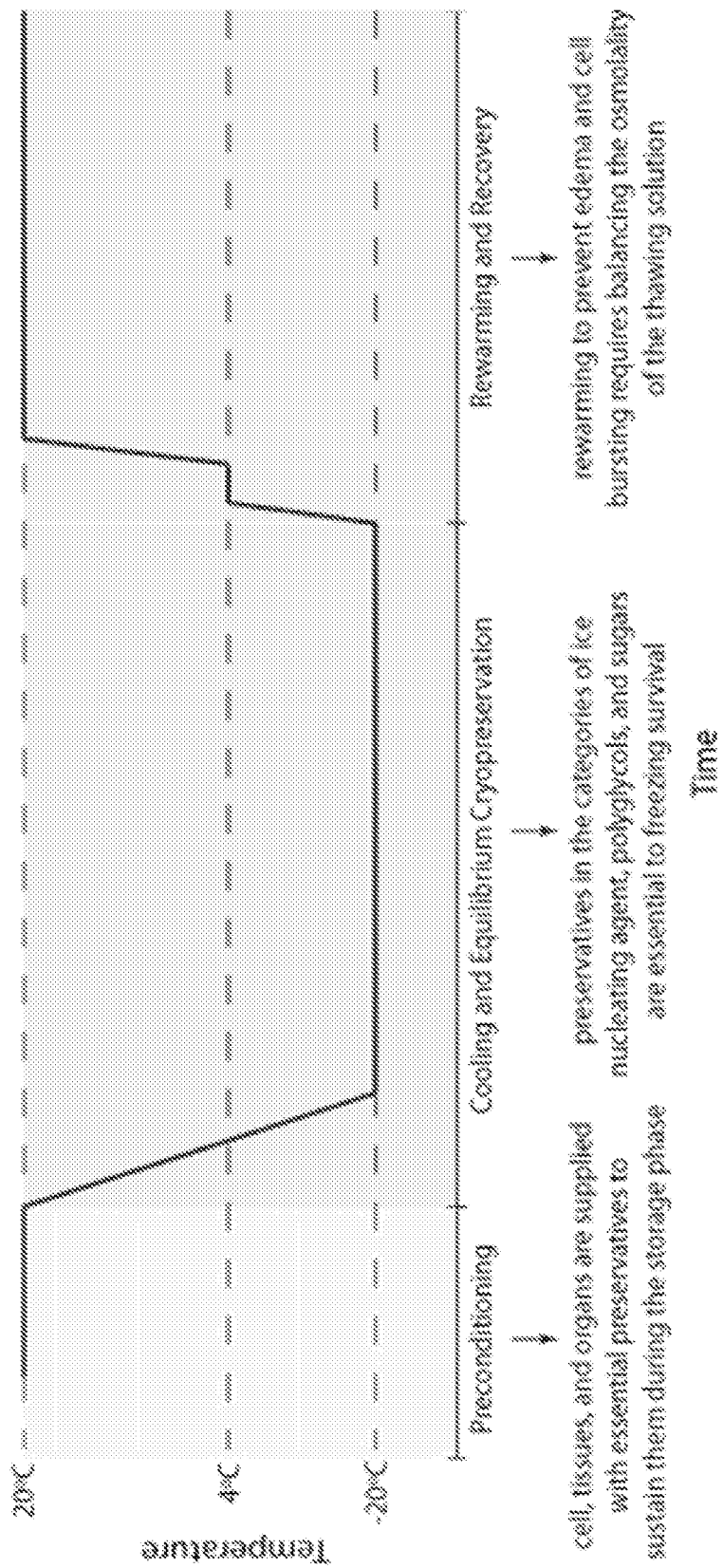
FIG. 21 is a schematic overview of a protocol as described herein that involves pre-conditioning, long-term storage at −20° C., and rewarming.

The biological sample preservation has several phases, as summarized in FIG. 21. Briefly, cells/tissues/organs are first exposed to a short preconditioning phase which provides a means to deliver essential preservatives to prepare cells for the upcoming high subzero preservation protocol. The second phase of the protocol involves cooling of biologics and supplementation of the freezing solution. In some embodiments, the freezing solution includes e.g., polyglycols, and/or polysaccharides, which are essential to surviving high subzero temperatures. The final phase of the protocol involves rewarming, which presents several additional challenges. Rewarming below the critical warming rate (CWR) causes recrystallization of ice which can have a devastating effect on cells and tissue architecture.

Fast convectional warming can successfully thaw high subzero cryopreservation of whole rat livers. Heat transfer through the relatively large surface area is sufficient to warm the relatively small mass of the rat liver, exceeding the CWR. However, fast convectional warming has shortcomings when upscaling to human sized organs due to its outside-in property. For example, the increased distance from the outside to the center of the organ results in non-homogenous warming with large thermal gradients. Also, the inside of the organ will still be frozen, while the outside is already thawed and metabolically active without support. Finally, when upscaling to human size, relatively more mass must be heated by a relatively smaller surface area.

The present disclosure provides "inside-out" warming techniques. In one aspect, magnetic iron oxide nanoparticles in the freezing solution can be excited in a low frequency, biocompatible, alternating magnetic field. In some embodiments, this method involves metallic, silica, polymeric or other nanoparticles, liposomes, nanotubes, quantum dots, drug conjugates, denderimer, nanodevices, etc.

In another aspect, two reactants can be encapsulated (e.g. water and calcium chloride) in e.g., liposomes, nanoparticles, or are encapsulated by any other encapsulation method. The two reactants are then released, and can produce an exothermic reaction which would rewarm from the inside-out.

Machine perfusion can also be used in inside-out warming techniques for the frozen organ. The basic principle is that if the organ is thawed outside in by convectional warming, the vasculature of the thawed tissue becomes available for machine perfusion, while the deeper tissue of the organ is still frozen. Machine perfusion provides metabolic support to the thawed tissue which otherwise would deteriorate during thawing of the deeper organ tissues. Also, the warm perfusate flow in the thawed superficial parts of the organ can increase the thawing rate of the deeper parts.

Viability of Cryopreserved Biological Samples

When desired, the cryopreserved biological samples of the disclosure can be warmed, using methods known in the art or described herein (e.g., inside-out rapid rewarming). Thus, the methods can further include the step of heating or warming the biological samples (e.g., cells, organs, or organisms).

The biological samples can be warmed or heated using any number of techniques known in the art, for example, by plunging the container (e.g., a tube) into a 1×PBS solution at 20-37° C., for example at room temperature, optionally with shaking and optionally supplemented with sugar or other CPAs. After warming, the biological samples (e.g., cells) are generally washed and treated as needed for the research or clinical applications. In some embodiments, the heating rate can be a rate of equal to or greater than 100° C./minute, 50° C./minute, 10° C./minute, 9° C./minute, 8° C./minute, 7° C./minute, 6° C./minute, 5° C./minute, 4° C./minute, 3° C./minute, 2° C./minute, or 1° C./minute.

There are various tests known in the art to determine the viability and function of the biological samples (e.g., cells) after warming and these tests are dependent on the types of biological samples. For example, for ES cells that are to be used for cell-based therapeutics, maintenance of pluripotency is very important. The pluripotency of the ES cells can be tested using art known methods, including, for example, Oct4-GFP expression, elevated alkaline phosphatase expression, and SSEA-I surface glycoprotein expression. The ability of cells to attach efficiently is another assay for the viability and usability of many cells. Attachment assays are known in the art and described herein. In some embodiments, more than 10%, 20%, 30%, 40%, 50%, 60%, 70%, 80%, 90%, or 95% of cells are viable (e.g., alive, and/or have normal cellular functions) after cryopreservation. In some embodiments, more than 10%, 20%, 30%, 40%, 50%, 60%, 70%, 80%, 90%, or 95% of cells can attach to the culture dish after cryopreservation.

Proliferation assays can also be used to determine if the attached cells can proliferate as expected after cryopreservation. Attachment and proliferation efficiency can be compared to control cells, which have not undergone cryopreservation. For cryopreservation of zygotes, cleavage rates can be determined after cryopreservation and compared to control groups to determine if there has been any cellular damage during the cryopreservation process. The viability of cells (e.g., red blood cells, or oocytes) can be determined by examination of the morphological characteristics of the cells following cryopreservation. In some embodiments, more than 10%, 20%, 30%, 40%, 50%, 60%, 70%, 80%, 90%, or 95% of cells have normal morphology after cryopreservation.

The assays for testing the viability, function, and usability of biological samples can also be used to test parameters for the cryopreservation methods described herein. For example, variations in the compositions (e.g., different cryoprotectants or cryoprotectant concentrations) can readily be tested on cells, and their effects on the viability, function, and usability of biological samples can be tested using any of the methods described herein or known in the art.

In the case of red blood cells, in some embodiments, the hemoglobin recovery rate can be used. In some embodiments, the hemoglobin recovery rate can be more than 10%, 20%, 30%, 40%, 50%, 60%, 70%, 80%, 90%, or 95% after cryopreservation by the methods as describe herein.

Loading, Storage, Thawing, and Recovery Solutions

The present disclosure provides various loading, storage, thawing, and recovery solutions that can be used in the methods as described herein.

These solutions can include a base media, e.g., William's E media (e.g., Sigma Aldrich, Catalog #W1878), Krebs-Henseleit perfusion buffer (e.g., Sigma, Catalog #K3753), Promo cell muscle media (e.g., Promocell, Catalog #C-23160), Claycomb media (e.g., Sigma #51800C), EBM-2 complete media (e.g., Lonza, Catalog #CC-3156), or University of Wisconsin (UW) cold storage solution, etc. The University of Wisconsin (UW) cold storage solution is considered the current golden standard solution for organ transplantation. It includes the following: 100 mM potassium lactobionate, 25 mM $KH_2PO_4$, 5 mM $MgSO_4$, 30 mM raffinose, 5 mM adenosine, 3 mM glutathione, 1 mM allopurinol, and 50 g/L hydroxyethyl starch.

These solutions can further have one, two, three, four, five or more than five cryoprotectants or cryoprotective agents (CPAs). Various cryoprotectants can be included in the loading, storage, thawing, and recovery solutions. These cryoprotectants include, e.g., sugar, polypropylene glycol, dimethylsulfoxide (DMSO), dextran, glycerol, sorbitol, propylene glycol, ethylene glycol, pyridine, 2-3 butane diol, hydroxyethyl starch, polyvinylpyrrolidone (PVP), proline (or other protein stabilizers), human serum albumin and combinations thereof. The sugar can also be any one of the following, e.g., sucrose, trehalose, raffinose, stachyose, fructose, and dextran. Exemplary sugars and the concentration ranges for such sugars are described in U.S. Pat. Nos. 6,673,607 and 7,094,601, herein incorporated by reference.

The cryoprotectant can be either membrane-permeable or non-permeable. The permeable cryoprotectants include, e.g., DMSO, alcohol such as ethylene glycol (EG), PROH (propylene glycol, propane-1, 2-diol, or 1, 2-propanediol), glycerol, and saccharide derivatives such as 3-O-methyl-glucose (3-OMG). The non-permeable cryoprotectants include, e.g., saccharides such as fructose, trehalose, sucrose, sorbitol, or raffinose, polymers such as hydroxyethyl starch (HES) or polyvinylpyrrolidone (PVP), amino acids such as L-proline, and biological macromolecules such as human serum albumin, and any combinations thereof. In some embodiments, the cryoprotectant is sucrose, trehalose, stachyose, raffinose, or polymers (e.g. PEG PVA, HES). In some embodiments, the composition includes 3-OMG Trehalose, N-acetyl-L-cysteine, and/or hydrogen sulfide.

In some embodiments, these solutions can be supplemented with anticoagulants (e.g. heparin), antibiotics (e.g. penicillin streptomycin), oncotic agents (e.g. bovine serum albumin (BSA)), hormones (e.g. insulin), anti-inflammatories (e.g. dexamethasone), antioxidants (e.g. glutathione), buffer (e.g. sodium bicarbonate), or polymer (e.g. polyethylene glycol).

In some embodiments, the solution also includes a vasodilator (e.g. prostaglandin), a counter ion (e.g. histidine hydrochloride), an osmolyte (e.g. choline chloride), sugars (e.g. trehalose, raffinose), and/or starch derivative (e.g. hydroxyethyl starch). In some embodiments, the storage solution also includes an ice structure modulator (e.g. antifreeze proteins, inulin), metabolic suppressors (e.g. hydrogen sulfide, 2-deoxyglucose), energy cofactors (e.g. cyclic AMP, adenosine), and/or a diuretic (e.g. Lasix).

In some embodiments, the solution can include an ice nucleator or an ice nucleating agent (e.g. Snomax). The ice nucleators or ice nucleating agents may be organic or inorganic. For example, the ice nucleating agents can be inorganic materials, such as soot, dust, fine particulates (microparticles, nanoparticles, mineral particles, or the like), or silver iodide, silver oxide, or alumina crystals. The ice nucleating agent can also be organic compounds, such as carbohydrates, phospholipids, proteins, alcohols, amino acids (e.g., aspartic acid), or lipoproteins. In some embodiments, the ice nucleating agent is long chain aliphatic alcohols. The ice nucleating agent can also be microorganism, e.g., virus, bacteria (e.g., ice nucleating bacteria), or fungi. Some commonly used ice nucleating agents include silver iodide, IceStart™ (Asymptote, Cambridge, UK) and Snomax® (Snomax LLC, Englewood, CO). Snomax® is a "snow inducer" based on proteins from the bacterium *Pseudomonas syringae*. These proteins act as extra nuclides to improve the crystallization process. *Pseudomonas syringae*® proteins are extracted from the microorganisms to produce Snomax. After fermentation, the proteins are separated from the fluid and processed using special filters to form a slurry. This slurry is then frozen and freeze-dried. Any remaining living bacteria are killed in the process. Thus, Snomax® is the freeze-dried form of the ice-nucleating protein extracted from *Pseudomonas syringae*. The ice nucleation active protein in *Pseudomonas syringae* is known as ice nucleation active protein InaZ (UniProt P06620-1).

The solutes in the solutions (e.g., a cryoprotectant, an ice nucleator, or some other solutes) can also have various concentrations (w/v), e.g., 0.01, 0.02, 0.03, 0.04, 0.05, 0.1, 0.15, 0.2, 0.25, 0.3, 0.35, 0.4, or 0.5 g/ml. As used herein, the "weight/volume (w/v) concentration" or "weight/volume (w/v) percentage" refers to the weight (in grams) of solute dissolved in a final volume of 1 mL of solution. For example, the concentration 1 g/ml refers to a solution with 1 g of solute dissolved in a final volume of 1 mL of solution. In some embodiments, the concentration (w/v) can be greater than 0.01, 0.02, 0.03, 0.04, 0.05, 0.1, 0.15, 0.2, 0.25, 0.3, 0.35, 0.4, or 0.5 g/ml. In some embodiments, the concentration (w/v) can be less than 0.01, 0.02, 0.03, 0.04, 0.05, 0.1, 0.15, 0.2, 0.25, 0.3, 0.35, 0.4, or 0.5 g/ml. W/v can also be expressed in terms of percentages. For example, the concentration 1% (w/v) refers to a solution with 1 g of solute dissolved in a final volume of 100 mL of solution. In some embodiments, the concentration (w/v) can be greater than 1%, 2%, 3%, 4%, 5%, 10%, 15%, 20%, 25%, 30%, 35%, 40%, or 50%. In some embodiments, the concentration (w/v) can be less than 1%, 2%, 3%, 4%, 5%, 10%, 15%, 20%, 25%, 30%, 35%, 40%, or 50%.

The concentration of a solute can also be expressed as a weight percentage (w/w). The concentration 1% (w/w) refers to a solution with 1 g of solute dissolved in a 100 g of the final solution (including both the solute and the solvent). In some embodiments, the concentration (w/w) of a solute in the solutions (e.g., cryoprotectant, or some other solutes) can be greater than 1%, 2%, 3%, 4%, 5%, 10%, 15%, 20%, 25%, 30%, 35%, 40%, or 50%. In some embodiments, the concentration (w/w) can be less than 1%, 2%, 3%, 4%, 5%, 10%, 15%, 20%, 25%, 30%, 35%, 40%, or 50%.

The concentration of a solute can also be expressed as a volume percentage (v/v). The concentration 1% (v/v) refers to a solution with 1 ml of solute dissolved in a 100 ml of the final solution (including both the solute and the solvent). In some embodiments, the concentration (v/v) of a solute in the solutions (e.g., cryoprotectant, or some other solutes) can be greater than 1%, 2%, 3%, 4%, 5%, 10%, 15%, 20%, 25%, 30%, 35%, 40%, or 50%. In some embodiments, the concentration (v/v) can be less than 1%, 2%, 3%, 4%, 5%, 10%, 15%, 20%, 25%, 30%, 35%, 40%, or 50%.

The amount of a solute in a solution can also be expressed in molar concentration. A commonly used unit for molar concentration is the molar (M) which is defined as the number of moles per liter. In some embodiments, the concentration of a solute (e.g., cryoprotectant) can be higher than 50 mM, 100 mM, 200 mM, 300 mM, 400 mM, 500 mM, 600 mM, 700 mM, 800 mM, 900 mM, 1 M, 2M, 3M, or 4M. In some embodiments, the concentration of a solute (e.g., a cryoprotectant) can be less than 50 mM, 100 mM, 200 mM, 300 mM, 400 mM, 500 mM, 600 mM, 700 mM, 800 mM, 900 mM, 1 M, 2M, 3M, or 4M. For example, the concentration of a cryoprotectant (e.g., sucrose, sorbitol, fructose, trehalose, raffinose, hydroxyethyl starch, 3-OMG) can be equal to or less than 1.5 M, e.g., 100 mM, 200 mM, 300 mM, 400 mM, 500 mM, 600 mM, 700 mM, 800 mM, 900 mM, or 1 M.

Loading Solution:

A loading solution can comprise a base media (e.g., William's E media, Krebs-Henseleit perfusion buffer, Promo cell muscle media, Claycomb media, EBM-2 complete media, etc.) and a glucose analog (e.g., 3-O-methyl-D-glucose).

In some embodiments, the concentration of a glucose analog (e.g., 3-O-methyl-D-glucose) can be higher than 50 mM, 100 mM, 200 mM, 300 mM, 400 mM, 500 mM, 600 mM, 700 mM, 800 mM, 900 mM, or 1 M. In some embodiments, the concentration of the glucose analog can be less than 50 mM, 100 mM, 200 mM, 300 mM, 400 mM, 500 mM, 600 mM, 700 mM, 800 mM, 900 mM, 1 M, or 1.5M. In some embodiments, the concentration of the glucose analog is about 50 mM or about 100 mM.

In some embodiments, the loading solution can be supplemented with anticoagulants (e.g. heparin), antibiotics (e.g. penicillin streptomycin), oncotic agents (e.g. bovine serum albumin (BSA)), hormones (e.g. insulin), anti-inflammatories (e.g. dexamethasone), antioxidants (e.g. glutathione), buffer (e.g. sodium bicarbonate), or polymer (e.g. polyethylene glycol).

In some embodiments, the loading solution can contain a vasodilator (e.g. prostaglandin) or a metabolic suppressor (e.g. hydrogen sulfide, 2-deoxyglucose).

In some embodiments, the loading solutions comprises a Williams E media supplemented with 3-OMG, as well as BSA. In some embodiments, the concentration of BSA is from 5 mg/mL to 20 mg/ml, from 5 mg/mL to 15 mg/ml, e.g., about 10 mg/mL.

In some embodiments, the loading solution further comprises heparin, insulin, and hydrocortisone.

In some embodiments, the loading solution comprises EBM-2 complete media and 3-OMG.

Storage Solution

The storage solution can comprise a base media (e.g., William's E media, Krebs-Henseleit perfusion buffer, Promo cell muscle media, Claycomb media, University of Wisconsin solution, etc.)

In some embodiments, the storage solution comprises a glucose analog. The concentration of a glucose analog (e.g., 3-O-methyl-D-glucose) can be higher than 50 mM, 100 mM, 200 mM, 300 mM, 400 mM, 500 mM, 600 mM, 700 mM, 800 mM, 900 mM, or 1 M. In some embodiments, the concentration of the glucose analog can be less than 50 mM, 100 mM, 200 mM, 300 mM, 400 mM, 500 mM, 600 mM, 700 mM, 800 mM, 900 mM, 1 M, or 1.5M. In some embodiments, the concentration of the glucose analog is about 50 mM or about 100 mM.

In some embodiments, the storage solution also comprises a cryoprotectant, (e.g., glycerol, Dimethyl sulfoxide (DMSO), propanediol, etc.)

In some embodiments, the storage solution comprises an ice nucleator (e.g. Snomax).

In some embodiments, the storage solution can be supplemented with supplemented with anticoagulants (e.g. heparin), antibiotics (e.g. pen-strep), oncotic agents (e.g. bovine serum albumin), hormones (e.g. insulin), anti-inflammatories (e.g. dexamethasone), antioxidants (e.g. glutathione), buffer (e.g. sodium bicarbonate), or polymer (e.g. polyethylene glycol).

In some embodiments, the storage solution also includes a vasodilator (e.g. prostaglandin), a counter ion (e.g. histidine hydrochloride), an osmolyte (e.g. choline chloride), sugars (e.g. trehalose, raffinose), and/or starch derivative (e.g. hydroxyethyl starch).

In some embodiments, the storage solution also includes an ice structure modulator (e.g. anti-freeze proteins, inulin), and/or metabolic suppressors (e.g. hydrogen sulfide, 2-deoxyglucose).

In some embodiments, the storage solution comprises a University of Wisconsin cold storage solution, supplemented with glycerol, PEG, and trehalose.

In some embodiments, the storage solution comprises a University of Wisconsin solution, Trolox, 3-OMG, PEG, and an ice nucleator. Further, the storage solution was supplemented with Glycerol (10%; Sigma-Aldrich, G7893) and Trehalose (30 mM; Sigma Aldrich, Cat #90210).

The concentration of glycerol (v/v) can be e.g., greater than 1%, 2%, 3%, 4%, 5%, 6%, 7%, 8%, 9%, 10%, 11%, 12%, 13%, 14%, 15%, 16%, 17%, 18%, 19%, or 20%, or less than 1%, 2%, 3%, 4%, 5%, 6%, 7%, 8%, 9%, 10%, 11%, 12%, 13%, 14%, 15%, 16%, 17%, 18%, 19%, or 20%. In some embodiments, the concentration of glycerol is about 5%, 6%, 7%, 8%, 9%, 10%, 11%, 12%, 13%, 14%, or 15%.

The concentration of PEG (w/v) can be e.g., greater than 1%, 2%, 3%, 4%, 5%, 6%, 7%, 8%, 9%, 10%, 11%, 12%, 13%, 14%, 15%, 16%, 17%, 18%, 19%, or 20%, or less than 1%, 2%, 3%, 4%, 5%, 6%, 7%, 8%, 9%, 10%, 11%, 12%, 13%, 14%, 15%, 16%, 17%, 18%, 19%, or 20%. In some embodiments, the concentration of glycerol is about 1%, 2%, 3%, 4%, 5%, 6%, 7%, 8%, 9%, or 10%.

The concentration of trehalose can be higher than 30 mM, 40 mM, 50 mM, 60 mM, 70 mM, 80 mM, 90 mM, 100 mM, 200 mM, 300 mM, 400 mM, 500 mM, 600 mM, 700 mM, 800 mM, 900 mM, or 1 M. In some embodiments, the concentration of trehalose can be less than 100 mM, 200 mM, 300 mM, 400 mM, 500 mM, 600 mM, 700 mM, 800 mM, 900 mM, or 1 M. In some embodiments, the concentration of the trehalos is about 30 mM, 40 mM, 50 mM, 60 mM, 70 mM, 80 mM, 90 mM, or 100 mM.

The concentration of Trolox can be higher than 1, 2, 3, 4, 5, 6, 7, 8, 9, 10, 12, 13, 14, 15, 16, 17, 18, 19, or 20 mM. In some embodiments, the concentration of Trolox can be less than 1, 2, 3, 4, 5, 6, 7, 8, 9, 10, 12, 13, 14, 15, 16, 17, 18, 19, or 20 mM. In some embodiments, the concentration of the Trolox is about 5, 6, 7, 8, 9, 10, 12, 13, 14, or 15 mM.

The concentration of an ice nucleator (e.g., Snomax) can be higher than 0.1, 0.2, 0.3, 0.4, 0.5, 0.6, 0.7, 0.8, 0.9, 1, 2, 3, 4, 5, 6, 7, 8, 9, or 10 mg/ml. In some embodiments, the concentration of the ice nucleator (e.g., Snomax) can be less than 0.5, 0.6, 0.7, 0.8, 0.9, 1, 2, 3, 4, 5, 6, 7, 8, 9, or 10 mg/ml. In some embodiments, the concentration of the ice nucleator (e.g., Snomax) is about 1, 2, 3, 4, or 5 mg/ml.

In some embodiments, the storage solution comprises a University of Wisconsin solution, Snomax (about 1 mg/mL), 3-OMG (about 100 mM), PEG (about 2% or 5%), glycerol (about 10%), and trehalose (about 30 mM).

In some embodiments, the storage solution comprises a University of Wisconsin solution, Trolox (about 10 mM), 3-OMG (about 100 mM), PEG (about 2% or 5%), and Snomax (about 1 mg/mL). Further, the storage solution was supplemented with Glycerol (about 10%) and Trehalose (about 30 mM).

Thawing Solution

The thawing solution comprises a base media (e.g., William's E media, Krebs-Henseleit perfusion buffer, Promo cell muscle media, Claycomb media, University of Wisconsin solution, EBM-2 complete media, etc.).

In some embodiments, the thawing solution comprises a glucose analog. The concentration of a glucose analog (e.g., 3-O-methyl-D-glucose) can be higher than 50 mM, 100 mM, 200 mM, 300 mM, 400 mM, 500 mM, 600 mM, 700 mM, 800 mM, 900 mM, or 1 M. In some embodiments, the concentration of the glucose analog can be less than 50 mM, 100 mM, 200 mM, 300 mM, 400 mM, 500 mM, 600 mM, 700 mM, 800 mM, 900 mM, 1 M, or 1.5M.

In some embodiments, the thawing solution also comprises a cryoprotectant, either permeating or non-permeating, (e.g., glycerol, Dimethyl sulfoxide (DMSO), propanediol, trehalose etc.)

In some embodiments, the thawing solution can be supplemented with anticoagulants (e.g. heparin), antibiotics (e.g. pen-strep), oncotic agents (e.g. bovine serum albumin), hormones (e.g. insulin), anti-inflammatories (e.g. dexamethasone), antioxidants (e.g. glutathione), buffer (e.g. sodium bicarbonate), or polymer (e.g. polyethylene glycol).

In some embodiments, the thawing solution can optionally include sugars (e.g. trehalose, raffinose) or starch derivative (e.g. hydroxyethyl starch), energy cofactors (e.g. cyclic AMP, adenosine), and/or a diuretic (e.g. Lasix).

In some embodiments, the thawing solution comprises EBM-2 complete media supplemented with 3-OMG, Trehalose, and PEG.

The concentration of PEG (w/v) can be e.g., greater than 1%, 2%, 3%, 4%, 5%, 6%, 7%, 8%, 9%, 10%, 11%, 12%, 13%, 14%, 15%, 16%, 17%, 18%, 19%, or 20%, or less than 1%, 2%, 3%, 4%, 5%, 6%, 7%, 8%, 9%, 10%, 11%, 12%, 13%, 14%, 15%, 16%, 17%, 18%, 19%, or 20%. In some embodiments, the concentration of glycerol is about 1%, 2%, 3%, 4%, 5%, 6%, 7%, 8%, 9%, or 10%.

The concentration of trehalose can be higher than 30 mM, 40 mM, 50 mM, 60 mM, 70 mM, 80 mM, 90 mM, 100 mM, 200 mM, 300 mM, 400 mM, 500 mM, 600 mM, 700 mM, 800 mM, 900 mM, or 1 M. In some embodiments, the concentration of trehalose can be less than 100 mM, 200 mM, 300 mM, 400 mM, 500 mM, 600 mM, 700 mM, 800 mM, 900 mM, or 1 M. In some embodiments, the concentration of the trehalos is about 30 mM, 40 mM, 50 mM, 60 mM, 70 mM, 80 mM, 90 mM, or 100 mM.

In some embodiments, the thawing solution comprises EBM-2 complete media supplemented with 3-OMG (about 100 mM), Trehalose (about 50 mM), and PEG (about 2%).

Recovery Solution

The recovery solution comprises a base media (e.g., William's E media, Krebs-Henseleit perfusion buffer, Promo cell muscle media, Claycomb media, EBM-2 complete media).

The recovery solution can be supplemented with anticoagulants (e.g. heparin), antibiotics (e.g. pen-strep), oncotic agents (e.g. bovine serum albumin), hormones (e.g. insulin), anti-inflammatories (e.g. dexamethasone), antioxidants (e.g. glutathione), buffer (e.g. sodium bicarbonate), or polymer (e.g. polyethylene glycol).

In some embodiments, the recovery solution optionally includes a vasodilator (e.g. prostaglandin), energy cofactors (e.g. cyclic AMP, adenosine), and/or a diuretic (e.g. Lasix).

In some embodiments, the recovery solution comprises organ specific ingredient, such as bile salts for liver.

In some embodiments, the recovery solution comprises EBM-2 complete media.

Cooling Systems

The present disclosure also provides systems for partial freezing biological samples.

The system can include a holing vessel and a cooling apparatus. In some embodiments, the vessel is a capillary tube (e.g., a microcapillary tube), a cryo-container, a cryovial bag, a flask, a petri dish, or a multi-well plate. In some embodiments, the system further includes a perfusion device.

In some embodiments, the system comprises a capillary device comprising one or more capillary channels (FIG. 1A). Generally, the capillary channel is a microcapillary tube and is made of a wall material that is thermally conductive. Desirably, the microcapillary tube has thin walls (e.g., about 1 to 100 μm), where the ratio of thermal conductivity to wall thickness is at least 1,000, 5,000, 10,000, 100,000, 500,000, or higher. Desirably, the microcapillary tube has a relatively small diameter (e.g., from 1 to 400 μm). In some embodiments, the microcapillary tube is a quartz microcapillary tube (QMC). The device can have more than one or more channels (e.g., 1, 2, 3, 4, 5, 6, 7, 8, 9, 10, 11, 12, 13, 14, 15, 16, 17, 18, 19, or 20) channels. In some embodiments, the channels can have the following dimensions: 30×30×5000 μm or 40×40×5000 μm (width by height by length). In some embodiments, the diameter of the channels is less than 20, 30, 40, or 50 μm. Each device can also have one cylindrical inlet port (for cell seeding) and/or one outlet port (for media delivery).

Figure 13:
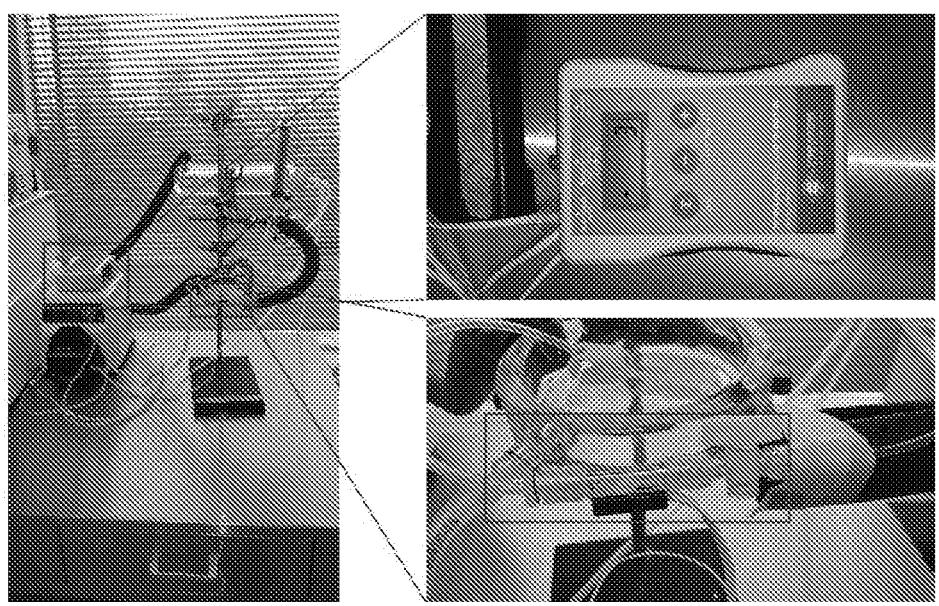
FIG. 13 is a series of images of an exemplary perfusion setup (left) with pressure monitor (top right) and sensor (bottom right).
Figure 14:
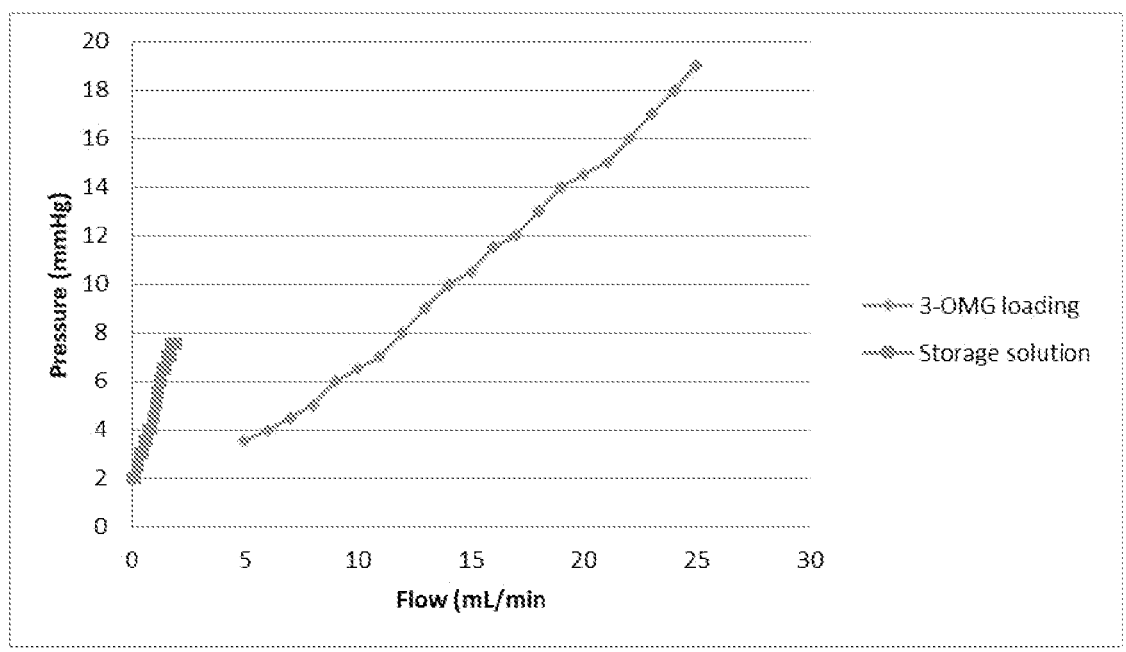
FIG. 14 is a graph of pressure of the perfusion system as a function of flow rate (without a liver).

In some embodiments, the system comprises a machine perfusion system. The system can include a pump, an oxygenator, and a bubble trap (FIG. 13). The organ can be perfused with a base solution in the system. The pressure monitor can read pressure of the whole system in millimeters of mercury. In some embodiments, a bifurcation in the tubing just upstream of the catheter leads to the pressure sensor, as shown in the lower, right inset below (FIG. 13). The system can be calibrated by recording the pressure of the system (without organ) as a function of flow rate (e.g., as shown in FIG. 14). Thus, once the organ is attached to the perfusion system, the internal pressure can be monitored.

The systems can further include a cooling apparatus (e.g., refrigerator, freezer) and/or a heating apparatus for warming the biological sample.

EXAMPLES

The invention is further described in the following examples, which do not limit the scope of the invention described in the claims.

Example 1

Materials and Methods

The following materials and methods were used in the following examples.

Microfluidic Capillary Fabrication

The capillary model (FIG. 1 & FIG. 7) is based on the capillary constriction devices. Capillary constriction devices were fabricated using standard soft lithography techniques. Briefly, mylar masks were designed in AutoCAD featuring devices with 16 parallel channels of the following dimensions: 30×30×5000 μm or 40×40×5000 μm (width by height by length). Each device was designed with one cylindrical inlet port (for cell seeding) and one outlet port (for media delivery) of 2.5 and 1.2 mm diameters, respectively. SU-8-50 negative photoresist (Microchem) was spun onto silicon wafers, and UV photolithography was conducted using the mask for patterning. The height of SU-8 features were verified to be within ±10% using a surface profilometer (Dektak ST System Profilometer; Veeco Instruments). A 10:1 (wt:wt) mixture of Polydimethylsiloxane (PDMS) prepolymer and cross-linker (Dow Corning) was poured onto silicon master molds before degassing. After curing at 65° C. for 24 hours, devices were removed from the mold, and punched (Harris Uni-Core biopsy punchers). Devices were then oxygen plasma treated at 300 mmTor $O_2$ at 50 W for 35 s, and bonded to glass slides (heated on a hot plate for 10 min @ 85° C.). Microchannels were rounded using uncured PDMS prepolymer mixed in equal parts with Xiameter PMX-200 1 cS silicone oil (Dow Corning). Prepolymer diluted in oil was loaded into devices while heating (100° C. for 10 s). Subsequently, negative pressure of 75 kPa was applied to the outlet using a vacuum pump for 2-3 min, before the pressure was reduced to 17 kPa on a hot plate at 100° C. for 5 min.

HUVEC Culture, Microchannel Coating, and Characterization

Figure 8A:
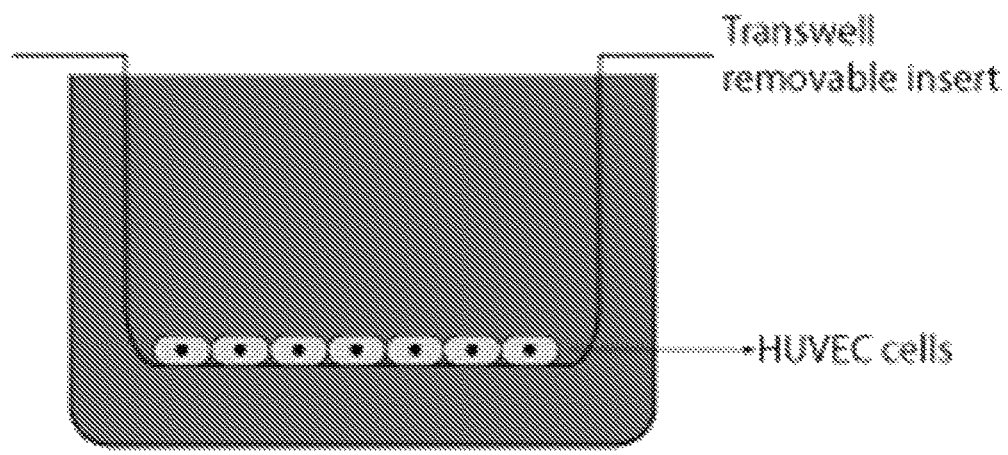
FIG. 8A is a schematic illustration of an experimental setup for quantification of barrier function performed on human umbilical vein endothelial cells (HUVEC). FITC-labeled dextran is added to the apical chamber and can only diffuse to the basal chamber if HUVEC barrier function is disrupted. Media is collected in the basal chamber after 30 minutes and read on a fluorescent spectrophotometer.
Figure 8B:
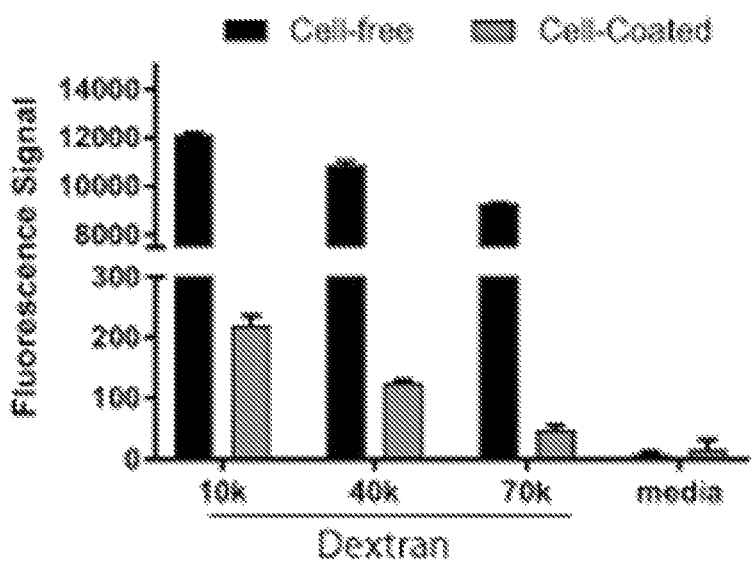
FIG. 8B is a graph of fluorescent signal of media collected from the basal chamber with (grey bars) and without (black bars) HUVECs.

Human Umbilical Vein Endothelial Cells (HUVEC) were cultured in standard T25 or T75 flasks coated with 0.1% gelatin (Cat #G9391; dissolved in sterile, distilled water). The gelatin solution (1.3-4 mL) was uniformly distributed in cell culture flasks and incubated at 37° C. After 1 hour, the remaining gelatin solution was aspirated, and flasks were equilibrated in HUVEC complete media in preparation for cell passage. HUVECs obtained from Lonza were maintained in EBM-2 basal media supplemented with EGM-2 bullet kit (CC-3156 & CC-4176) and subcultured every 3-4 days using 0.25% trypsin-EDTA. For all experiments, HUVECs were between passage numbers 8-11. Barrier function assays were performed on endothelial cells at passage 9 to confirm normal endothelial function. These assays were performed by seeding cells onto a fibronectin coated transwell removable insert (Cat #353102) and culturing for three days before placing FITC-labeled dextran into the apical chamber (FIG. 8A; 1:1000 v:v; Cat # for FITC-labeled Dextran 70, 40, and 10 kDa are D1818, D1844, D1821, respectively). After a 30-minute incubation, 100 µl aliquots were sampled from the basal chamber (in triplicate) and read on a fluorescent spectrophotometer. FIG. 8B illustrates the fluorescence signal of controls with no cells (coated with fibronectin only) versus those coated with fibronectin and cells, demonstrating low fluorescence signal in the basal chamber in the presence of endothelial cells. Finally, endothelial cells were stained with Hoescht (blue nuclear) and VE-Cadherin (green) in tissue culture plates and microchannels (microchannels were also stained with CD31) to confirm the presence of cell-cell adhesive structures which are typical of endothelial cells.

Prior to coating with endothelial cells, microchannels were sonicated briefly (3 min in isopropanol; Branson 200, Branson Ultrasonics), and then rinsed with PBS. Channels were then coated with 1 mg/mL fibronectin (dissolved in sterile PBS, total of 10 µl) and incubated for 60 min at 37° C. After a priming step, HUVEC cells were trypsinized, counted, and re-suspended in EBM-2 complete media (~10.0×10$^6$ cells per mL). Cells were subsequently introduced to the cell seeding port and incubated at 37° C. 5% $CO_2$ for 30 min (FIG. 1A). Final constriction diameters of cellularized microchannels varied from ~10 to 20 µm across the lengths of individual channels due to the presence of cellular nuclei along channel walls. Coated microchannels were then fed under continuous gravity flow using a pipet tip containing media and inserted into the delivery port to generate flow in the reverse direction from loading (FIG. 1A). Pipet tips (200 µl) filled with media provided an initial hydrostatic head of 2.5 cm $H_2O$. Cells incubated at 37° C. 5% $CO_2$ up to 3 days with daily replacement of tips with filled media before proceeding to experimentation. All microchannels were imaged prior to experimentation to ensure endothelial cells were uniformly coated and showed an elongated morphology characteristic of healthy, normal HUVECs (FIG. 1B). Control, unfrozen microchannels were stained with Calcein green (1:1000), Hoescht (H3570; 1:1000 v:v), and propidium iodide (4 µg/mL) for 20 min and imaged, while microchannels imaged prior to experimentation/freezing were only stained with Calcein green (1:1000). These experimental microchannels were subsequently stained after experimentation/freezing with Hoescht (H3570; 1:1000 v:v), and propidium iodide (4 µg/mL).

Cryostage Experiments

Figure 1C:
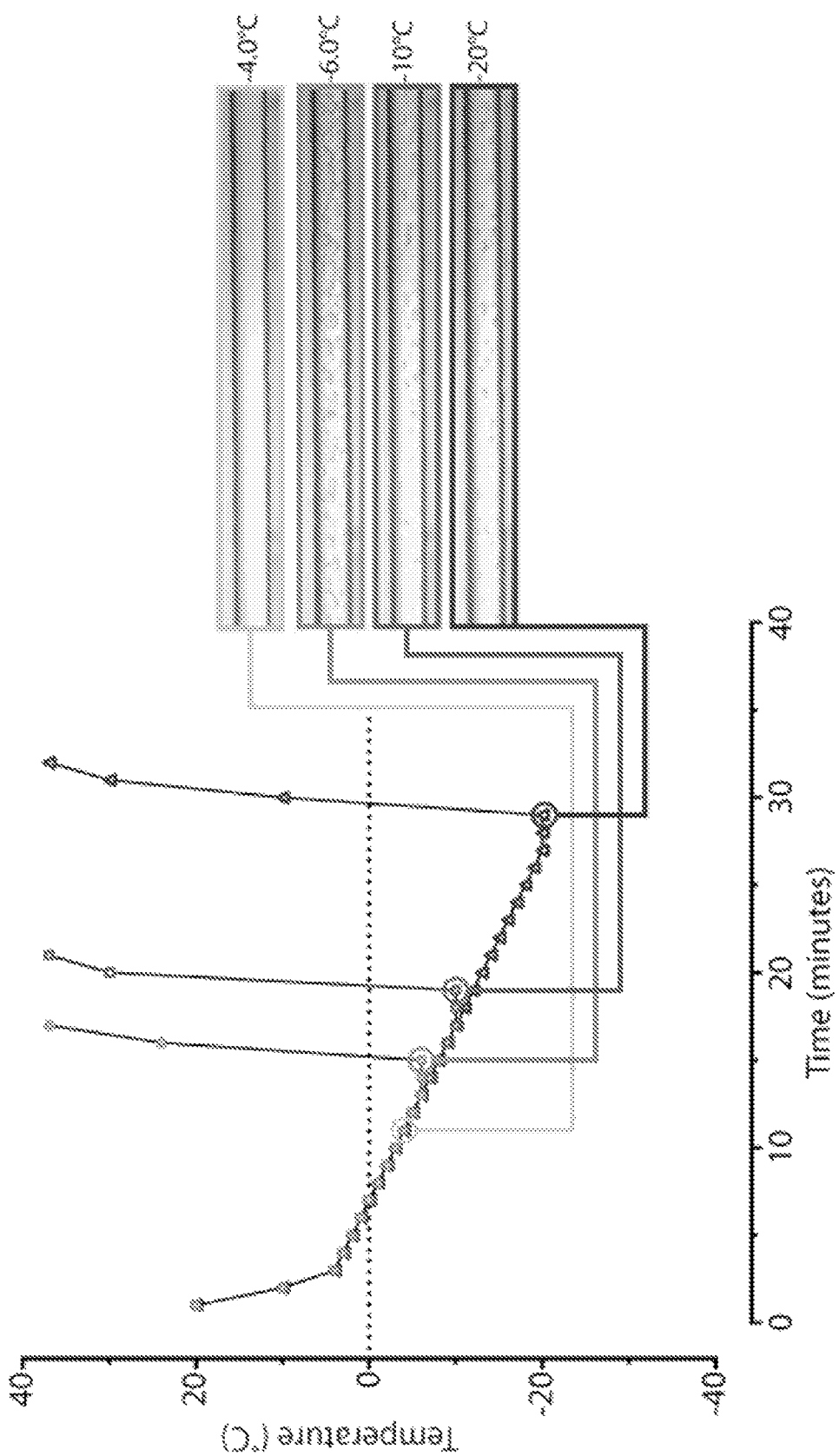
FIG. 1C is a graph and related microscope images of a Linkam cryostage, which can implement programmable freezing and thawing protocols and provide direct visual observation of ice propagation.
Figure 7:
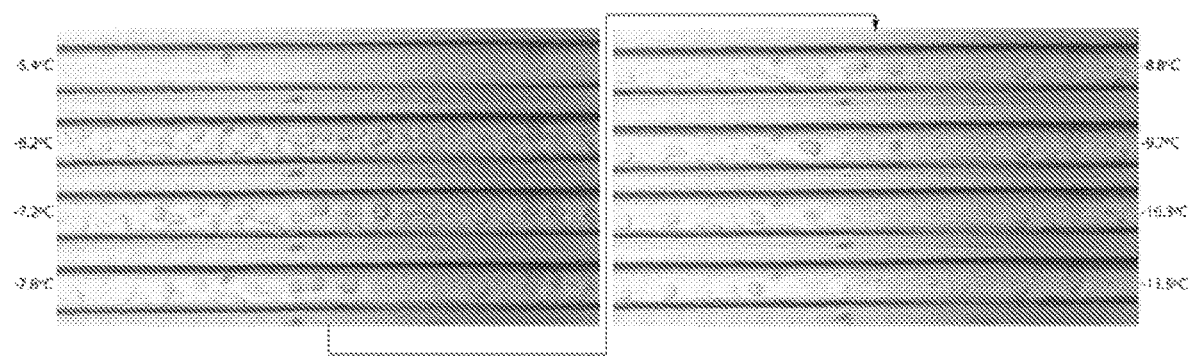
FIG. 7 is a series of microscope images showing ice propagation in real-time and as time-lapse images as a function of decreasing temperatures.

Endothelial cell-coated microchannels were prepared, and placed on the silver block of a FDCS196 cryostage (Linkam Scientific Instruments Ltd, London, UK), the temperature of which was controlled by the TMS 94 temperature controller with the accuracy of ±0.1° C. Microchannels bonded to glass slides were cut into individual devices so they would fit on the silver block of the Linkam cryostage. A PixeLINK PL-A662 camera (PixeLINK, Ottawa, Canada) was used to visualize ice formation and propagation. In all cases, ice nucleation temperature was recorded and ice propagation throughout the device was confirmed by direct visual inspection (FIG. 7). Prior to freezing, endothelial cell-coated microchannels in the 3-O-methyl-D-glucopyranose (3-OMG) experimental group were incubated with EBM-2 complete media supplemented with either 50 or 100 mM 3-OMG at 37° C. to promote intracellular transport of the glucose analog. Supplementation of 3-OMG in the basal media and incubation at 37° is an effective method for intracellular delivery of 3-OMG. Microchannels containing EBM-2 complete media was then changed for PBS containing 3-OMG (50 and 100 mM; Cat #M4879), polyethylene glycol (PEG, 35 kDa; 2 and 5%; Cat #81310), and/or ice nucleators. Snomax (Snomax International, Englewood, CO, USA) was used as the model ice nucleator in this study (1 mg/mL). Microchannels were perfused with PBS containing ice nucleators and/or cryoprotectant agents for 10 min prior to beginning the cooling profile. During the freezing experiment, the temperature was first cooled at 10° C./min to 4° C. After thermal stabilization, a cooling rate of 1° C./min was applied until reaching the holding temperature. For microchannels which did not contain ice nucleators, cells were cooled until ice nucleation/propagation was observed and then cooled to the closest round number. For microchannels which contained Snomax, ice was observed <−6° C. in all cases, and channels were cooled to −6, −10, or −20° C. At the lowest holding temperature, microchannels were held for 3-5 min before a rapid rewarming at +30° C./min (FIG. 1C). After rewarming, microchannels were stained with Hoescht (nuclear) and propidium iodide (membrane integrity) dissolved in EBM-2 complete media for 20 min and imaged, in which the cell membrane integrity was used as a discriminator of live and dead cells.

Long-Term Storage Experiments

Endothelial cell-coated microchannels were prepared, and placed in a controlled rate freezer (Kryo 560-16 Planer Controlled Rate Freezer). Microchannels were cooled at 1° C./min down to −10° C. and held in the controlled rate freezer for 20-30 minutes before rapidly transferring to a freezer set at −10° C. for long-term storage (±1° C.). Prior to freezing, microchannels were incubated for 1 hour at 37° C. with EBM-2 complete media supplemented with 100 mM 3-OMG. Following 3-OMG cellular uptake, microchannels were cooled to 4° C. on a Teca plate cooler (ThermoElectric Cooling America Corporation, ACP-1200; ±0.1° C.). After thermal stabilization, EBM-2 supplemented with 3-OMG was changed for pre-chilled storage solution. The base media for all storage solutions was the University of Wisconsin solution (Fisher Scientific, Cat #NC0952695) supplemented with Trolox (10 mM; Cayman Chemical Company, Cat #10011659), 3-OMG (100 mM), PEG (2%), and Snomax (1 mg/mL). Further, the storage solution was supplemented with Glycerol (10%; Sigma-Aldrich, G7893) and Trehalose (30 mM; Sigma Aldrich, Cat #90210). After a fixed storage duration of 72 hours, microchannels were removed from the freezer and rapidly thawed in a warm media bath consisting of EBM-2 complete media supplemented with 100 mM 3-OMG, 50 mM Trehalose, and 2% PEG. This thawing solution was also used to wash out the storage solution by perfusing microchannels with a tip inserted into the media port. After ~1 hour, the thawing solution was replaced with EBM-2 complete media and microchannels were left overnight (12-16 hours) in an incubator at 37° C. After this recovery period, microchannels were stained and imaged.

Quantification and Statistics

Cell attachment values were quantified by counting the total number of Hoechst positive cells (i.e. total number of cell nuclei) and dividing by the total number of channels (each device has maximum of 16 channels). Membrane integrity was quantified by counting the number of propidium iodide positive cells divided by the total number of Hoechst positive cells. Cell attachment and membrane integrity are expressed as box-and-whiskers plots showing median, interquartile range, maxima, and minima (n=4-8). Statistical testing used either the Student's t-test or the one-way ANOVA and the Tukey post-hoc functions from the GraphPad Prism software (San Diego, CA).

Example 2

Effect of Ice Nucleation and Holding Temperature on Endothelial Cell Attachment

The effect of ice nucleation temperature on endothelial cell attachment either in the presence or absence of a potent ice nucleator, Snomax was tested (FIGS. 2A-2B). Without Snomax, endothelial cell attachment was significantly decreased (6.5±3.4 cells/channel, n=8), as compared to unfrozen controls (35.9±2.9 cells/channel, n=9; p<0.0001; FIG. 2A). In FIG. 2A, no Snomax controls were cooled until ice nucleation and propagation throughout the device was observed, cooled to a round holding temperature, and thawed as per standard protocols. Data were analyzed using a one-way analysis of variance (ANOVA) with a post-hoc Tukey test (p<0.05); values that share the same letter notation are not significantly different from one another.

However, when relatively higher and more consistent ice nucleation temperatures were initiated in the presence of Snomax, no significant difference was observed between control and microcapillaries with a $T_{hold}$ of −6° C. (37.2±6.5 cells/channel; FIG. 2A). When temperature was further decreased to −10 and −20° C. (14.6±14.7 and 9.3±4.6 cells/channel, respectively, FIG. 2A), cell attachment decreased significantly as compared to both controls and microcapillaries with a $T_{hold}$ of −6° C. (p<0.0001 in all cases). Conditions which did not have Snomax had nucleation temperatures ranging between −8.3 and −15.0° C. (covering a range of 6.7° C.), while microcapillaries with Snomax reliably nucleated between a much smaller temperature range of −5.1 and 6.0° C. (covering a range of 0.9° C.; FIG. 2A).

Example 3

Figure 3A:
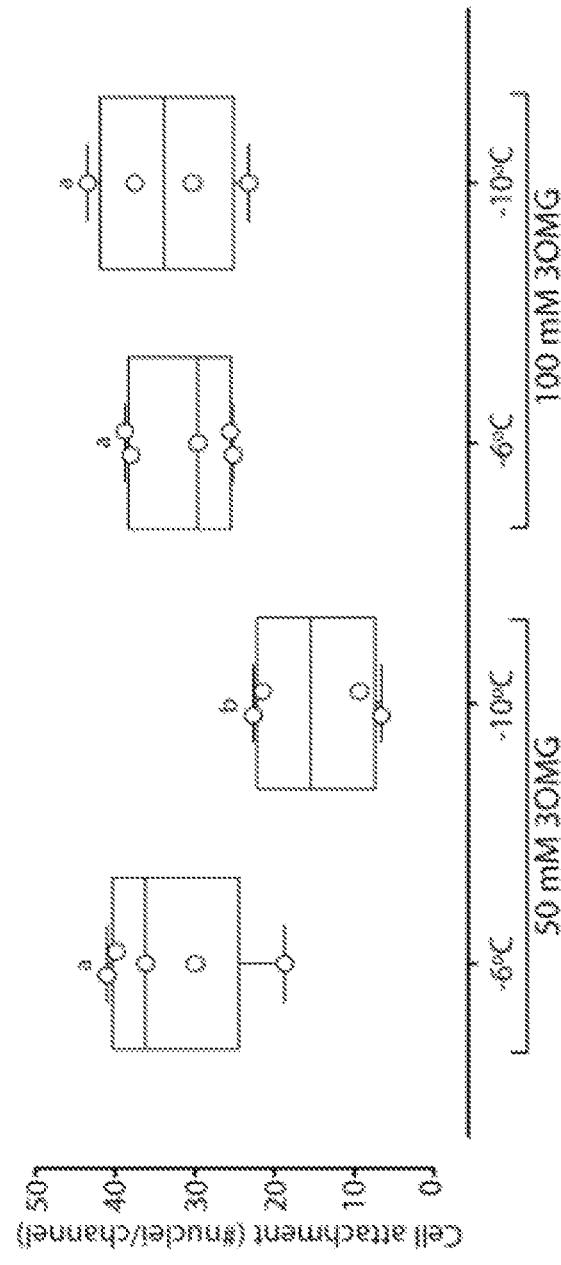
FIG. 3A is a graph showing percentages of cell attachment expressed as box-and-whiskers plots showing median, interquartile range, maxima/minima, and all individual data points (n=4-5) for two concentrations of 3-O-methyl-D-glucopyranose (3-OMG) (50 and 100 mM) and two holding temperatures (−6 and −10° C.). Values that share the same letter notation are not significantly different from one another.
Figure 3B:
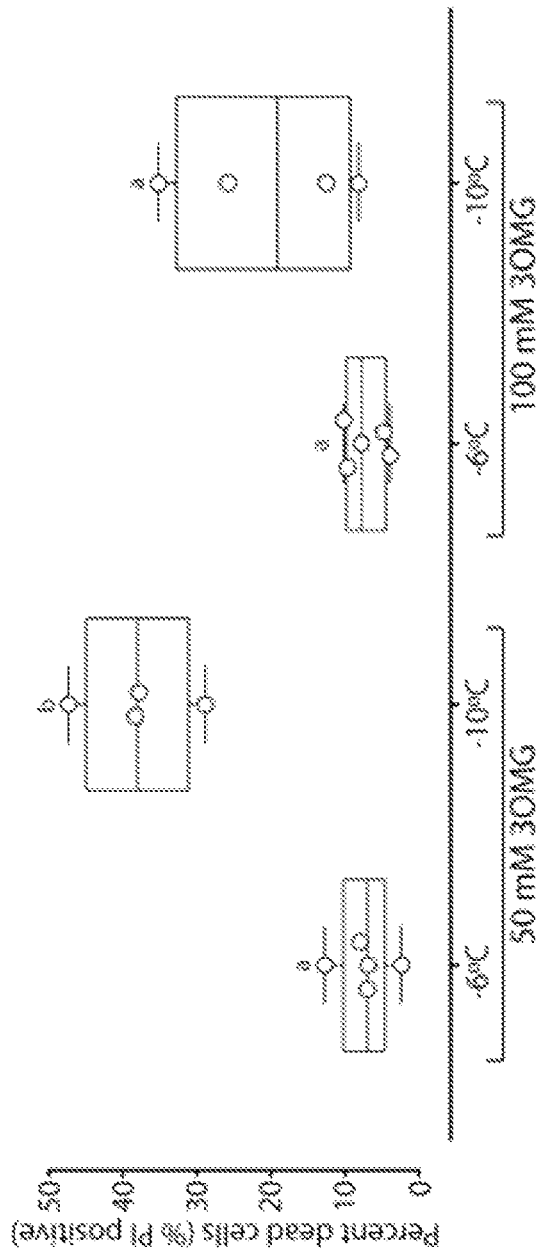
FIG. 3B is a graph showing percentages of propidium iodide (PI) positive cells expressed as box-and-whiskers plots showing median, interquartile range, maxima/minima, and all individual data points (n=4-5) for two concentrations of 3-OMG (50 and 100 mM) and two holding temperatures (−6 and −10° C.). Values that share the same letter notation are not significantly different from one another.

Effect of the Intracellular CPA on Endothelial Cell Attachment and Membrane Integrity The contribution of intracellular CPAs to protect endothelial cells against freezing damage at two high subzero temperatures including −6 and −10° C. in the presence of Snomax was tested (FIGS. 3A-3B). FIGS. 3A-3B show effect of intracellular cryoprotectants, 3-OMG, and holding temperature ($T_{hold}$) on endothelial cell attachment after exposure to a freeze-thaw protocol. Data were analyzed using a one-way analysis of variance (ANOVA) with a post-hoc Tukey test (p<0.05).

Figure 9:
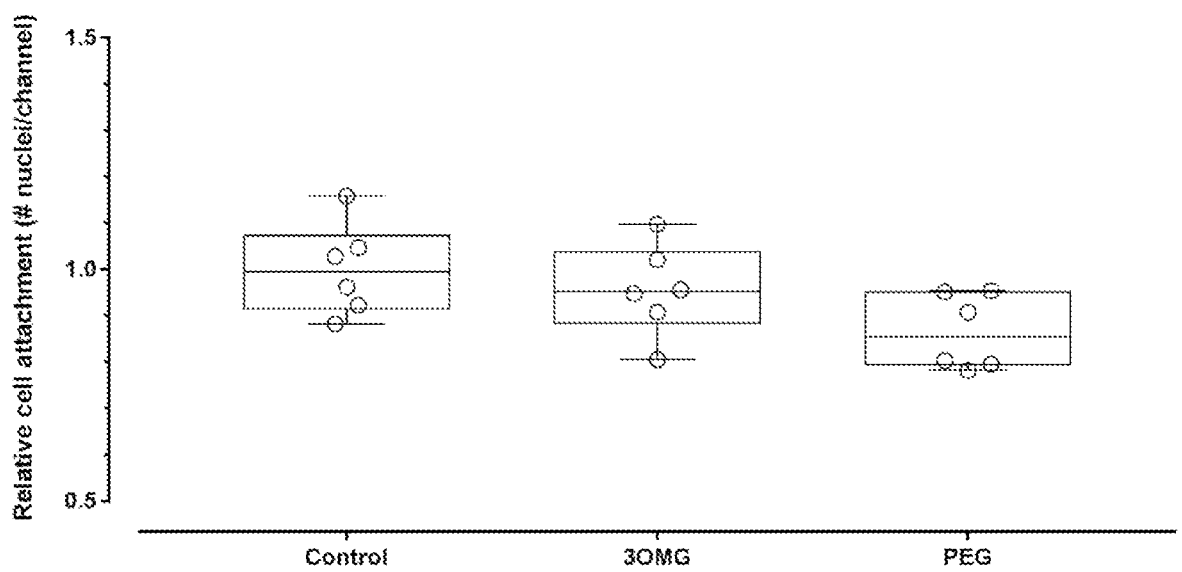
FIG. 9 is a graph showing the effect of intracellular and extracellular cryoprotectants, 3-OMG and polyethylene glycol (PEG), respectively, on endothelial cell attachment without freezing as compared to unfrozen controls without cryoprotective agents (CPAs).

Unfrozen controls with and without 3-OMG (100 mM) are presented in FIG. 9 whereby there was no statistical significant difference (p=0.6995). In the figure, cell attachment is expressed as box-and-whiskers plots showing median, interquartile range, maxima/minima, and all individual data points (n=6) for 100 mM 3-OMG and 2% PEG normalized to unfrozen controls without CPAs. Data were analyzed using a one-way analysis of variance (ANOVA) with a post-hoc Tukey test (p<0.05): no statistical significance was observed.

Endothelial cells frozen in the presence of 3-OMG were first exposed to a 1 hour incubation with EBM-2 media containing either 50 or 100 mM 3-OMG to promote intracellular delivery of 3-OMG, which is sufficient for membrane transport. Cell attachment with 50 mM 3-OMG was 33.2±9.1 at $T_{hold}$−6° C. versus 15.1±8.2 at $T_{hold}$−10° C., which was statistically significant (FIG. 3A, p=0.0247). Also, there was a statistically significant difference with respect to cell membrane integrity comparing −6 and −10° C. holding temperatures whereby percent PI positive cells were 7.4±3.7% versus 38.1±7.5%, respectively (FIG. 3B, p<0.0001). In contrast to the trend observed for 50 mM 3-OMG, there was no statistical difference between $T_{hold}$ of −6° C. and −10° C. with 100 mM 3-OMG which had 31.4±6.6 and 33.6±8.8 cells/lane following the freeze-thaw protocol, respectively (FIG. 3A). However, cell membrane integrity assay showed that 20.5±12.4% of the total cells were PI positive at −10° C. versus 7.3±2.8% at −6° C., although this was not statistically significant (p=0.67; FIG. 3B).

Example 4

Figure 4A:
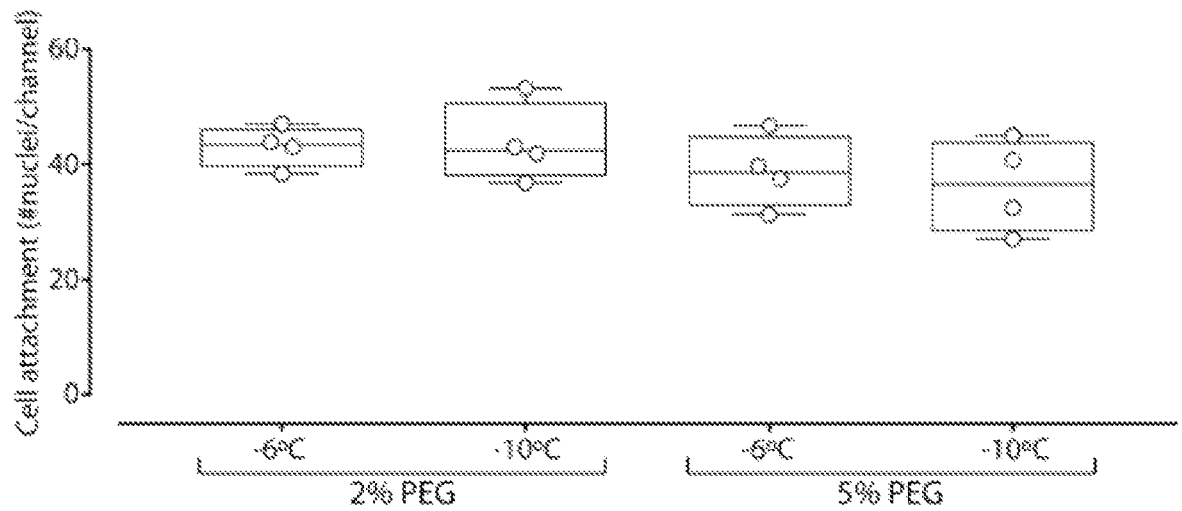
FIG. 4A is a graph showing percentages of cell attachment are expressed as box-and-whiskers plots showing median, interquartile range, maxima/minima, and all individual data points (n=4-5) for two concentrations of PEG (2 and 5% w/v) and two holding temperatures (−6 and −10° C.).
Figure 4B:
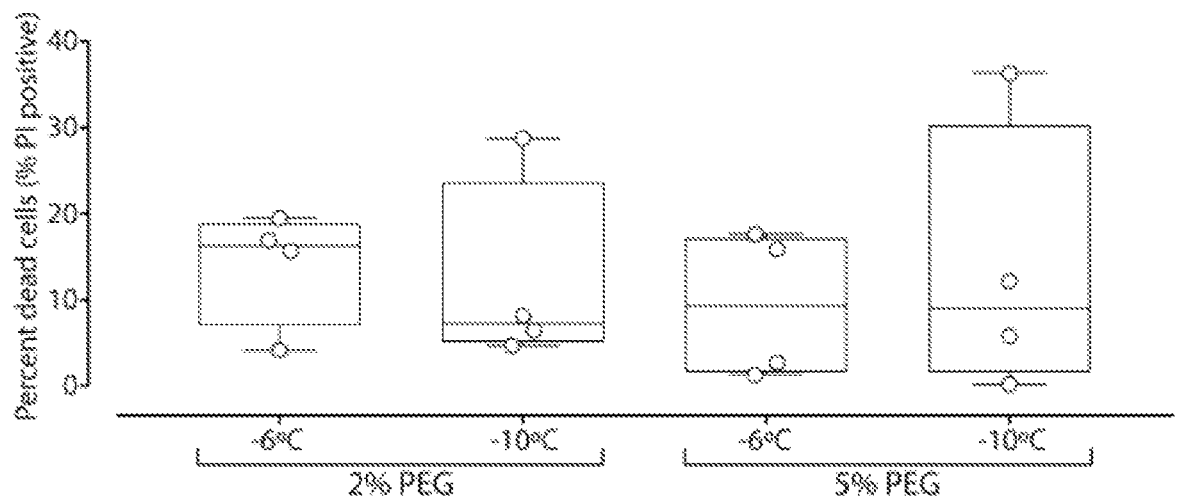
FIG. 4B is a graph showing percentages of PI positive cells are expressed as box-and-whiskers plots showing median, interquartile range, maxima/minima, and all individual data points (n=4-5) for two concentrations of PEG (2 and 5% w/v) and two holding temperatures (−6 and −10° C.).

Effect of the Extracellular CPA on Endothelial Cell Attachment and Membrane Integrity The contribution of extracellular CPAs to protect endothelial cells from freezing damage was also tested. Unfrozen controls with and without PEG (2%) were presented in FIG. 9 whereby there was no statistical significant difference (p=0.0611). No statistically significant difference when comparing 2% versus 5% PEG was observed at either of the subzero temperatures tested for both cell attachment (cells/lane) and percent PI positive cells (% propidium iodide; FIGS. 4A-4B). FIGS. 4A-4B show effect of extracellular cryoprotectants, PEG, and holding temperature ($T_{hold}$) on endothelial cell attachment after exposure to a freeze-thaw protocol. Data were analyzed using a one-way analysis of variance (ANOVA) with a post-hoc Tukey test (p<0.05): no statistical significance was observed.

With respect to cell attachment, values in the presence of 2% PEG were 43.1±3.6 and 43.7±6.9, respectively, while values for 5% PEG were 38.8±6.4 and 36.3±8.1 at $T_{hold}$−6 and −10° C., respectively (FIG. 4A). Membrane integrity quantified as percent PI positive cells (FIG. 4B), showed values for 2% PEG were 14.1±6.8 and 12.0±11.3%, while values for 5% PEG were 9.4±8.6 and 13.6±15.9 at $T_{hold}$−6 and −10° C., respectively.

Example 5

Endothelial Cell Attachment and Viability During Long-term Storage

Figure 10:
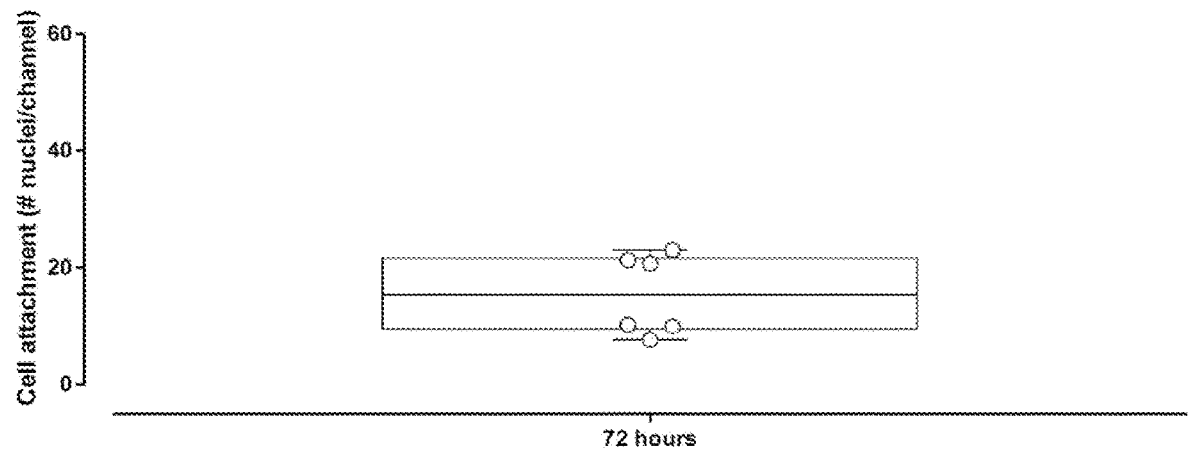
FIG. 10 is a graph that shows the effect of long-term storage (72 hour) on endothelial cell attachment with a holding temperature of −10° C.

It is hypothesized that despite the benefits of 3-OMG and PEG for maintenance of endothelial morphology and viability during a brief freeze-thaw cycle, it would not be sufficient for long-term storage. Thus, the University of Wisconsin (UW) solution was used since it is the current clinical standard for solid organ preservation at hypothermic temperatures (+4° C.) and it was effective at colder storage temperature (−6° C.) using high subzero supercooling preservation. However, the preliminary data with UW as the base solution and supplemented with 1 mg/mL Snomax, 100 mM 3-OMG, and 2% PEG showed low endothelial cell attachment after 72 hours of storage at −10° C. (15.46±6.9 cells/lane; FIG. 10). In FIG. 10, cell attachment is expressed as box-and-whiskers plots showing median, interquartile range, maxima/minima, and all individual data points (n=6).

The preservation solution consisted of University of Wisconsin (UW) solution, Snomax (1 mg/mL), 3-OMG (100 mM), and PEG (2%).

Figure 5:
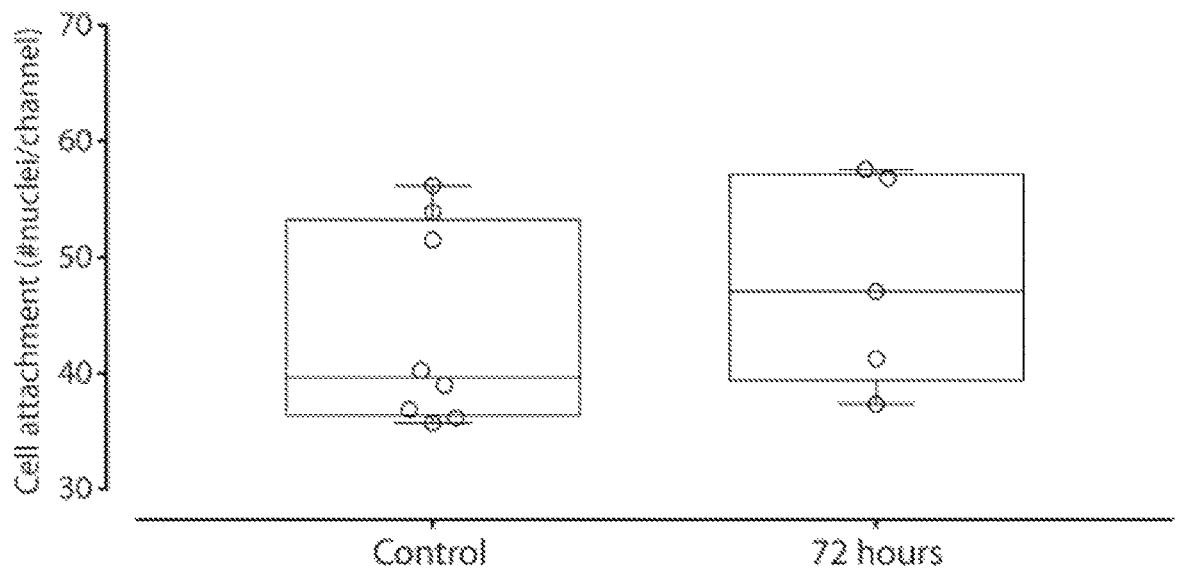
FIG. 5 is a graph showing the effect of long-term storage (72 hour) on endothelial cell attachment with a holding temperature of −10° C.
Figure 6:
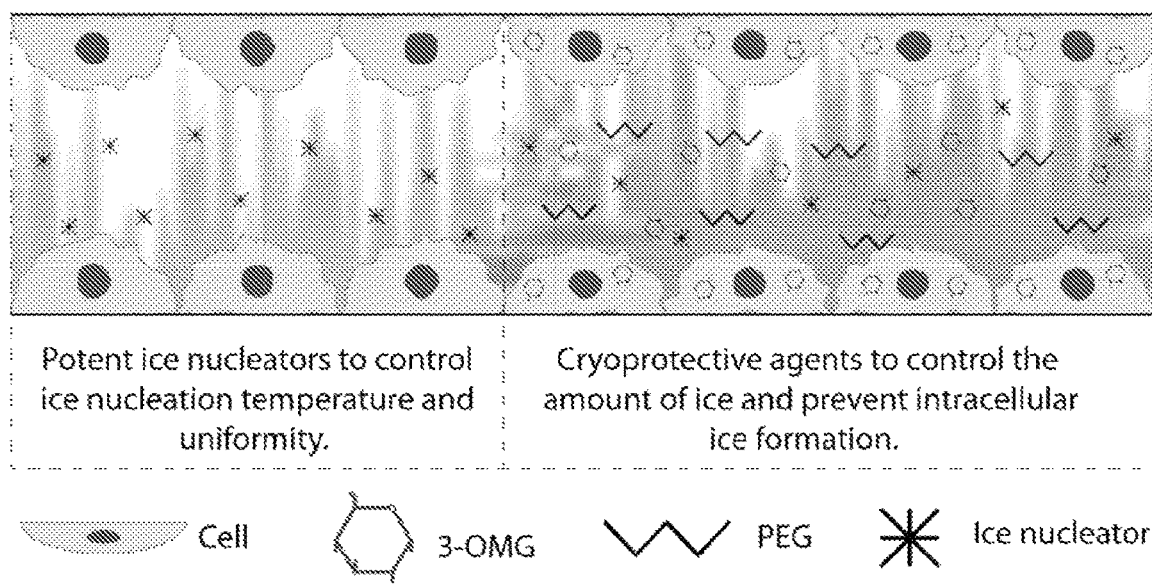
FIG. 6 is a schematic diagram showing that cryoprotective agents can control the amount of ice and prevent intracellular ice formation.

As a result, 10% glycerol and 30 mM trehalose were added since these are well established and commonly used CPAs for cryopreservation. With this "complete" storage media including UW, 1 mg/mL Snomax, 100 mM 3-OMG, 2% PEG, 10% glycerol, and 30 mM trehalose, microchannels were stored at −10° C. for 72 hours and endothelial cell attachment and viability were measured after a recovery period of 12-16 hours at 37° C. (FIG. 5). In FIG. 5, cell attachment are expressed as box-and-whiskers plots showing median, interquartile range, maxima/minima, and all individual data points (n=5-8) for 72 hours and unfrozen controls. Data were analyzed using two-tailed Student t-test ($p<0.05$).

Under these conditions, endothelial cell attachment was 48.0±9.1 at 72 hours, as compared to unfrozen controls 43.7±8.6 (p=0.4067, two-tailed t-test). While cell attachment was maintained after 72 hours of storage, the percentage of PI positive cells was 68±24.7%, which was significantly increased as compared to unfrozen control values ($p<0.0001$).

Example 6

Partial Freezing in Microengineered Capillaries

The commercially available ice nucleator, Snomax, which is the freeze-dried form of *Pseudomonas syringae* (Weng et al., Bacterial Ice Nucleation in Monodisperse D2O and H$_2$O-in-Oil Emulsions. Langmuir ACS J. Surf. Colloids 2016, 32 (36), 9229-9236) was used. Snomax can be directly suspended in the media and would induce freezing at multiple nucleation points within microengineered capillaries, as compared to external seeding with a cold spot.

Microchannels with Snomax dissolved in PBS were placed in a freezer. In the presence of Snomax, microchannels reliably froze between −5.1 to −6° C., as compared to −8.3 and −15.0° C. without Snomax, and active ice nucleation significantly improved endothelial cell attachment at $T_{hold}$ of −6° C. (FIGS. 2A-2B). This positive effect of controlled ice nucleation on cell survival has also been demonstrated for diverse cell types in suspension, encapsulated cells, and more complex tissues adherent to a structural scaffold; however, their relevance in microengineered capillaries during high subzero freezing has not been described before. While a holding temperature as high as −6° C. cannot be achieved without the presence of foreign ice nucleators, as the temperature minimum was further decreased from −6 down to −10 and −20° C., endothelial cell attachment decreased significantly to levels similar to without Snomax. The data suggest that while active ice nucleation at multiple nucleation sites do influence endothelial cell attachment, to descend into colder storage temperatures of about −10° C. additional cryoprotectant agents are required (see FIGS. 3A-3B and 4A-4B). The cryoprotectant agents are a necessary supplement to controlled ice nucleation by reducing the risk of intracellular ice formation since water inside cells/tissues is replaced.

Another critical strategy used by freeze-tolerance organisms involves the synthesis of high amounts of low-molecular weight carbohydrates (glucose in wood frogs) in blood and tissues which provide colligative resistance to detrimental decreases in cell-volume, while also serving to stabilize the phospholipid bilayer of membranes and restrict the formation of intracellular ice. The nonmetabolizable glucose derivative 3-O-methyl-d-glucose (3-OMG) which accumulates naturally through glucose transporters can also be used. 3-OMG is a viable alternative to glucose since it is not as readily metabolized, ensuring it can accumulate in the intracellular environment.

Further, the present disclosure shows that endothelial cells stored in solutions containing polyethylene glycol (PEG) were significantly less damaged. The mechanism of action of PEG includes adsorption and stabilization of the membrane surface (>10 kDa), exerts an oncotic effect to prevent edema and reduce tissue water content, reduce oxidative stress, as well as depress the freezing point of solutions and promote cell dehydration. In summary, intracellular saccharides such as 3-OMG and extracellular polyglycols such as polyethylene glycol can be particularly useful for high subzero partial freezing.

To remove the variable of ice nucleation temperature on cell attachment, all conditions included Snomax. It was observed that a dose effect whereby 100 mM 3-OMG was required to effectively maintain endothelial cell attachment down to temperatures of −10° C. (FIGS. 3A-3D), also suggesting this intracellular cryoprotectant provides added support above and beyond that provided by Snomax alone. In contrast, endothelial cell attachment and membrane integrity with 50 mM 3-OMG was statistically different at −10° C., as compared to −6° C. While cell attachment was maintained down to −10° C. in the presence of 100 mM 3-OMG, there was an upward trend in the number of PI positive endothelial cells, although this was not statistically significant, suggesting that additional cryoprotectant agents may be required for long-term preservation of endothelial cells in engineered microcapillaries. This upward trend in PI positive endothelial cells when frozen down to −10° C. in the presence of 100 mM 3-OMG is also reflected in endothelial cell morphology, as illustrated in FIG. 3D (also see enlarged images of 100 mM 3-OMG condition frozen to $T_{hold}$−10° C. in FIG. 11), whereby endothelial cells lose their elongated shape and become more circular.

Like conditions which characterized freezing damage on endothelial cells in the presence of 3-OMG and Snomax, the positive preservation features of polyethylene glycol (PEG) were also measured. As compared to 3-OMG, both 2% and 5% PEG were effective at preserving cell attachment at both −6 and −10° C. (FIGS. 4A-4D). Moreover, cell morphology was better maintained, as compared to 100 mM 3-OMG at the same temperature, at least upon visual inspection and qualitative observation of the elongated morphology. Finally, there were no statistically significant increases in cell death, although one biological replicate with 5% PEG down to −10° C. did show 36.3% of attached endothelial cells were positive for propidium iodine due to compromised cell membranes. In summary, conditions with 100 mM 3-OMG or 2% or 5% PEG showed the most promise.

For long-term preservation studies, the University of Wisconsin (UW) solution was tested as the base solution, and supplemented with optimal conditions as determined by brief freeze-thaw cycles.

For example, others have shown that tissue engineered vessels containing endothelial cells that were provided with 3% dextran or 5% hydroxyethyl starch (HES) had few focal leaks, maintained adhesion to the scaffold, and were typically viable for at least 2 weeks. The plasma expanders such as dextran and HES stabilize microvessels via physical mechanisms may enhance VE-cadherin localization at junctions and thereby limit vascular leakiness. However, when engineered microchannels were stored for 72 hours with UW supplemented with Snomax, 3-OMG (100 mM), and PEG (2%) alone it was not sufficient to maintain endothelial attachment (FIG. 10). In contrast, endothelial cell attachment after 72 hours was maintained when this storage solution was further supplemented with glycerol (10%) and trehalose (30 mM) (FIGS. 5A-5B). These CPAs would provide additional support to both the intracellular and extracellular environment, while also contributing to freezing point depression and an overall decrease in the amount of water trapped as ice.

These data demonstrating multi-day storage of microengineered capillaries challenge the paradigm that vitrification is the only solution for the long-term preservation of complex tissues including tissue-engineered constructs (Kuleshova et al., Vitrification as a Prospect for Cryopreservation of Tissue-Engineered Constructs. Biomaterials 2007, 28 (9), 1585-1596). While it has been shown that isolated chondrocytes can be cryopreserved using standard freezing methods with high cell survival post-thaw, chondrocytes embedded in the extracellular matrix using these freezing methods result in 80-100% cell death (Kuleshova, et al. Vitrification as a Prospect for Cryopreservation of Tissue-Engineered Constructs. Biomaterials 2007, 28 (9), 1585-1596). Further evidence for the strength of ice-free approaches has been demonstrated using tissue engineered constructs such as bone whereby slow cooling approaches resulted in suboptimal cell viability (Han et al., Beneficial Effects of Freezing Rate Determined by Indirect Thermophysical Calculation on Cell Viability in Cryopreserved Tissues. Artif. Cells. Blood Substit. Immobil. Biotechnol. 2006, 34 (2), 205-221). However, it is critical to highlight and further discuss the relevance of the final storage/holding temperatures in the present study versus more classical methods of cryopreservation using slow cooling. Since the approach uses relatively high subzero temperatures (−10° C.) as compared to classical methods of cryopreservation (−80° C. or below), many of the mechanisms which cause cryoinjury have been addressed, including mechanical constraints, solute effects, and catalysis of intracellular ice from growing extracellular ice crystals. Further, the method is less restricted by the high cooling and rewarming rates required for vitrification.

Example 7

Post-thaw Viability of Freshly Isolated Primary Rat Hepatocytes

Figure 12:
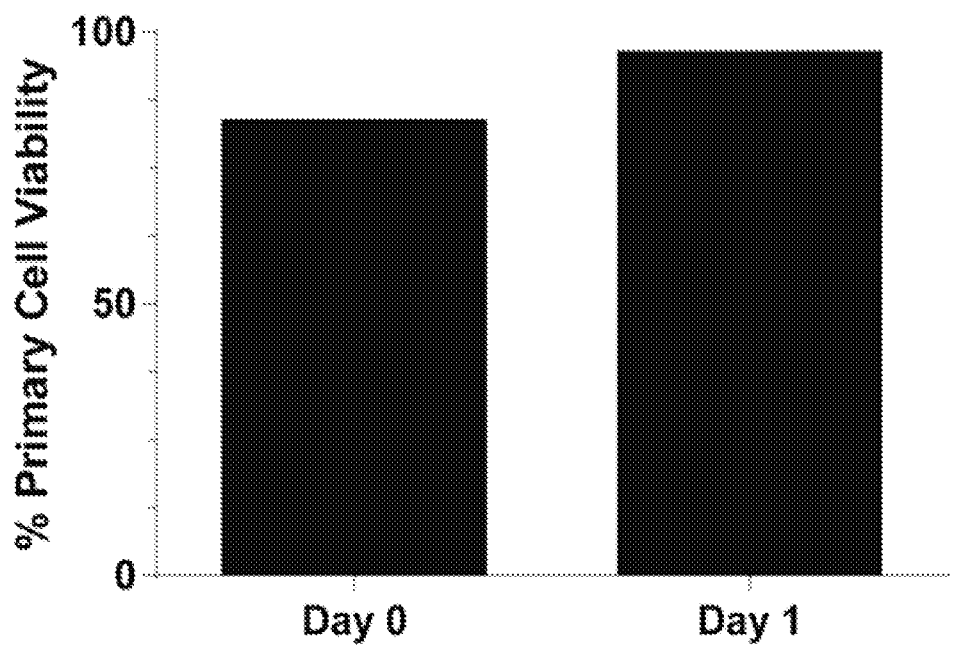
FIG. 12 is a bar graph showing the percentages of live primary rat hepatocytes measured 5 hours (Day 0) and 1 day after a high subzero freezing protocol, with ~19 hours storage at −10° C. in a double gel configuration.

Freshly isolated primary rat hepatocytes were plated in a double gel configuration. Primary cells were loaded with 50 mM 3-OMG in glucose depleted DMEM media (loading solution) for 2 hours at 37° C. Primary cells were then incubated at 4° C. for ~10 min before replacing the 3-OMG loading solution with a pre-chilled storage solution containing 50 mM 3-OMG, 25 mM Trolox, 5% DMSO, and 0.1 g/L Snomax. Primary cells were incubated for an additional 15 min at 4° C. to promote the diffusion of intracellular cryoprotectants across the top collagen gel matrix. Primary cells were immediately transferred to a controlled rate freezer and subjected to a high subzero freezing protocol: −1° C./min down to −10° C. before transfer to a freezer for long-term storage (1 day). Following 1 day of storage (~19 hours), cells were thawed by submerging the primary cells within the double gel into a 37° C. water bath. The storage solution was removed immediately post-thaw and replaced with media optimized for primary rat hepatocytes in the double gel configuration. Viability was tracked for two time points (5 hours and 1 day post-thaw) using a DNA stain (Hoescht) and propidium iodide stain as a marker of cell death. The data shows that 5 hour post-thaw viability was 83.9% and cells approached full recovery with viability of 96.4% 1 day after high subzero cryopreservation (FIG. 12).

Example 8

Whole Tissue/Organ Preservation

The components of the perfusion system are shown in FIG. 13. The machine perfusion system includes a pump, an oxygenator, and a bubble trap. The organ is perfused with a base solution supplemented with, for example, insulin, antibiotics, anticoagulants, steroids, etc. The pressure system is highlighted with a red box and zoomed in images are shown as insets. The portable pressure monitor can read pressure of the whole system in millimeters of mercury. A bifurcation in the tubing just upstream of the catheter leads to the pressure sensor, as shown in the lower, right inset below. The system is first calibrated by recording the pressure of the system (without organ) as a function of flow rate, as shown in FIG. 14. Thus, once the organ is attached to the perfusion system, the internal pressure can be monitored.

FIG. 14 shows the pressures of the system as a function of flow rate (without organ). The 3-OMG loading solutions had a Williams E media base supplemented with 100 mM 3-OMG, as well as BSA (10 mg/mL), heparin, insulin, hydrocortisone. The storage solution had a UW base supplemented with glycerol (10%), PEG (5%), and trehalose (50 mM).

Since the organs were perfused at much lower flows with a high viscosity storage solution (Storage solutions contains 10% glycerol), values past a flow of 7 mL/min. As expected, higher viscosity solutions had higher pressures at lower flows, as compared to lower viscosity solutions. These calibrations curves were performed before every experiment.

Example 9

Loading and Unloading of Highly Viscous Solutions

Loading and unloading of cryoprotectant agents (CPAs) is a vital metric since some can be toxic and have high viscosity which can damage endothelial cells. Also, livers are exposed to dramatic fluctuations in osmolality as CPAs are loaded and unloaded possibly causing severe cell dehydration or swelling/bursting.

Figure 15A:
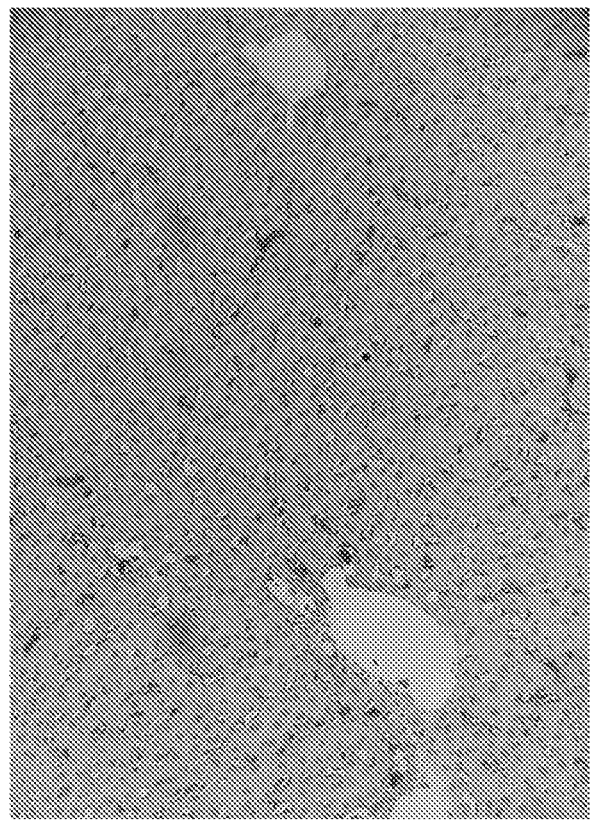
FIG. 15A is a microscope image showing liver cells with damage caused by loading cryoprotectant agents. Dark nuclei indicate dead cells, which are mostly endothelial cells.

In the experiments, endothelial damage occurred as a result of the loading process of high viscosity solutions. This liver was not frozen and was only subjected to the loading protocol with 10% glycerol as the main cryoprotectant. The dark stained cells indicated cell death with the majority of cell death evident in endothelial cells, including sinusoidal endothelial cells (FIG. 15A).

A stepwise loading protocol was preformed to address this issue. The liver was sampled for histology and endothelial analysis immediately after CPA loading. Thus, all livers presented were not frozen/stored and had the independent damage of the loading protocol only. Furthermore, the loading protocol was redesigned with special consideration for the impact of dramatic changes in osmolality between distinct phases of CPA loading. Thus, a step-wise loading protocol was finalized.

The stepwise loading protocol was tested in the following way: (1) "Loading 1" refers to the 3-OMG loading phase which is essential for intracellular delivery of this CPA.

3-OMG is loaded using the subnormothermic cocktail containing a William's E media base supplemented with heparin, hydrocortisone, insulin, etc. (2) "Loading 2" refers to the loading of the storage solution which contains a UW base supplemented with PEG (2%) and 3-OMG. (3) "Loading 3" refers to the third step-wise loading step which contains a UW base supplemented with PEG (2%) and 3-OMG in addition to 10% glycerol.

First, livers were continuously perfused with either 50 or 100 mM 3-OMG at subnormothermic temperatures for 60 minutes ("Loading 1") and were immediately sampled for histology. As observed from the histology, 3-OMG did not cause any damage to the parenchyma or to endothelial cells. The cells were healthy regardless of 3-OMG concentration. For this reason, 100 mM 3-OMG was selected for subsequent experiments.

Second, livers were continuously perfused with 3-OMG (100 mM) at subnormothermic temperatures for 60 minutes ("Loading 1"), followed by a cooling phase to +4° C., and loaded with Loading solution 2 (containing UW, PEG, and 3-OMG). After the experiment was stopped, livers were sampled for histology. The H&E and TUNEL assay show parenchyma and endothelial cells which look very healthy with very little cell death.

Finally, livers were continuously perfused with 3-OMG (100 mM) at subnormothermic temperatures for 60 minutes ("Loading 1"), followed by a cooling phase to +4° C., and loaded with Loading solution 2 (composed of UW, PEG, and 3-OMG), and Loading solution 3 (composed of UW, PEG, 3-OMG, and glycerol). After the experiment was stopped, livers were sampled for histology. While H&E and TUNEL assay showed cells were considerably shrunken, there was very little cell death. This result indicated that the issues with endothelial damage due to CPA loading can be addressed by the solutions as described herein.

Figure 15B:
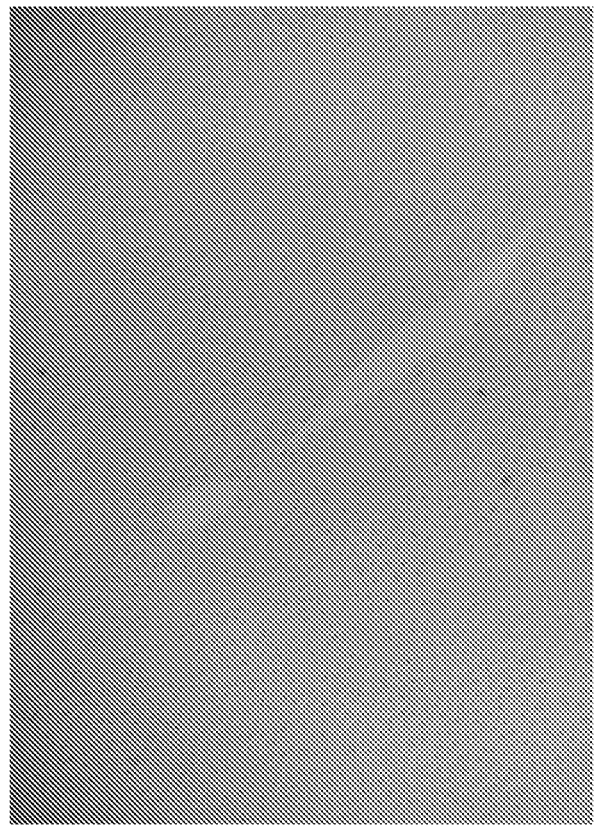
FIG. 15B is a microscope image showing liver cells having less damage when a cryoprotectant agent was added by a stepwise protocol described herein.

For comparison purpose, the results between the previous CPA loading method and the step-wise loading were shown in FIGS. 15A and 15B. TUNEL stains showed the difference in the degree of endothelial damage to livers. The liver to the left was not loaded stepwise (FIG. 15A). The liver to the right was treated with the optimized step-wise loading (FIG. 15B).

Similarly, a step-wise unloading process was also performed. The osmolality of the solution was gradually reduced during rewarming.

Example 10

Whole Organ Partial Freezing

Figure 16:
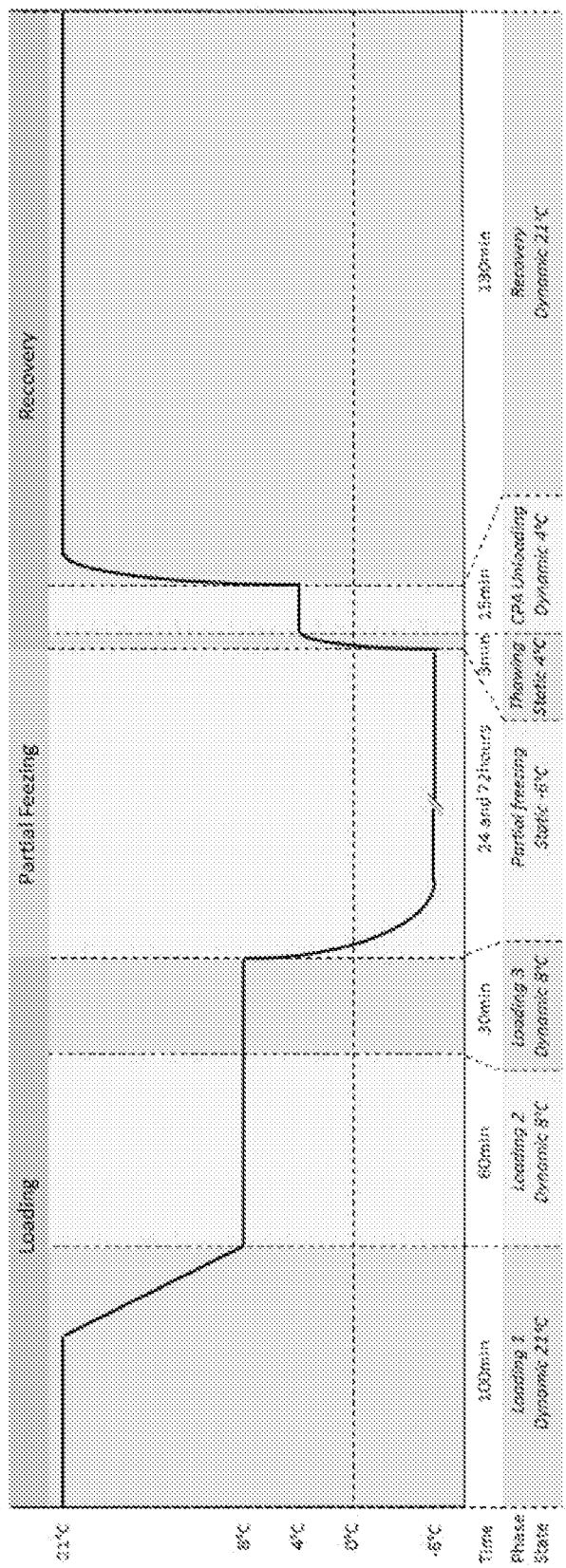
FIG. 16 is a schematic graphic representation of an example of a protocol for high subzero partial freezing of whole rat livers down to −6° C.

FIG. 16 shows protocol for high subzero partial freezing of whole rat livers. Livers were first loaded with 3-OMG during Loading 1 at subnormothermic temperatures, before cooling the livers to hypothermic temperatures. After cooling, livers were perfused with Loading solution 2 (containing UW, PEG, and 3-OMG) for 60 minutes, and then with Loading solution 3 (containing UW, PEG, 3-OMG, and glycerol) for 30 minutes.

Using the protocol presented in FIG. 16, livers were tested for increasing preservation duration including 1, 2, and 3 days (storage temperature was −6° C.). The images and data during the subnormothermic machine perfusion (SNMP) recovery phase for each liver was presented in FIGS. 17 and 18. In FIG. 17, during the recovery period, the organ was soft pink color, which indicates the organ was perfused well.

With respect to oxygen consumption, the initial value (T0) for the 5-day liver was slightly higher than the control and 1 day stored livers. This higher oxygen consumption were observed in organs which have been stored for extended durations whereby higher oxygen consumption was observed in the livers which survived transplantation. However, this increased oxygen consumption did not continue throughout perfusion and stabilized to values closer to control and 1 day stored livers.

Potassium was used as a marker for cell damage (cell lysis) thus the higher levels of potassium in the liver stored for 1 day may indicate some damage, although levels for the 5 day liver were exactly equal to the control. Lactate levels remained close to controls, with some livers showing increased values over time. Overall, pH levels were close to control values. Although not graphed, all livers showed very good pressures which did not increase over time and none of the livers increased in weight.

Example 11 pH and Ice Structure

The pH can change dramatically as a function of freezing and holding temperature. Depending on the components of the storage solution, the biologic sample can be exposed to an acidic or a basic environment. These changes can be determined by adding phenol red to the storage solution. In the presence of PEG, the solution became acidic, and in the presence of sodium bicarbonate, the solution became basic as the result of freezing. This pH change is relevant and can affect the preservation media. To counter these fluctuations in pH, the goal is to introduce "counter ions" which can balance the pH change.

Figure 19:
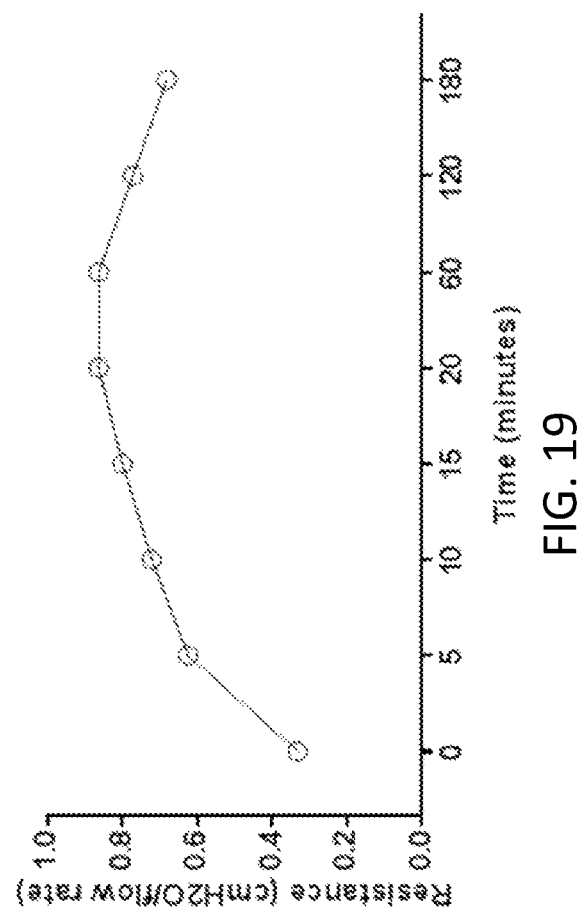
FIG. 19 is a graph that shows post-thaw vasculature resistance of whole rat livers.

Inulin was added to the freezing media. Inulin had a remarkable effect on the structure of the ice crystals. When freezing whole rat livers in the presence of inulin, it resulted in a good vasculature resistance post-thaw (FIG. 19).

Example 12

Whole Organism Preservation

Zebrafish was used to demonstrate feasibility of preserving whole organisms. 3-day old transgenic zebrafish with mCherry expressing endothelial cells (red fluorescence in FIG. 20) and injected FITC-labeled dextran (green fluorescence in FIG. 20) into the circulation.

Using a Linkam Scientific biological cryostage, zebrafish were frozen down to −10° C. at −1° C./min, whereby intra-organism ice was confirmed, and then thawed. Samples of the external media were collected before and after ice exposure and quantified using a spectrophotometer.

Zebrafish that were injected with FITC-labeled dextran prior to freezing had the maintenance of barrier function since dextran does not diffuse into the external media. In contrast, when zebrafish were treated with a freeze-thaw cycle without cryoprotectant agents (CPAs), zebrafish had a complete loss of barrier function. However, zebrafish barrier function was rescued in the presence of CPAs, with 98% preservation as quantified by comparing fluorescence of the external media pre- and post-freeze/thaw (FIGS. 20A and 20B). Importantly, heart function could be rapidly and directly assessed. This data showed that in the presence of CPAs, 60% of zebrafish recovered with a beating heart after being treated with a freeze-thaw cycle, and 50% were swimming and exhibited long-term survival (FIG. 20B). This result demonstrates the feasibility of freeze-tolerance for organ and organism preservation.

Cryoprotectants including 3-OMG, PEG, and glycerol exhibit dramatic effects on maintenance of endothelial barrier function, with 50% of zebrafish surviving long-term after whole organism freezing.

Example 13

Inside-out, Rapid Rewarming for High Subzero Preservation

Heat transfer through the relatively large surface area is sufficient to warm the relatively small mass of the rat liver, exceeding the CWR. However, fast convectional warming has shortcomings when upscaling to human sized organs due to its outside-in property.

The inside-out warming techniques were developed to address this issue. Experiments were performed to thaw human liver with the inside-out warming techniques. Using this method, livers we were able to more rapidly rewarm thereby reducing ischemia duration. Machine perfusion was counterintuitively applied to the frozen organ. The basic principle is that if the organ is thawed outside in by convectional warming, the vasculature of the thawed tissue becomes available for machine perfusion, while the deeper tissue of the organ is still frozen. Machine perfusion provides metabolic support to the thawed tissue which otherwise would deteriorate during thawing of the deeper organ tissues. Also, the warm perfusate flow in the thawed superficial parts of the organ can increase the thawing rate of the deeper parts.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for partially freezing a cell, the method comprising:
    (a) incubating the cell in a loading solution comprising 3-O-methyl-D-glucopyranose (3-OMG) in a vessel, wherein a concentration of 3-OMG in the loading solution is from about 50 mM to about 200 mM, and wherein the cell is incubated at about 37° C. for about 2 hours;
    (b) perfusing the vessel with a storage solution, wherein perfusing the vessel with the storage solution replaces the loading solution with the storage solution, wherein the storage solution comprises 3-OMG, one or more cryoprotective agents, and an ice nucleator, and wherein a concentration of 3-OMG in the storage solution is from about 50 mM to about 200 mM; and
    (c) cooling the cell in the vessel to a temperature from −5° C. to −10° C., thereby partially freezing the storage solution in the vessel,
    wherein from about 20% to about 99% of the storage solution in the vessel is in a solid state comprising extracellular ice crystals,
    wherein the storage solution remains partially frozen during storage,
    wherein the method avoids intracellular ice formation, and
    wherein the method does not include vitrification.

2. The method of claim 1, wherein the cell is a mammalian cell, and the method further comprises attaching the cell to the vessel.

3. The method of claim 2, wherein the vessel is coated with fibronectin.

4. The method of claim 1, wherein the vessel is a capillary tube.

5. The method of claim 1, wherein the loading solution comprises EBM-2 complete media and 3-OMG.

6. The method of claim 1, wherein the storage solution further comprises University of Wisconsin cold storage solution, wherein the University of Wisconsin cold storage solution comprises
    about 100 mM potassium lactobionate,
    about 25 mM KH2PO4,
    about 5 mM MgSO4,
    about 30 mM raffinose,
    about 5 mM adenosine,
    about 3 mM glutathione,
    about 1 mM allopurinol, and
    about 50 g/L hydroxyethyl starch.

7. The method of claim 1, wherein the ice nucleator is InaZ of *Pseudomonas syringae*, and the one or more cryoprotective agents are selected from the group consisting of a sugar, glycerol, ethylene glycol, propylene glycol, polyethylene glycol (PEG), 1,2-propanediol, trehalose, and dimethyl sulfoxide (DMSO).

8. The method of claim 1, wherein the storage solution further comprises trolox (6-hydroxy-2,5,7,8-tetramethylchroman-2-carboxylic acid), 3-O-methyl-D-glucopyranose, and polyethylene glycol (PEG).

9. The method of claim 8, wherein the storage solution further comprises glycerol and trehalose.

10. The method of claim 1, wherein the cell is partially frozen for more than 50 hours.

11. The method of claim 1, wherein the cell is a human, porcine, murine, or bovine cell.

12. The method of claim 1, wherein the cell is an oocyte, a sperm, a stem cell, an embryo, a zygote, or an endothelial cell.

13. The method of claim 1, wherein the storage solution comprises about 25 mM trolox (6-hydroxy-2,5,7,8-tetramethylchroman-2-carboxylic acid), about 5% DMSO, and about 0.1 g/L InaZ of *Pseudomonas syringae*.

* * * * *

UNITED STATES PATENT AND TRADEMARK OFFICE
CERTIFICATE OF CORRECTION

| | |
|---|---|
| PATENT NO. | : 12,058,996 B2 |
| APPLICATION NO. | : 16/622457 |
| DATED | : August 13, 2024 |
| INVENTOR(S) | : Mehmet Toner et al. |

It is certified that error appears in the above-identified patent and that said Letters Patent is hereby corrected as shown below:

On the Title Page

Column 2 item (57) (Abstract), Lines 7-8, delete "intracelluar" and insert -- intracellular --

Signed and Sealed this
Twenty-ninth Day of October, 2024

Katherine Kelly Vidal
*Director of the United States Patent and Trademark Office*